(12) United States Patent
Bailey et al.

(10) Patent No.: US 6,820,076 B2
(45) Date of Patent: Nov. 16, 2004

(54) DATABASE SYSTEM FACILITATING PARAMETRIC SEARCHING

(75) Inventors: Steven C. Bailey, Washington, IL (US); Stephen W. Blessin, Peoria, IL (US); Allen E. Detmer, Patriot, IN (US)

(73) Assignee: i2 Technologies US, Inc., Dallas, TX (US)

( * ) Notice: Subject to any disclaimer, the term of this patent is extended or adjusted under 35 U.S.C. 154(b) by 340 days.

(21) Appl. No.: 10/052,668

(22) Filed: Jan. 18, 2002

(65) Prior Publication Data

US 2002/0087558 A1 Jul. 4, 2002

Related U.S. Application Data

(60) Provisional application No. 60/205,602, filed on May 18, 2000, provisional application No. 60/263,041, filed on Jan. 18, 2001, and provisional application No. 60/263,036, filed on Jan. 18, 2001.

(51) Int. Cl.$^7$ .............................................. G06F 17/30
(52) U.S. Cl. ................... 707/3; 707/5; 707/10
(58) Field of Search ............................. 707/1–10, 100, 707/101, 102, 104.1; 705/27, 1, 26, 10

(56) References Cited

U.S. PATENT DOCUMENTS

| | | | |
|---|---|---|---|
| 5,706,496 A | | 1/1998 | Noguchi et al. ................ 707/3 |
| 5,715,444 A | * | 2/1998 | Danish et al. ................. 707/4 |
| 6,032,145 A | * | 2/2000 | Beall et al. .................... 707/5 |
| 6,041,326 A | | 3/2000 | Amro et al. ................... 707/10 |
| 6,081,804 A | | 6/2000 | Smith .............................. 707/5 |
| 6,094,649 A | | 7/2000 | Bowen et al. .................. 707/3 |
| 6,321,224 B1 | * | 11/2001 | Beall et al. ..................... 707/5 |
| 6,341,277 B1 | * | 1/2002 | Coden et al. .................. 707/2 |
| 2002/0013778 A1 | * | 1/2002 | Neal et al. ...................... 707/3 |
| 2002/0103789 A1 | * | 8/2002 | Turnbull et al. ............... 707/3 |

OTHER PUBLICATIONS

Notification of Transmittal of the International Search Report or Declaration, 5 pages.

* cited by examiner

*Primary Examiner*—Charles Rones
*Assistant Examiner*—Neveen Abel Jalil
(74) *Attorney, Agent, or Firm*—Baker Botts L.L.P.

(57) ABSTRACT

In one aspect of the invention, a computer-implemented database system (10) includes a first table (22*a*) including rows each corresponding to a keyword and each including an identifier uniquely identifying the keyword. Each keyword corresponds to one or more items for which a parametric search may be performed. A second table (22*b*) includes rows each corresponding to an attribute of one or more items and each including an identifier uniquely identifying the attribute and a name of the attribute. A third table (22*c*) includes rows each corresponding to a keyword-attribute combination and each including the identifier for the keyword, the identifier for the attribute, and a set of all valid attribute values for this combination. A fourth table (22*d*) includes rows each corresponding to an item and each including an identifier uniquely identifying the item, a name for the item, and the identifier for the keyword for the item. A fifth table (22*e*) includes rows each corresponding to an attribute value of an attribute of an item and each including the attribute value, the identifier for the attribute, the identifier for the item, and the identifier for the keyword for the item.

58 Claims, 49 Drawing Sheets

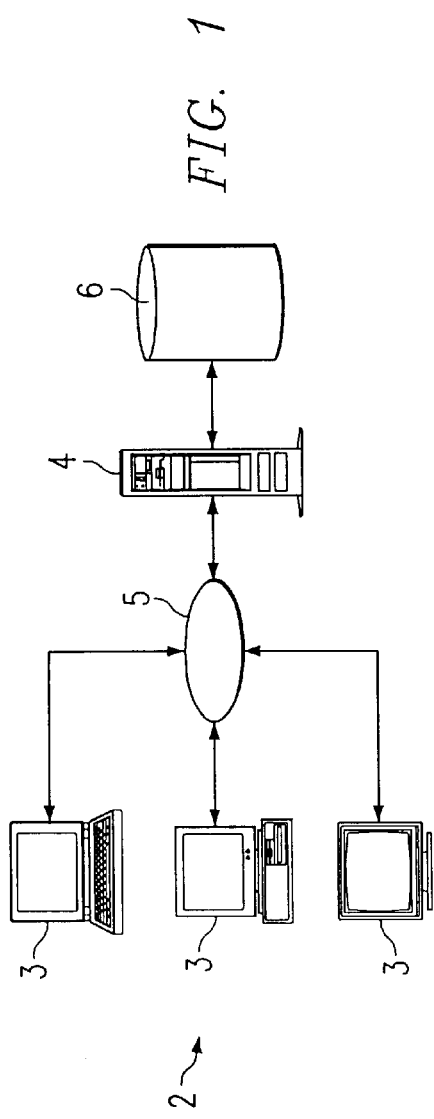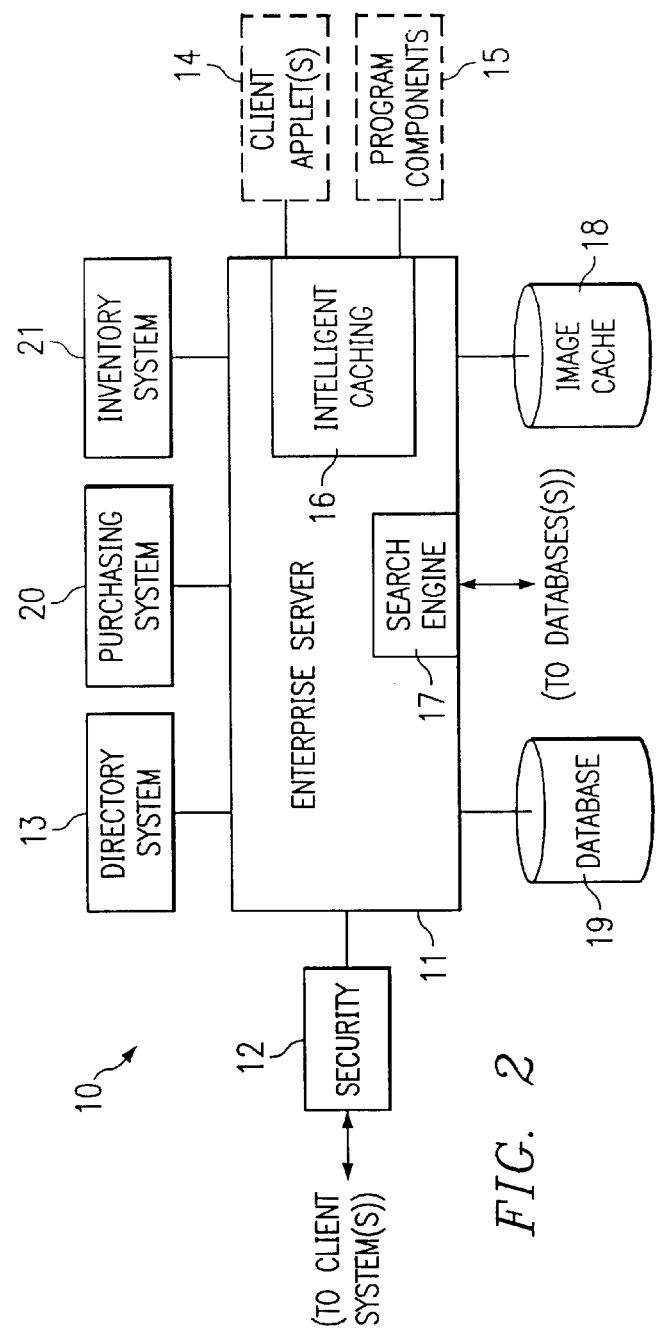

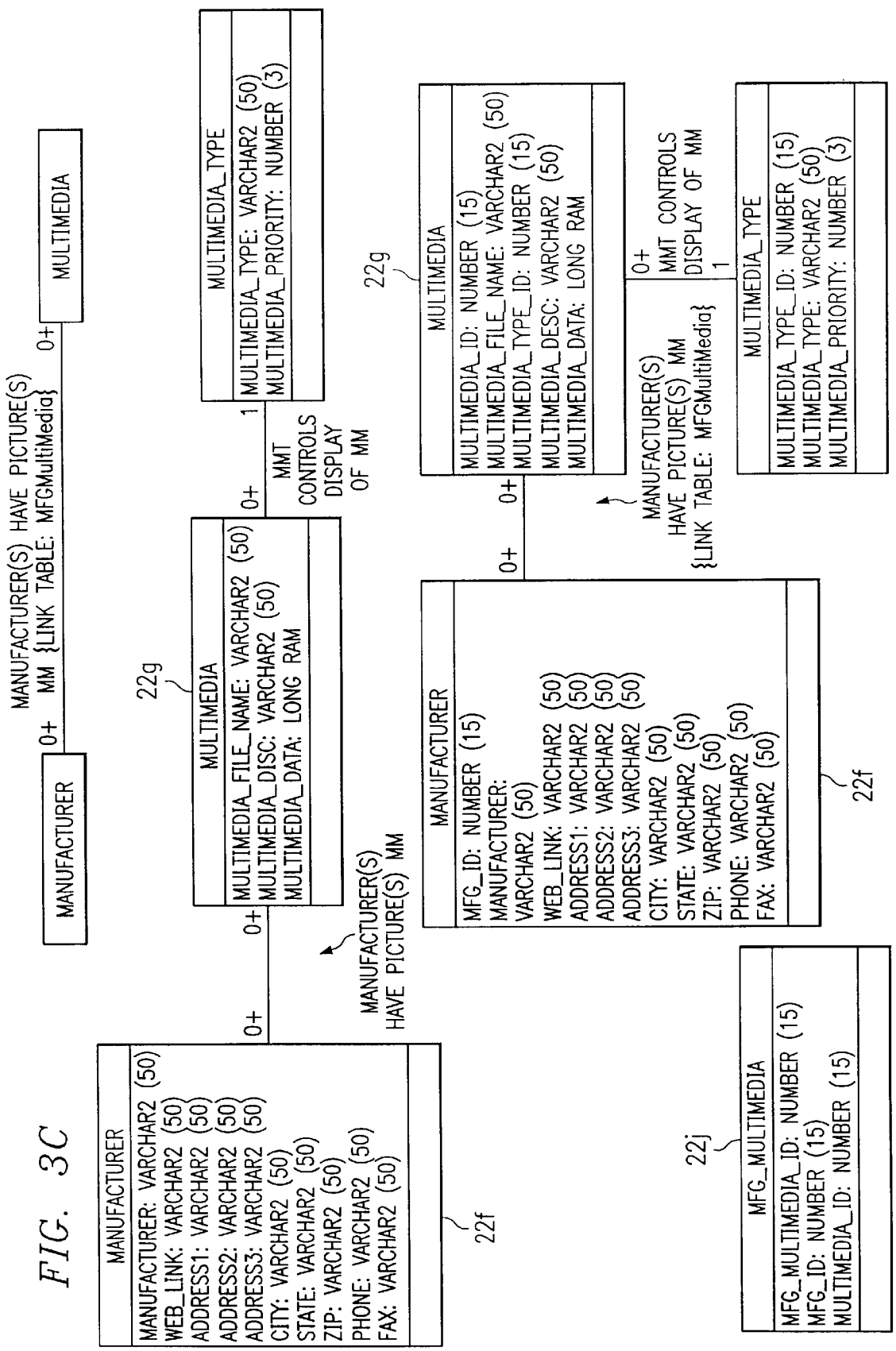

DATABASE SYSTEM FACILITATING PARAMETRIC SEARCHING

RELATED APPLICATIONS

This application claims the benefit under 35 U.S.C. §119 (e) of U.S. Provisional Application No. 60/263,041, filed Jan. 18, 2001 for Database Table Structure for Web-Enabled Parametric Searching, U.S. Provisional Application No. 60/263,036, filed Jan. 18, 2001 for Database System Facilitating Textual Searching, and U.S. Provisional Application No. 60/205,602, filed May 18, 2000 for Web-Enabled Cataloging and Procurement System and Method. This application is also related to U.S. application Ser. No. 09/860,243, filed May 18, 2001 pending for "Computer-Implemented Procurement of Items Using Parametric Searching", pending, and U.S. application Ser. No. 10/052,642, filed Jan. 18, 2002 pending for "Database System Facilitating Textual Searching".

TECHNICAL FIELD OF THE INVENTION

The present invention relates generally to databases and more particularly to a database system facilitating parametric searching.

BACKGROUND OF THE INVENTION

In the past, business user of corporate procurement processes were often left dissatisfied with such processes, which often made procurement of items inefficient, slow, and expensive. For example, using some previous procurement systems, the task of searching for and ordering even a single item could take days, weeks, or even months in certain cases. As a result, many users of previous procurement systems have been discouraged by the lack of features, flexibility, and user-friendliness of such systems, leading such users to decrease or eliminate their use of such systems. The above factors have resulted in duplicate items stealing valuable storage capacity within business, have kept businesses from exercising maximum purchasing leverage, and have perpetuated many other problems. Previous procurement techniques have therefore been inadequate for the needs of many business users.

SUMMARY OF THE INVENTION

According to the present invention, problems and disadvantages of previous database systems may be substantially reduced or eliminated.

In one aspect of the present invention, a computer-implemented database system includes a first database table including one or more rows each corresponding to a keyword and each including an identifier uniquely identifying the keyword. Each keyword corresponds to one or more items for which a parametric search may be performed. A second database table includes one or more rows each corresponding to an attribute of one or more items and each including an identifier uniquely identifying the attribute and a name of the attribute. A third database table includes one or more rows each corresponding to a keyword-attribute combination and each including the identifier for the keyword of this combination, the identifier for the attribute of this combination, and a set of all valid attribute values for this combination. A fourth database table includes one or more rows each corresponding to an item and each including an identifier uniquely identifying the item, a name for the item, and the identifier for the keyword corresponding to the item. A fifth database table includes one or more rows each corresponding to an attribute value of an attribute of an item and each including the attribute value, the identifier for the attribute, the identifier for the item, and the identifier for the keyword corresponding to the item.

In another aspect of the present invention, a computer-implemented database system includes a database including a first table that facilitates construction of a hierarchical data structure for user selection of a keyword in connection with a parametric search. Each keyword corresponds to a folder of the data structure and to one or more items for which the parametric search may be performed, a keyword corresponding to a folder that has one or more sub-folders being considered a parent keyword for the keywords corresponding to those sub-folders. The first table includes multiple rows each corresponding to a keyword and each including: an identifier uniquely identifying the corresponding keyword; a name for the corresponding keyword; an indication of whether the corresponding keyword has a parent keyword, if the corresponding keyword has a parent keyword then the indication including the identifier for the parent keyword; a name path for the corresponding keyword including the names for all keywords that exist in a corresponding path through the data structure from a top level folder of the data structure to the folder for the corresponding keyword, the name path including at least the name for the corresponding keyword; and an indication of whether the corresponding keyword is a last keyword in the name path.

In another aspect of the present invention, a computer-implemented database system includes a first database table including rows each corresponding to a keyword and each including a keyword identifier uniquely identifying the keyword and an indication of whether a piece of media relating to the keyword is available. Each keyword corresponds to one or more items for which a parametric search for items matching a parametric query may be performed. A second database table includes rows each corresponding to an item and each including an item identifier uniquely identifying the item and the keyword identifier for the keyword corresponding to the item. A third database table includes rows each corresponding to a piece of media and each including a media identifier uniquely identifying the piece of media and information reflecting how the piece of media is to be accessed. A fourth database table includes rows each corresponding to a combination of a keyword and a piece of media and each including the keyword identifier for the keyword and the media identifier for the piece of media. A fifth database table includes rows that each correspond to a combination of an item and a piece of media and each including the item identifier for the item and the media identifier for the piece of media.

Certain embodiments of the present invention may provide one or more technical advantages. For example, certain embodiments may provide a system that allows users to search for items in a way that does not require them to know specific formatting and syntax requirements for the system. Certain embodiments may provide a system that conveys to a user what the attributes of a specific item are, so that the user can narrow a search quickly without full knowledge of the desired item. Certain embodiments may simplify how a user inputs attribute values (i.e. specific values for attributes), as well as reduce the amount of errors that often occur when doing so. Certain embodiments may help eliminate uncertainty associated with "formatting errors" so that when the system returns no matches, the user knows it is because there are no items with those attribute values, and not because the user improperly formatted the search. Other technical advantages may be readily apparent to those

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example system for procurement of items using parametric searching;

FIG. 2 illustrates an example in further detail;

FIGS. 3A–3C illustrate an example database table structure;

FIGS. 9A–9H illustrate example displays associated with presentation of search results;

FIGS. 13A–13I illustrate an example requisition form;

DESCRIPTION OF EXAMPLE EMBODIMENTS

Figure 3A:
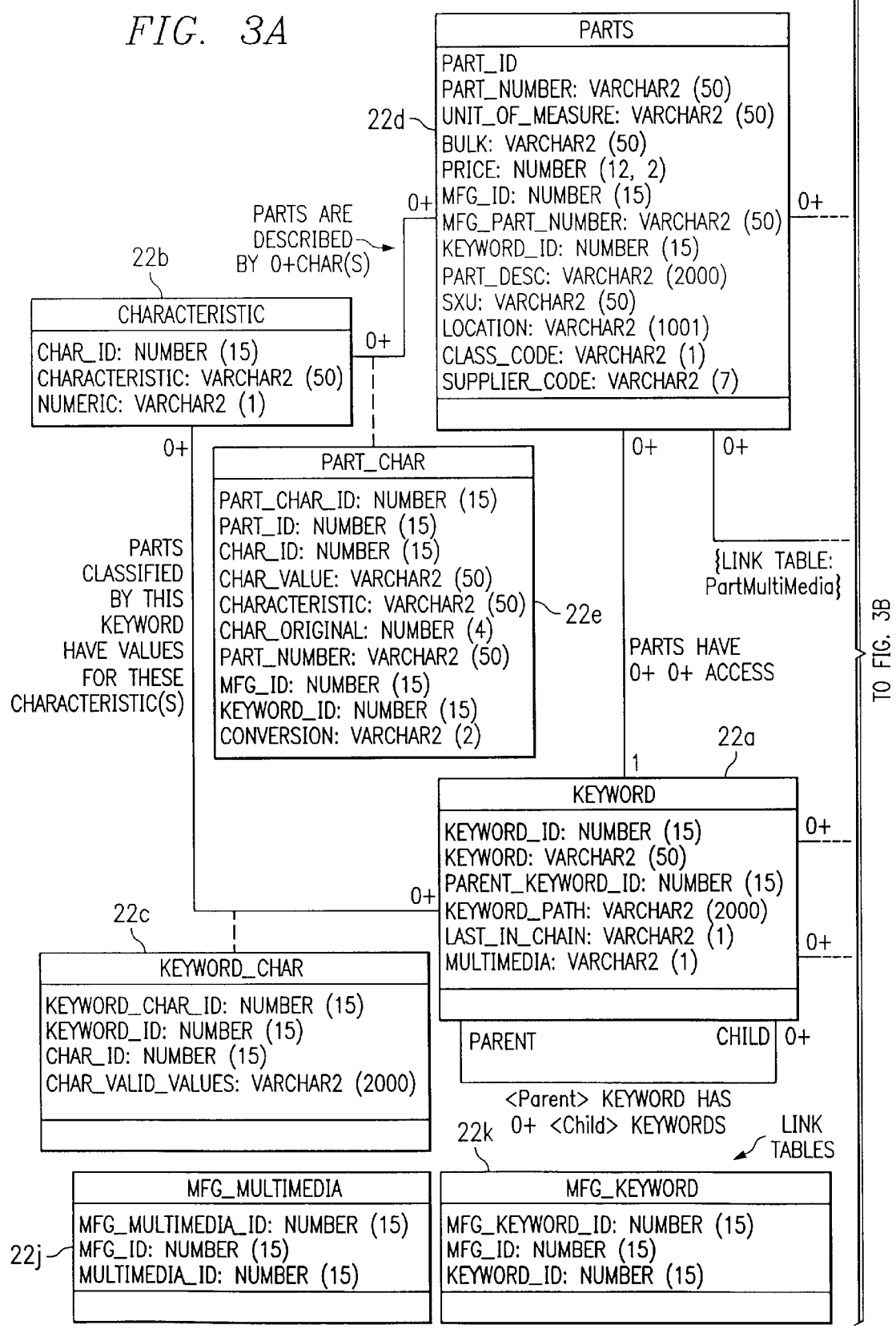

FIG. 1 illustrates an example system 2 for procurement of items using parametric searching. In one embodiment, system 2 includes one or more client systems 3 coupled to a server system 4 using a network 5. Server system 4 may be a multi-user, concurrent use system and may include a web server and other appropriate components for interacting with client systems 3 in the manner described more fully below. A web server associated with server system 4 may communicate files to web browsers of client systems 3, for example, in the form of Hypertext Markup Language (HTML) pages using Hypertext Transfer Protocol (HTTP), Secure HTTP (HTTPS), or any other suitable protocol. The server system 4 is associated with one or more relational, object-oriented, or other appropriate databases 6. If appropriate, reference herein to database 6 is meant to encompass an associated database management system (DBMS) and any other components suitable for the operation in question. In one embodiment, the data stored in database 6 may be organized according to the table structure illustrated in FIGS. 3A–3C. Although described as a database, any appropriate data storage device, structure, or technique may be used, and reference to database 6 is meant to encompass all such alternatives.

Client system 3, server system 4, and database 6 may each operate on one or more computers at one or more localized or distributed locations. Each computer may include processing, memory, communications, and other resources appropriate for the tasks described below. The present invention contemplates any appropriate types of computers, such as mainframes, workstations, personal computers (PCs), laptop PCs, personal digital assistants (PDAs), wired or wireless telephones, or other suitable processing devices. Network 5 may include at least a portion of one or more local area networks (LANs), one or more metropolitan area networks (MANs), one or more wide area networks (WANs), a global computer network such as the Internet, or any other suitable wired, optical, wireless, or other network. Although a particular implementation may be described as an example, the present invention is not limited to any particular system architecture, software architecture, computing environment, network environment, file format, communications protocol, software development methodology, programming language, or other implementation detail unless recited specifically in the claims appended to this description.

Electronically searching for items, for procurement or any other purpose, is often a complex task. Typically, not only must a user know specific information about the item the user wishes to find, but the user must also know how to properly input a search query into the associated computer system so that the system properly understands the search query. Different systems often use different terminology and formatting, such that a proper query for one system may not be proper for another. For example, using a previous system, a search query for a bolt with a ⅝" length and ¼" diameter head might require the following format: "bolt, len 0.625, diameter 0.25. " Such formatting requirements may not be intuitive, especially to novice users, and may therefore lead to formatting mistakes. Unfortunately, however, even a single misspelled word, misplaced comma, or other error may cause a search to fail, wasting valuable time and other resources.

As another example, if a user wishes to search for a specific manufacturer's bolt, then the user typically must know the manufacturer's precise name or at least the code by which the system refers to that manufacturer. If this information is input incorrectly, the search may very well return no search results, leading the user to believe that the manufacturer does not make the particular bolt when that is not the case. For example, the user may have accidentally misspelled the manufacturer's name using a "c" instead of a "k", or input the improper code for that manufacturer, such that the search query did not return any results. A similarly undesirable result might occur if the user does not know that the real name of the item-in question did not have the word "bolt" in it (even though the item is commonly referred to as a bolt). In such cases, the system may return an empty result even though the desired item is abundantly in stock.

Even if the user is correct about the name and type of item the user desires, search results returned by the system may be unmanageable due to the number of items that match the search query. Thus, a typical search query will also include values for one or more attributes of the item to narrow the pool of matching items. However, the user must still be familiar with the terminology for these attributes in order to narrow the results in this manner. For instance, a first system may refer to the width of an item by "w" while a second system may refer to the width of an item by "wid". Again, using nomenclature that is improper for a particular system may cause the system to return an incorrect result.

Not only must a user be familiar with the proper nomenclature for specifying the values of attributes in order to narrow the search, but the user must also be aware of what each of the attributes actually means. For instance, if a user is told to find a standard hex-head bolt with a 3.18 mm grip length, a 25.4 mm length, and a 11.11 mm hex size, the user might very well need to ask: What is a grip length? Is the grip length measured from the end of the bolt or the end of the threads? Is the hex size from the bolt head point or the bolt head flat? Issues of this sort may exemplify the types of knowledge a user must have about an item for which the user is searching before the user can conduct an effective search for the item. Using prior systems, without such knowledge a user has little chance of conducting a successful search without outside assistance.

Furthermore, if a user wants to search according to more than one attribute, the user might want to narrow a search by specifying, for example, that the length of the item must be less than 10 inches and the width must be greater than 16 feet. To create such a search query, a user may need to be familiar with how the system requires such criteria to be specified. To specify these example criteria, the proper format might be: 1<10" and w>16', or this: 1<10" ^ w>192". In the alternative, the proper format might be: len less 10 in and wid more 16 ft. Again, without knowing the specifics of a particular system, a user may have little searching success without training and practice.

It should be apparent from the above examples that a user will typically need to be familiar with many different aspects of a particular system, and also of an item to be searched, before an effective search query for that item can be formulated. A user may need to know what attributes describe the item, proper abbreviations for an attribute, how to specify a maximum, minimum, or other boundaries for an attribute, the measurements relevant to an attribute, how to specify the measurements (feet vs. inches, meters vs. inches, feet vs. millimeters, etc.), how relators (and, or, not, etc.) may be used, and other aspects. Even with this knowledge, the user must still input the search query in a way that the system expects or all is for naught. Thus, the user is assumed, with many previous systems, to have a significant amount of knowledge concerning the system in conducting a search for an item. There is a danger that when search results are returned to a user, they might not contain the item the user wants, not because of the underlying information supplied to the system, but because of the manner in which the information was supplied. For any of the above or other reasons, prior systems have been inadequate for the needs of many users.

System 2 may be used to parametrically search one or more item catalogs for one or more desired items, for example, in connection with procurement of the items for use in a business. In general, parametric searching may be defined as searching based upon one or more variable quantities, qualities, or other aspects characterizing, restricting, or otherwise giving a particular form to the item to which the search is directed. Each such aspect may be considered an attribute of an item. For example, all bolts may have a "length" attribute. Each attribute may have a specific value for a particular item. For example, a particular bolt that is one inch long has a value of "one inch" for the "length" attribute.

In one embodiment, server system 4 supports a web enabled cataloging and procurement ("WECAP") system. As an example, WECAP system 10 may be used to search for and procure items from one or more internal facilities or other locations. WECAP system 10 may be used to search for and procure items from one or more external manufacturers, suppliers, or other entities. WECAP may be used to search for and procure items from any suitable source according to particular needs and the implementation of system 2. Use of WECAP system 10 may help users search for and procure items by providing a single system through which a user can, for example and without limitation: (a) search, using one or more search modules, for items that are available from sources internal to and/or external to the business associated with the user; (b) view detailed information and manipulable images for items; (c) find particular internal locations with known quantities of items in stock; (d) send order requests for desired items, either internally or externally; and (d) track the approval process for ordered items. WECAP system 10 may also provide an efficient and user-friendly graphical user interface (GUI) used for interacting with its cataloging, procurement, and other components.

In one embodiment, parametric searching according to the present invention may reduce or eliminate the "guesswork" associated with searching by proactively presenting the user with acceptable choices and letting the user select from among those acceptable choices. This may help reduce the possibility of a faulty search based on a mere failure to precisely adhere to the stringent nomenclature or other formatting requirements of previous systems. Database 6 may link each item in at least a portion of a catalog to one or more keywords associated with that item, and also to all attributes and acceptable attribute values for the item. In one embodiment for example, after a category of item is specified using a keyword, a list of all or at least a predetermined subset of all attributes for that category of item is displayed to the user. This may reduce or eliminate the need for the user to guess or otherwise determine what the specific name of an attribute might be, or what acceptable values for that attribute might be, when searching for an item. Furthermore, with columns such as "Equal to", "Maximum", and "Minimum" and rows representing attributes, a spreadsheet may be created into which the user can simply input the desired attribute values in the appropriate cells. Also, because multiple attribute columns may be provided, multiple attribute values can be searched without the user knowing about and then correctly inputting relators. Moreover, once the user has access to all the attributes associated with a category of items, the user has increased control over the specificity of the search. Whereas specifying an attribute value for one attribute may allow for many results that satisfy the search query, specifying attribute values for multiple attributes will typically quickly narrow a search to a relatively few items. This allows for fast filtering of results and decreases the time that must be spent "wading through" search results that are not desired. Although this discussion may assume for the sake of convenience that all attributes for a category of items are available for searching, parametric searching may be based on any one or more attributes according to particular needs.

Another benefit of parametric searching according to the present invention is that the search will bring back a conclusive answer. When searching the traditional way, it is possible that the item being searched for exists in inventory but cannot be found because of a user error in formatting the search query. If there is no match, a user can never be absolutely certain that this empty result set is not simply due to a user error in formatting the search query. In contrast, parametric searching using the present invention will in one embodiment lead to an empty result set only if the attribute values entered do not correspond to any available items, not because of the search query being improperly formatted in some manner.

There are typically two main techniques for searching using a search engine on a computer; parametric and textual. Each has strengths and weaknesses. A textual search is often most useful when a user needs to find an object that has a particular piece of information describing it. Textual searching may do this by performing a pattern match. The piece of information can be in the form of a number; a text string that represents a description of an object, the name of an object, a number of the object, a any other information relating to an object; or a combination thereof For example, a textual search on the word "bolt" might return any item in the database that has the word "bolt" describing it. This may include items that are described as a "bolt", have "bolt" in their names, or have a "bolt" attribute. Thus, using a textual search will typically yield many results. However, many of these results may be irrelevant to what the user actually wants to know, since any piece of information containing the textual search word(s) will be returned as a result.

A parametric search, on the other hand, is often most helpful when a user knows what kind of object the user is looking for and can select a particular value for an attribute that the desired object must have. For example, if a user knows a bolt desired must have a length of 2", then a parametric search allows the user to search for bolts of length 2" as the sole (or one of multiple) searching criteria. A parametric search typically requires that the user know a little more about what he is searching for than with a textual search, but will typically return more relevant results, all of which fit the desired search criteria narrowed down by the specified attribute value (e.g., length of 2"). Thus, user interaction for parametric searching may differ from user interaction for textual searching.

In one embodiment, WECAP system 10 supported using server system 4 may efficiently support both parametric and textual searches, which improves on the traditional separation of these searching paradigms. When a user receives search results for a textual search, WECAP system 10 offers the user the option of viewing all the related attributes and their specific attributes values as well as the traditional textual search results. With previous systems, a textual search simply performed a pattern match on the data it was searching. Using one embodiment of the present invention, a user is also able to view all attribute and specific attribute values for an item not only on the same system, but preferably within the same display. This may allow the user to interact with one system to get all the information desired about a particular item. In connection with a search for a part, for example, no longer would a user need to find a part number, description, and price information on one system, then find the attribute data for the part in an entirely different system. Accordingly, time is saved and efficiency increases.

In a particular embodiment, WECAP system 10 allows the user to determine all the attribute values of all attributes of an item by simply inputting an item number or other item identifier. Often, a user might need to replace an item, but not know very much about what the item is or how it is classified. For example, a user might only have the part number affixed on the item to help the user find a replacement. Using WECAP system 10, a user may simply perform a search for that part number to almost immediately obtain all the attributes and attribute values for the part in a single display. The user may then have a much greater understanding of what the item is, and can use this information to find the same item or another replacement item, for example, in inventory of the associated business. This may eliminate the burdensome need for a user to access multiple systems, or even books, to obtain the relevant information. This may in turn reduce the possibility of user error and save significant time and expense for the associated business.

In addition, WECAP system 10 may allow a user to effectively compare all appropriate items from multiple manufacturers before choosing the one that best fits the user's goals. Items for each manufacturer may be compiled in a corresponding catalog. The ability to search multiple catalogs simultaneously may be appealing. Looking at prices from different manufacturers, for items the user now knows to be compatible (since the user in this case has virtually instant access to attributes and attribute values for each item), may save significant time and expense. A user can choose a less expensive substitute, or one that happens to be readily available, for example. By providing the user with such information, WECAP system 10 may allow the user to make more informed decisions and may thus save time, conserve resources, and lower expenses for the associated business.

FIG. 2 illustrates an example WECAP system 10, supported at least in part using server system 4, in further detail. The various components of WECAP system 10 may be implemented using software, hardware, firmware, or in any other suitable manner, in any suitable combination. In one embodiment, a user may use an associated client system 3 to log on to an enterprise server 11 using an electronic security system 12, which may include one or more firewalls designed to protect the resources of WECAP system 10 from unauthorized access. The user may log on, for example, using an associated user name and password. Security system 12 may set a "cookie" or other message on client system 3. An electronic directory system 13 may be used to verify the user's logon information and also possibly the role and/or status of the user within an associated business. For example, the user might be a subscriber, a customer, a full-time, part-time, or contract employee, or may have any other role and/or status. Directory system 13 may include or be associated with a directory containing such information and supporting Lightweight Directory Access Protocol (LDAP). Although the components of WECAP system 10 are described in the context of a single user, in one embodiment WECAP system 10 may interact with multiple users concurrently or in any other suitable manner.

After the user has successfully logged on to enterprise server 11, a client applet 14 may be downloaded for operation on client system 3. Although client applet 14 is primarily described, the present invention contemplates any one or more suitable software components replacing or combining with client applet 14 depending on the particular implementation. The present invention is meant to encompass all such implementations. Client applet 14 may be able to perform any tasks associated with procurement of items, and associated parametric, textual, or a combination or parametric and textual searching, preferably independent of server system 4. For example, this may mean that client applet 14 interacts with client system 3 and its user without communicating any, or at least some, information back to enterprise server 11 of server system 4. In association with the downloading of client applet 14, one or more program components 33 may also be downloaded for operation on client system 3, providing the ability to install suitable graphical user interface (GUI) components on client system 3. An intelligent caching component 16 may allow more efficient downloading of client applet 14 and/or program components 15 to client system 3 in some situations.

In searching one or more catalogs for items, WECAP system 10 may use one or more appropriate search engines 17 capable of performing parametric, textual, or combined parametric and textual searching according to particular needs. Search engines 17 may include an intelligent text search engine designed specifically for textual searching and providing language translation, phonology, thesaurus, and other capabilities. For example, using the global search module described below, a user may input a string textual type search for an item across one or more internal and/or external catalogs. Depending on the location and nature of the catalogs, capabilities such as these may be desirable.

When a user selects an item from a displayed list of search results, one or more images relating to the item may be retrieved from an image cache 18. In one embodiment, all such images are stored using image cache 18 for fast and efficient retrieval in response to user selection. A scheduled batch interface may be used to keep the images stored in image cache 18 synchronized with the latest versions of these images stored more permanently, such as on a mainframe computer associated with server system 4.

WECAP system 10 may store certain data for subsequent ordering of items searched. This may include, for example, data concerning users, their one or more associated businesses, and the one or more catalogs of items available for searching and from which items can be ordered (internally and/or externally). As a particular example, when an item is being ordered, it may be necessary to retrieve a telephone number for the user, an accounting distribution list, and a facility code to which the order will be charged. Enterprise server 11 may be coupled to one or more relational or other appropriate databases 19 containing such information. In one embodiment, as a user searches one or more internal and/or external catalogs, such as a catalog stored in database 6, appropriate data may be extracted from database 6 and/or database 19. Enterprise server 11 may extract data using data extraction technology such as ORACLE TRANSPARENT GATEWAY or in any other appropriate manner. If the user wishes to place an order for a item selected from the search results, WECAP system 10 may initiate a predefined stored procedure to purchasing system 20, for example, if the item is available from a catalog of an external manufacturer, supplier, or other entity. If selection of the item requires a shop floor disbursement (i.e. disbursement of an item in existing inventory of the business associated with the user), then WECAP system 10 may instead initiate a predefined stored procedure to inventory system 21. The present invention contemplates ordering items from various sources using any appropriate techniques, whether or not described herein.

Although WECAP system 10 is described as including particular components and functions, those skilled in the art will appreciate that the present invention may be practiced using some, all, or none of these components and functions, depending on the implementation and particular needs.

In general, a database may contain a set of tables containing data. A relational database may include multiple tables logically connected to one another through a series of relationships such that each table reflects a corresponding part of the real world. If tables within a database are not well-organized, a user might be required to enter, update, or delete identical data in multiple tables in the database to ensure that the database maintains its integrity. Poorly organized databases may take relatively long times to retrieve or summarize data in response to requests from a user. In one embodiment, the table structure of the present invention reduces or eliminates these problems, as described more fully below with reference to FIGS. 3A–3C.

In general, each table in a relational database contains its own columns and rows and should ideally represent a single thing. Each column (also referred to as a field or member data field) corresponds to a particular attribute of the thing the table represents. For instance, if a table in a database describes a bolt, one column might correspond to a "material" attribute, another column might correspond to a "length" attribute, and so on. When a table is created, its columns generally must be defined first. Otherwise it is unknown where any data that a user wants to input should be stored or how the data will be organized. Once a table has columns, it needs rows. Each row corresponds to a particular item and may contain a specific value for each attribute of the item. For instance, a particular bolt might have attribute values of "steel" and "25 mm" for "material" and "length" attributes. In a relational database, each row of a table should be unique and should correspond to one and only one particular item.

In general, each table in a relational database will also contain a key. A key is a column or set of columns in a table that uniquely identifies rows in the table. A key is useful because it eliminates ambiguity regarding individual rows and allows for faster retrieval of data. A key that has just one column must have each entry in that column different from every other entry in that column. An example would be a list of all United States citizens with Social Security Numbers. Since all such citizens have Social Security Numbers, and each Social Security Number is different from every other Social Security Number, a column of Social Security Numbers may be a suitable key for the table because each number in the Social Security Column would correspond to one and only one citizen. In the situation of multiple columned keys, the combination of the two or more entries for each row in the columns forming the key must uniquely identify each row. There are two different kinds of keys used in relational databases; primary and foreign.

A primary key contains a value that is unique among all the rows in its table. If the primary key of a table is known, any particular row in that table can be found, no matter what size. Without a primary key, a table might be like a card catalog in a library that was unsorted. All of the information would be there, but it might take a relatively long time to find it. A foreign key is a key that is the primary key of a different table than the table containing the foreign key. For instance, if a first table has a "Social Security Number" primary key, and a second table has an "Order ID" primary key (corresponding to each order placed by a particular user), and the second table has a column containing Social Security Numbers corresponding to each order, then the Social Security Number column would be a foreign key of the second table. The purpose of a foreign key is to relate one table to another table in a meaningful way, such that either table is able to access all of the information stored in the other table without repeating data from either table other than the foreign key.

The relationship between two tables may be of three different types: one-to-one, one-to-many, and many-to-many. A one-to-one relationship exists when every row in a first table corresponds to exactly one row in a second table.

For instance, one table might involve customer data (i.e., name and address) with a primary key of customers' Social Security Number. A second table might include a list of each customer's most recent order, with each order corresponding to the Social Security Number of the associated customer. Each customer can only have one most recent order, and each most recent order can only be placed by one customer. Thus there is a one-to-one relationship between the first and second tables. Often, the primary keys in a one-to-one relationship of tables will be the same.

In a one-to-many relationship, for each row in a first table there corresponds either zero, one, or multiple rows in a second table, but for each row in the second table there corresponds only one row in the first table. For instance, each customer in the customer data table discussed above may have used zero, one, or multiple credit cards to pay for the customer's orders. If a table described payment options for a customer, each customer's row in the customer data table would correspond to either zero, one, or multiple rows in the payment options table. A person could pay with one credit card one time, then pay with another credit card another time. Since each credit card corresponds with only one customer, but one customer may use multiple credit cards, these tables would be in a one-to-many relationship.

In a many-to-many relationship, each row in a first table may correspond to multiple rows in a second table, and each row in the second table may correspond to multiple rows in the first table. For instance, if a table contained multiple different kinds of bolts sold, where the primary key of the bolt table is a unique number for each bolt, then the relationship of a customer table to the hammer table would be many-to-many. Since each customer may buy multiple different kinds of hammers, and each kind of hammer may be bought by many different customers, these tables would be in a many-to-many relationship.

Database integrity is typically very important. Entity integrity requires that none of the rows in a primary key column contain missing data. The reason behind this is that if an entry in a primary key column is missing, the system will not be able to uniquely identify a particular row, thus defeating a major purpose of a relational database and primary keys. The rule applies to multiple columned primary keys as well. Referential integrity requires that a database must not contain any unmatched foreign key values. Enforcement of this rule prevents a user from adding or deleting data in a table without making sure that the proper relationship with the foreign key table is preserved. Otherwise values entered into a table might not correspond with values in another table, even though the tables have a one-to-one, one-to-many, or many-to-many relationship. Preserving each type of integrity in a relational database is desirable to maintain the proper relationships between tables and to ensure fast, reliable, and efficient retrieval of data.

Figure 3B:
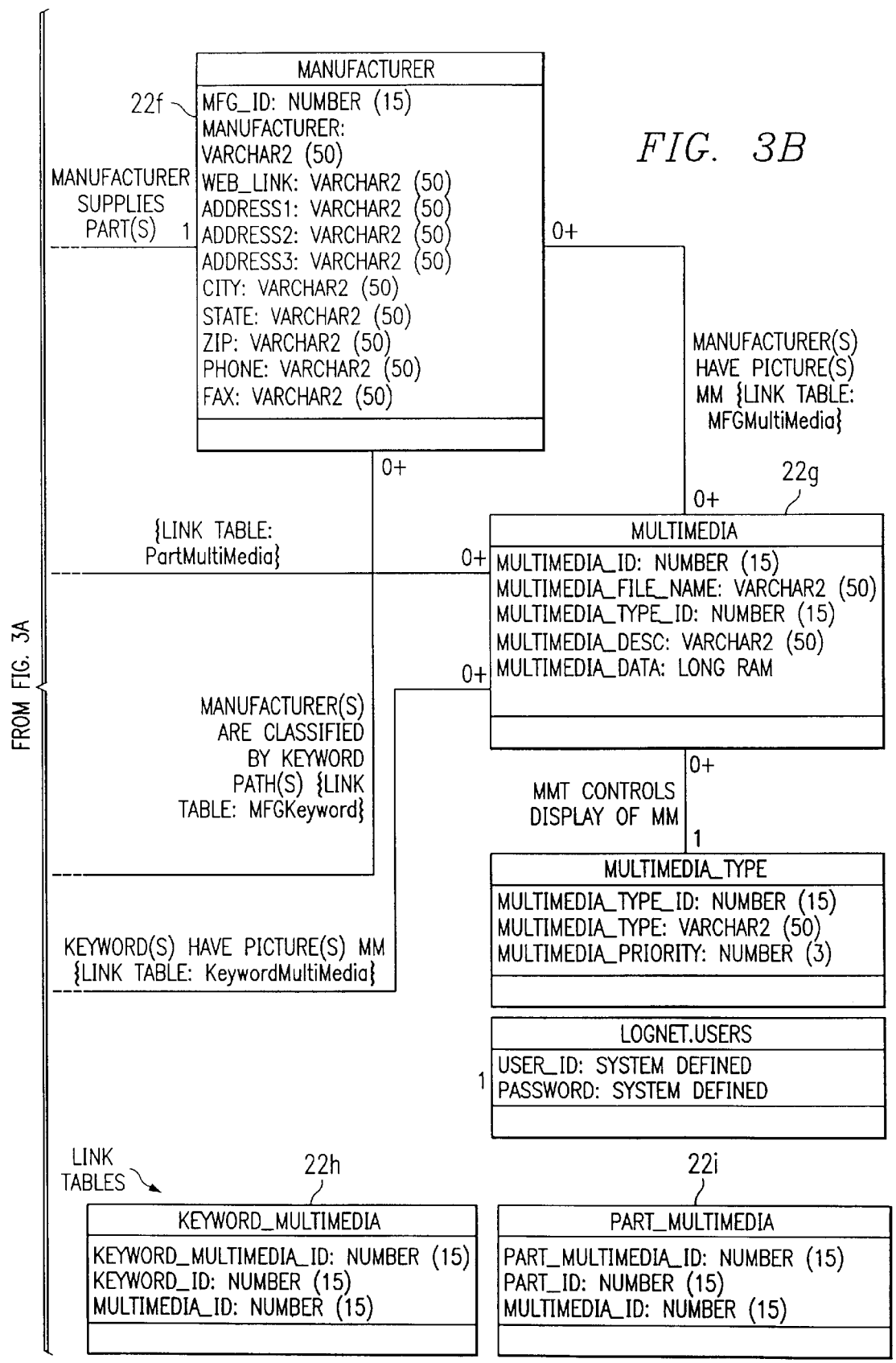

In one embodiment, database 6 and any other data storage location at which one or more catalogs may be stored are organized using the table structure illustrated in FIGS. 3A–3C or portions thereof. This may allow parametric searching on WECAP system 10 to be accomplished in a relatively fast and efficient manner, particularly where large catalogs of one or more large entities are to be searched. In the preferred embodiment of the invention, there are five tables in database 6: (1) a keyword table 22a that allows WECAP system 10 to construct a keyword tree structure for selection of a keyword, (2) a characteristic table 22b containing names for attributes; (3) a keyword_char table 22c that contains data used in generating a parametric interface relating to a keyword, preferably involving all the one or more attributes relating to the keyword; (4) a parts table 22d containing item numbers of particular items; and (5) a part_char table 22e that contains, for each particular item, the attribute values for each attribute of the item. Keyword_char table 22c is related to keyword table 22a in a one-to-many relationship and related to characteristic table 22b in a one-to-many relationship. Parts table 22d is related to keyword table 22a in a one-to-many relationship. Part_char table 22e is related to keyword table 22a in a one-to-many relationship, related to parts table 22d in a one-to-many relationship, and also to characteristic table 22b in a one-to-many relationship. As these table names and FIGS. 3A–3C may imply, the terms "attribute" and "characteristic" may be used interchangeably. The terms "item" and "part" may also be used interchangeably, though the invention contemplates any suitable items other than parts. Although these tables are provided in the preferred embodiment of the invention, other embodiments of the invention may provide fewer or additional tables according to particular needs.

Database 6 may contain a manufacturer table 22f containing information about a particular manufacturer. Manufacturer table 22f would be related to part_char table 22e in a one-to-many relationship and related to parts table 22d in a one-to-many relationship. Database 6 might contain a multimedia table 22g containing information about a particular multimedia type related to a keyword or item. If so, database 6 may also contain keyword_multimedia table 22h and/or part_multimedia table 22i to enable the keyword and multimedia tables 22a and 22g, respectively, to be related in a many-to-many relationship and enable the parts and multimedia tables 22d and 22g, respectively, to be related in a many-to-many relationship, respectively. Database 6 may contain a mfg_keyword table 22k to enable the keyword and manufacturer tables 22a and 22f, respectively, to be related in a many-to-many relationship. Other tables may be included in database 6 without departing from the intended scope of the present invention.

In general, keyword table 22a is used to store information regarding keywords and aid in the construction of a keyword tree structure described more fully below. As just an example, if the name of a particular item is DRILL/CARBIDE/SOLID OR TIPPED/MF2042, then DRILL, CARBIDE, SOLID OR TIPPED, or MF2042, or any combinations of them, may each have a corresponding row in keyword table 22a. In one embodiment, each keyword row becomes a branch of the keyword selection tree structure (having a corresponding folder). Keyword table 22a may contain a number of fields. A keyword_id field may contain a unique number corresponding to each keyword. Thus the keyword_id field may be the primary key of keyword table 22a. The keyword field may contain text strings that are used as the names of the keywords. In the above example, the text "DRILL" or "CARBIDE" might be stored in this field. A parent_keyword_id field may contain a number associated with the keyword_id of the folder of the keyword tree structure in which the current keyword is contained. In the example, the CARBIDE keyword may have the keyword_id of the DRILL keyword in this field. The DRILL keyword, on the other hand, has no parent, such that its parent_keyword_id field might contain the number zero. A keyword_path field may contain the path of keywords in the keyword tree structure leading up to the current keyword. In the example, the SOLID OR TIPPED keyword might have DRILL/CARBIDE/SOLID OR TIPPED in its keyword_path field. A last_in_chain field may contain either a "Y" or "N" depending on whether or not the current keyword it is the last keyword in a name. In the example, given the name DRILL/CARBIDE/SOLID OR TIPPED/MF2042, the MF2042 keyword may contain a "Y" in its last_in_chain field, while the CARBIDE keyword might contain an "N". Keyword table 22a may contain a multimedia field that contains either a "Y" or "N" depending on whether a multimedia image relating to the keyword may be displayed. More or fewer fields may be included in keyword table 22a as appropriate.

In general, characteristic table 22b is used to store information regarding the names of certain (preferably all) attributes that exist in database 6. For example, material, length, and other attributes would each have an associated row within the characteristic table 22b. A char_id field may contain a unique number corresponding to each attribute. Thus the char_id field may be the primary key of this table. A characteristic field may contain a text string that is used for the name of an attribute. For example, the text "material" or "length" might be stored in this field. A numeric field is used to determine whether the attribute has attribute values that would be numbers, as opposed to text, and may contain a "Y" if so or an "N" if not. Thus, the characteristic table row associated with a material attribute would likely have an "N" in its numeric field, while the characteristic table row associated with a length attribute would likely have a "Y" in the numeric field. More or fewer fields may be included in the table as appropriate.

In general, parts table 22d is used to store information regarding items, with each item having a corresponding row. A part_id field may contain a unique number corresponding to each item. Thus the part_id field may be the primary key of this table. A part_number field may contain the number that the item is given from the manufacturer. Different items might possibly have the same number since different manufacturers may assign numbers to their items independently of one another. A keyword_id field may contain the keyword_id associated with the item. This field is thus a foreign key of this table, relating parts table 22d to keyword table 22a in a one-to-many relationship. Each keyword is associated with zero, one, or multiple items, but each item is associated with only a single keyword. A price field may contain the price of the associated item. A part_desc field may contain a text description of the associated item. It could also be used to further describe the item, warn the user about an item, or give the user information that is not well conveyed using attributes and attribute values (e.g., "wears down quickly"). A unit_of_measure field identifies the unit of measure used to describe the item (e.g., feet, inches, centimeters, degrees, etc.). A bulk field may contain information about the quantity in which an item is sold. For instance, for a box of 250 nails the bulk field would contain 250. An SKU (stock keeping unit) field may contain the SKU of the item. A location field may contain data about where the item may be found within a business associated with server system 4. Thus, if the kind of nail a user wanted was normally stored in warehouses in Trenton, Boston, and Dallas, the location field may contain the text "Trenton warehouse", "Boston warehouse," and/or "Dallas warehouse." A mfg_id field may be the primary key of a manufacturer table 22f described below, and thus a foreign key for parts table 22d. Parts table 22d may correspond to manufacturer table 22f in a one-to-many relationship. Each manufacturer can have zero, one, or many items, but each item can only have one manufacturer. More or fewer fields may be included in the table as appropriate.

In general, keyword_char table 22c is used to store information about attribute values, each row contain the attribute values of a corresponding attribute common to all items associated with one name. Thus, for the name DRILL/CARBIDE/SOLID OR TIPPED/MF2042, all attribute values of a length attribute common to all items associated with that name may be stored in a row of keyword_char table 22c. A keyword_char_id field may contain a unique number associated with each keyword and may be the primary key of this table. A char_valid_values field may contain all attribute values of one attribute common to all items associated with one keyword. Thus a list of numbers or text that are the attribute values for a particular keyword and attribute may be stored in this field. Thus, in one embodiment, this field contains all the "valid" attribute values already in database 6 which a user wants to search. This field may contribute to significant time savings in parametric searching of database 6, since the entire part_char table 22e (described below) need not be searched to obtain the valid attribute values. A keyword_id field may contain the keyword_id with which the attribute values are associated and is a foreign key of the table, relating the table to keyword table 22a in a one-to-many relationship. Each keyword is associated with zero, one, or multiple keyword_chars, but each keyword_char is associated with only one keyword. A char_id field contains the char_id with which these attribute values are associated and is a foreign key of this table, relating this table to the characteristic table 22b in a one-to-many relationship. Each attribute is associated with zero, one, or multiple keyword_chars, while each keyword_char is associated with only one attribute. More or fewer fields may be included in the table as appropriate, according to particular needs.

In a part_char table 22e, each row may contain the attribute values of a particular item. A part_char_id field may contain a unique number associated with each of the attribute values. Thus the part_char_id field may be the primary key of this table. A part_id field may contain the part_id with which an attribute value is associated. The part_id field is thus a foreign key of this table and may relate parts table 22d to the part_char table 22e in a one-to-many relationship. Each item is associated with zero, one, or many attribute values, but each attribute value may be associated with only one item. A char_id field contains the char_id with which an attribute value is associated. The char_id field is a foreign key of this table and may relate part_char table 22e to characteristic table 22b in a one-to-many relationship. Each of the attributes is associated with zero, one, or multiple attribute values, while each attribute value may be associated with only one attribute. A char_value field contains the attribute values of an attribute. For example, the actual length of an item (e.g., 2") might be stored in this field. A characteristic field contains the name of the attribute for that attribute value that is to be displayed for a particular item. This may provide more freedom, since it may be desirable to display a full name for an attribute to reduce confusion. For instance, different lengths might be stored in database 6 as "t_len" and "h_len." This may not be an issue if two corresponding attribute values are not commonly displayed together. If they are commonly displayed together, however, it may be desirable to change the data in the characteristic field to "Total Length" and "Head Length" to avoid any potential confusion. A keyword_id field may contain the keyword_id with which an attribute value is associated. This is a foreign key of part_char table 22e and may relate keyword table 22a to part_char table 22e in a one-to-many relationship. Each keyword is associated with zero, one, or multiple attribute values, but each attribute value may be associated with only one keyword.

Still other fields of part_char table 22e may include a char_ordinal field used to determine the order in which an attribute will be displayed to a user. In a particular embodiment, the lower the number in this field, the further toward the top of the display the attribute will be displayed. For example, if the char_ordinal field contains the numeral "3," the attribute value equals "10," and the characteristic field contains "Length", then "Length 10" might be displayed in the third position from the top of the display. This field provides a degree of customizability, allowing the information for an item to be displayed in a more readily interpretable manner. A mfg_id field contains the mfg_id with which an attribute value is associated. The mfg_id field is a foreign key of this table and may relate manufacturer table 22f to part_char table 22e in a one-to-many relationship. Each manufacturer is associated with zero, one, or many attribute values, but each attribute value may be associated with only a single manufacturer. A conversion field is used to instruct WECAP system 10 as to what conversion algorithm to apply to the char_value field in that particular row. In one embodiment, one or more conversions would be known within WECAP system 10 and might be specified as MM, IN, NA, or DA corresponding to millimeter, inch, none, or diametrical pitch conversions, respectively. This field may allow WECAP system 10 to know what units an attribute value is entered in. More or fewer fields may be included in the table as appropriate.

In a manufacturer table 22f, each row may contain all appropriate information for a particular manufacturer. A mfg_id field contains a unique number associated with each manufacturer and may thus be the primary key of this table. A manufacturer field may contain a text string used for the name of a manufacturer. For instance, if the manufacturer is ABC Corp., the text "ABC Corp." may be stored in this field. A web_link field may contain the Uniform Resource Location (URL) or other electronic address of the manufacturer. Thus, in the example, "http://www.abccorp.com" might be stored in this field. The address1, address2, address3 fields may contain a street address of the manufacturer. More or fewer address fields may be used. The city, state, and zip fields may contain the city, state, and zip codes of the manufacturer, respectively. The phone and fax fields may contain the telephone number and fax number of the manufacturer, respectively. More or fewer fields may be included in the table as appropriate.

A multimedia table 22g may be used to store a location and a name of multimedia associated with keywords, items, or manufacturers. A multimedia_id field may be used to store a unique number for each individual piece of multimedia and may thus be the primary key of this table. A multimedia_file_name field may contain the name of a file in which a piece of multimedia is stored. A multimedia_type_id field may contain a number that corresponds to the type of multimedia a file contains. Thus, for example, for a sound file the multimedia_type_id might be "1" while for a video file the multimedia_type_id might be "2." A multimedia_desc field may be used to store a description about a particular piece of multimedia that could be displayed in the same display as the multimedia itself. A multimedia_data field may store the actual data comprising the multimedia. More or fewer fields may be included in the table as appropriate.

A keyword_multimedia table 22h may be used to combine the keyword and multimedia tables 22a and 22g, respectively, within a many-to-many relationship. Each keyword may be associated with multiple multimedia files, and each multimedia file may be associated with multiple different keywords. A keyword_multimedia_id field may contain a unique number corresponding to a unique combination of keyword and multimedia. The keyword_multimedia_id field may be the primary key of this table. A keyword_id field may contain the keyword_id with which the keyword_multimedia_id is associated. The keyword_id field is a foreign key of this table and relates keyword table 22a to keyword_multimedia table 22h in a one-to-many relationship. Each keyword is associated with zero, one, or many keyword_multimedia_ids, but each keyword_multimedia_id may be associated with only one keyword. A multimedia_id field may contain the multimedia_id with which the keyword_multimedia_id is associated. This is thus a foreign key of this table and relates multimedia table 22g to keyword_multimedia table 22h in a one-to-many relationship. Each piece of multimedia is associated with zero, one, or multiple keyword_multimedia_ids but each keyword multimedia_id may be associated with only one piece of multimedia. More or fewer fields may be included in the table as appropriate.

A part_multimedia table 22i may be used to combine the parts and multimedia tables 22d and 22g, respectively, in a many-to-many relationship. Each item can have multiple multimedia files associated with it, and each multimedia file can be associated with many different items. A part_multimedia_id field may contain a unique number corresponding to a unique combination of an item and multimedia. Thus the part_multimedia_id field is the primary key of this table. A part_id field may contain the part_id with which the part_multimedia_id is associated. The part_id field is a foreign key of this table and relates parts table 22d to part_multimedia table 22i in a one-to-many relationship. Each item is associated with zero, one, or multiple part_multimedia_ids, but each part_multimedia_id is associated with only one item. A multimedia_id field may contain the multimedia_id with which the part_multimedia_id is associated. The multimedia_id field is a foreign key of this table and relates multimedia table 22g to part_multimedia table 22i in a one-to-many relationship. Each piece of multimedia is associated with zero, one, or many part_multimedia_ids, but each part_multimedia_id is associated with only a single piece of multimedia. More or fewer fields may be included in the table as appropriate.

A mfg_multimedia table 22j may be used to combine the manufacturer and multimedia tables 22g and 22g, respectively, within a many-to-many relationship. Each manufacturer may be associated with multiple multimedia files, and each multimedia file may be associated with multiple different manufacturers. A mfg_multimedia_id field may contain a unique number corresponding to a unique combination of manufacturer and multimedia. The mfg_multimedia_id field may be the primary key of this table. A mfg_id field may contain the mfg_id with which the mfg_multimedia_id is associated. The mfg_id field is a foreign key of this table and relates manufacturer table 22f to the mfg_multimedia table 22j in a one-to-many relationship. Each manufacturer is associated with zero, one, or many mfg_multimedia_ids, but each mfg_multimedia_id may be associated with only one manufacturer. A multimedia_id field may contain the multimedia_id with which the mfg_multimedia_id is associated. This is thus a foreign key of this table and relates multimedia table 22g to mfg_multimedia table 22h in a one-to-many relationship. Each piece of multimedia is associated with zero, one, or multiple mfg_multimedia_ids, but each mfg_multimedia id may be associated with only one piece of multimedia. More or fewer fields may be included in the table as appropriate.

A mfg_keyword table 22k may be used to combine keyword and manufacturer tables 22a and 22f, respectively, in a many-to-many relationship. Each keyword may be associated with many manufacturers, and each manufacturer may be associated with many keywords. A mfg_keyword_id field might contains a unique number corresponding to a unique combination of keyword and manufacturer. Thus the mfg_keyword_id field is the primary key of this table. A keyword_id field may contain the keyword_id with which the mfg_keyword_id is associated. The keyword_id field is a foreign key of this table and relates keyword table 22a to mfg_keyword table 22k in a one-to-many relationship. Each keyword is associated with zero, one, or many mfg_keyword_ids, but each mfg_keyword_id is associated with only one keyword. A mfg_id field contains the mfg_id with which the mfg_keyword_id is associated. The mfg_id field is a foreign key of this table and relates the manufacturer table 22f to the mfg_keyword table 22k in a one-to-many relationship. Each manufacturer is associated with zero, one, or multiple mfg_keyword_ids, but each mfg_keyword_id is associated with only a single manufacturer. More or fewer fields may be included in the table according to particular needs.

Figure 4A:
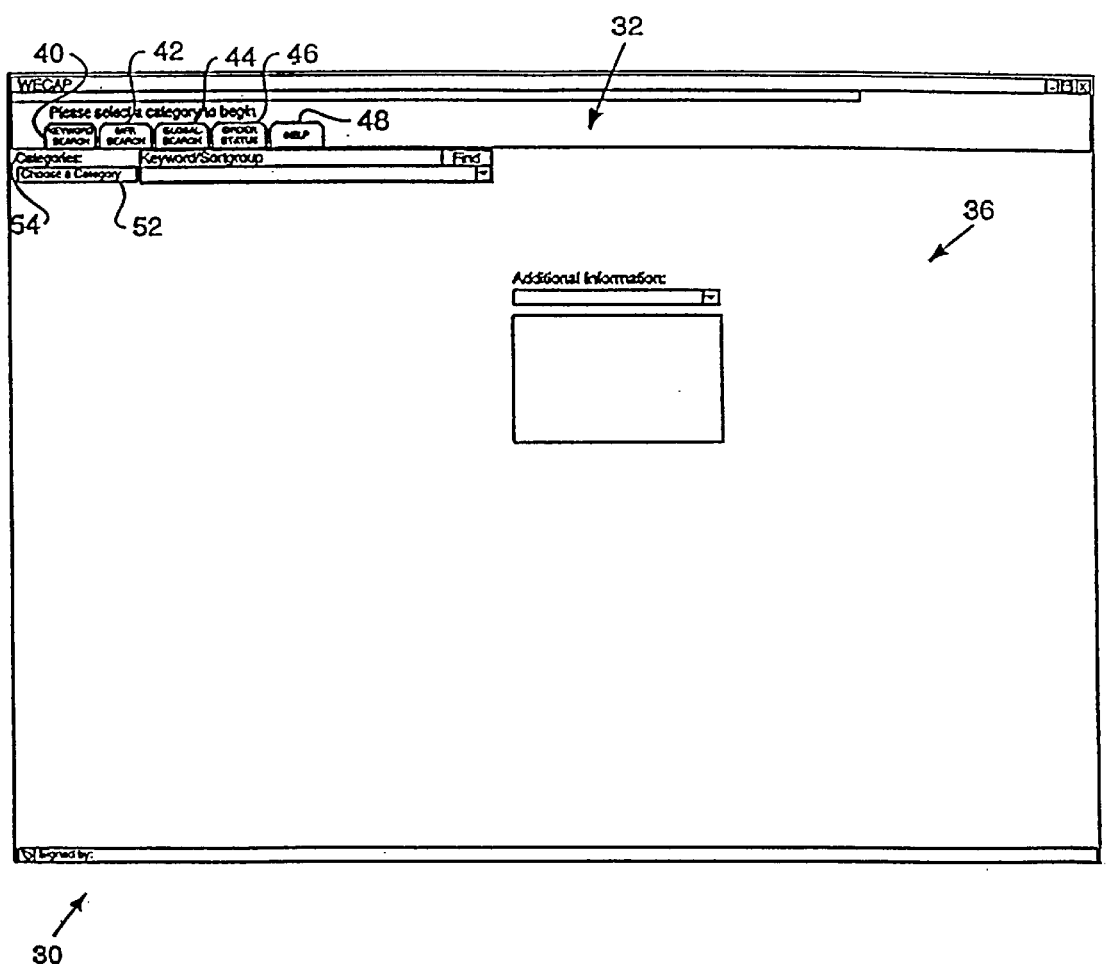
FIGS. 4A–4B illustrate an example initial display for a keyword search module and an example display for selection of a keyword category, respectively.
Figure 4B:
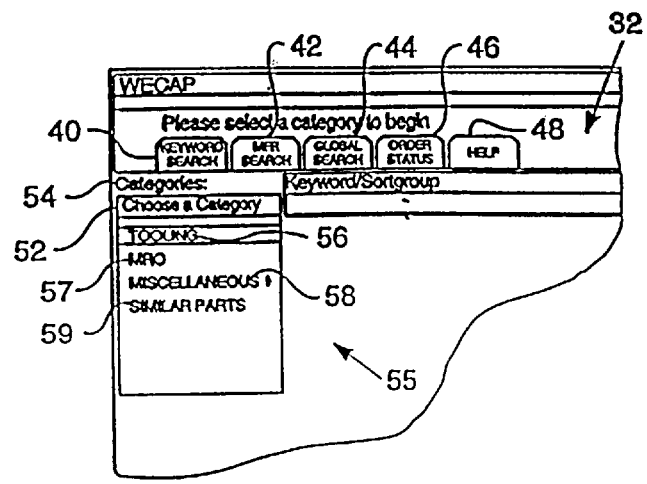

FIGS. 4A–4B illustrate an example initial display for a keyword search module and an example display for selection of a keyword category, respectively. Referring to FIG. 4A, in one embodiment, display 30 is presented to the user in response to the user properly logging on to WECAP system 10. Regardless of how displays are described and illustrated in particular embodiments, displays presented according to the present invention may use the user's entire browser window or any suitable portion thereof. Furthermore, these displays may be generated with one or more active frames, such as are indicated at 32 and 36 for the particular embodiment illustrated. In addition, displays may provide text in any suitable language and may be otherwise customized for a particular user or group of users.

In one embodiment, there may tabs across the top of display 30, one tab for each available module the user may choose to access. However, more or fewer tabs may be provided according to particular needs. Modules available to the user may include, without limitation, keyword search module 40, manufacturer search module 42, global search module 44, order status module 46, and help module 48. Particular examples of the manner in which the user may interact with one or more of these modules are described below. However, those skilled in the art will appreciate that the present invention is not meant to be limited to these particular examples and is meant to be limited only as set forth in the appended claims. Furthermore, although the following description will be organized for convenience according to modules, appropriate functionality associated with one module may replace or combine with suitable functionality of one or more other modules, depending on the implementation and particular needs.

Keyword Search Module

In one embodiment, keyword search module 40 appears in initial display 30 by default as the top module (such that it appears first as shown in FIG. 4A). However, a user may accept this default or may select another search module as the top module. The keyword search module 40 generates search results to enable a user to find one or more desired items. To begin, one or more categories or catalogs of items is selected using category selection box 52, as shown in FIG. 4A. The category selection box 52 preferably provides the user with access to two types of catalogs, without limitation. A first type, referred to as an internal catalog, contains information for items inventoried by the business, facility, or other entity associated with the user. A second type, referred to as an external catalog, contains information for items that are not inventoried by the associated entity and must thus be ordered from one or more other entities, such as from one or more manufacturers, suppliers, or other external entities. A different facility of the same entity with which the user is associated may be considered either external, with one or more external catalogs, or internal, with one or more internal catalogs, depending on the implementation and entity. The ordering process and associated displays presented to a user may vary according to whether items in a selected category or catalog are internal or external to the entity associated with the user.

As generally indicated at 55 in FIG. 4B, category selection box 52 may display a drop-down menu with one or more available categories or catalogs. As an example and without limitation, such categories may include TOOLING 56, MRO (Maintenance Repair Order) 57, MISCELLANEOUS 58, and SIMILAR PARTS 59. In this example, TOOLING 56 is associated with an internal catalog for items that have been machined or tooled, MRO 57 is associated with an internal catalog for items intended to support the associated entity, MISCELLANEOUS 58 is associated with a set of external catalogs of various external entities, and SIMILAR PARTS 59 is associated with a special internal catalog which is informational in nature. For example, SIMILAR PARTS 59 may be geared to aid engineers engaged in the design phase in learning about and searching for items that have already been approved to meet certain design requirements (e.g., dimension) for a product, such as a bolt for a vehicle for example. Flexibility as to the types of catalogs available for searching may provide an important technical advantage of the present invention and further enhance the multi-functional, efficient, and user-friendly nature of system 10.

After one or more catalogs have been selected, using category selection box 52, by default, or in some other manner, a keyword input field 62 and/or keyword selection tree 64 may be enabled. In general, keyword input field 62 and/or keyword selection tree 64 are used to specify one or more keywords that in turn specify a corresponding class of items in one or more appropriate catalogs. A keyword may include any suitable keyword path (i.e. any string of one or more names or other identifiers separated, for example, by back slashes). The user may specify a keyword using either keyword input field 62 or keyword selection tree 64. The keyword selection tree 64 can preferably be expanded as indicated at 65, each leaf of tree 64 containing a successively more specific name or other identifier. By navigating tree 64, a user may "construct" a keyword that reflects an appropriate level of specificity for the search. In one embodiment, keyword table 22a for this particular catalog is used to create keyword selection three 64. The keyword_path field may be used to sort the keywords into the proper alphabetical folder.

Figure 5A:
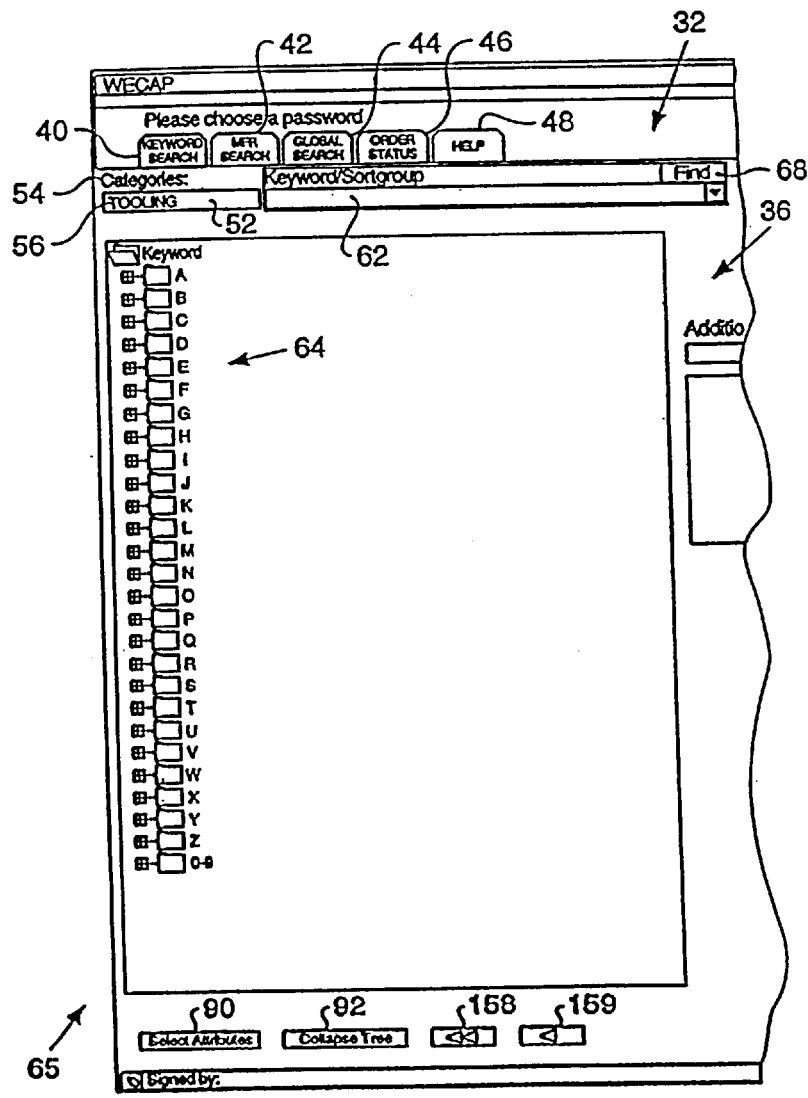
FIGS. 5A–5D illustrate example displays associated with specification of a keyword.
Figure 5B:
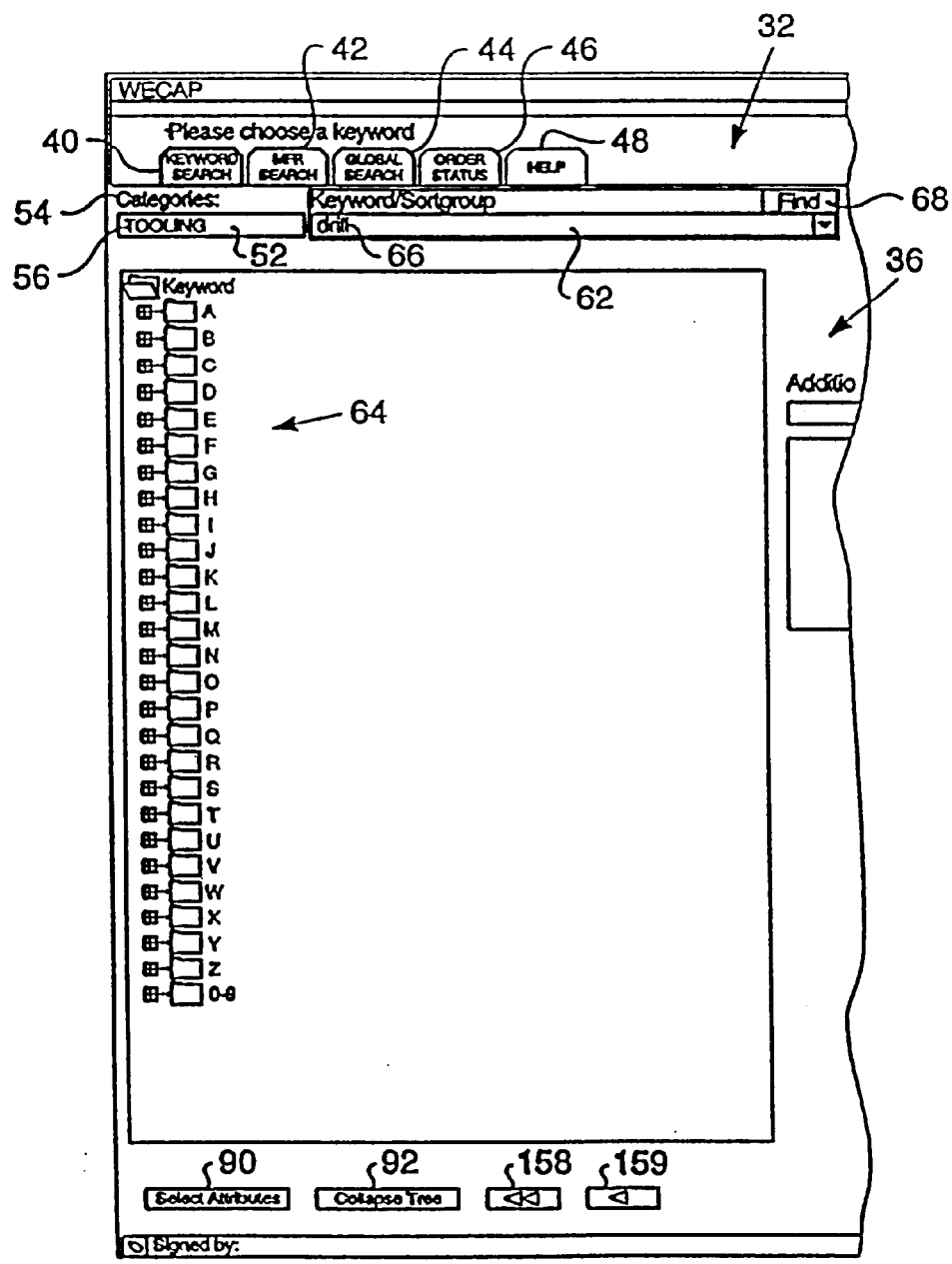
Figure 5C:
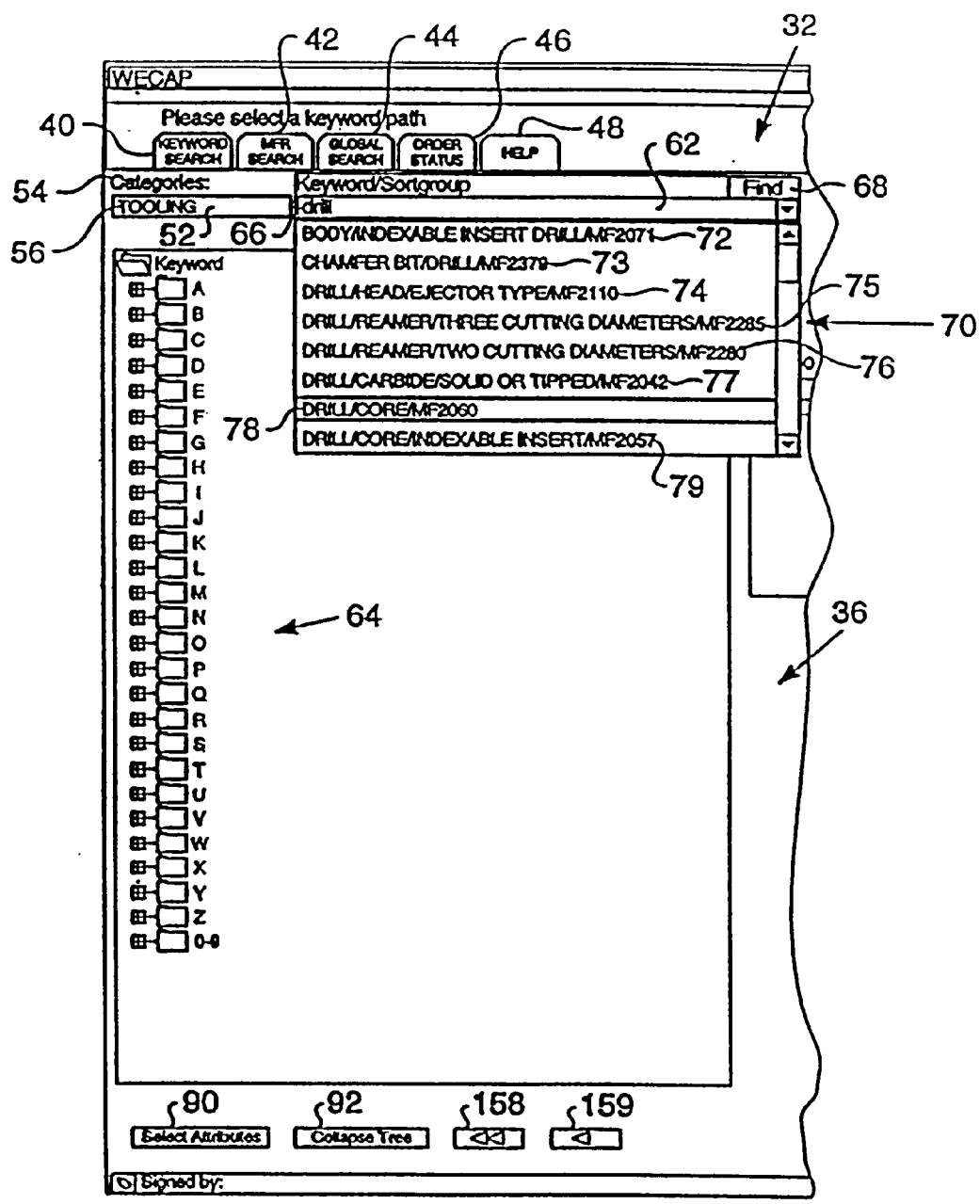

As shown in FIG. 5B, if the user enters a keyword in keyword input field 62, such as DRILL 66, and selects an enabled "Find" button 68, then as shown in FIG. 5C a scrollable drop-down keyword menu 70 may be displayed to the user containing one or more additional, more fully defined, keywords 72–79. Each such keyword will match the entered DRILL keyword 66 (i.e. has DRILL in its keyword path). These more fully defined keywords 72–79 may be located by searching the keyword_path fields of all entries in keyword table 22a for the keyword entered (in this case DRILL keyword 66). Each of the more fully defined keywords 72–79 is an entry in the keyword_path field in keyword table 22a. The user may select one keyword from the keyword menu 70, such as the DRILL/CARBIDE/

SOLID OR TIPPED/MF 2042 keyword 77. Thus, those skilled in the art will readily appreciate that the user may search by DRILL keyword 66 or DRILL/CARBIDE/SOLID OR TIPPED/MF 2042 keyword 77. The latter keyword 77 will more narrowly define the search for a desired item as described below. The selections in the drop-down keyword menu 70 may be best understood when read from the last keyword in the keyword path to the first. For example, DRILL/CARBIDE/SOLID OR TIPPED/MF 2042 may be read as "MF 2042 solid or tipped carbide drill."

Figure 5D:
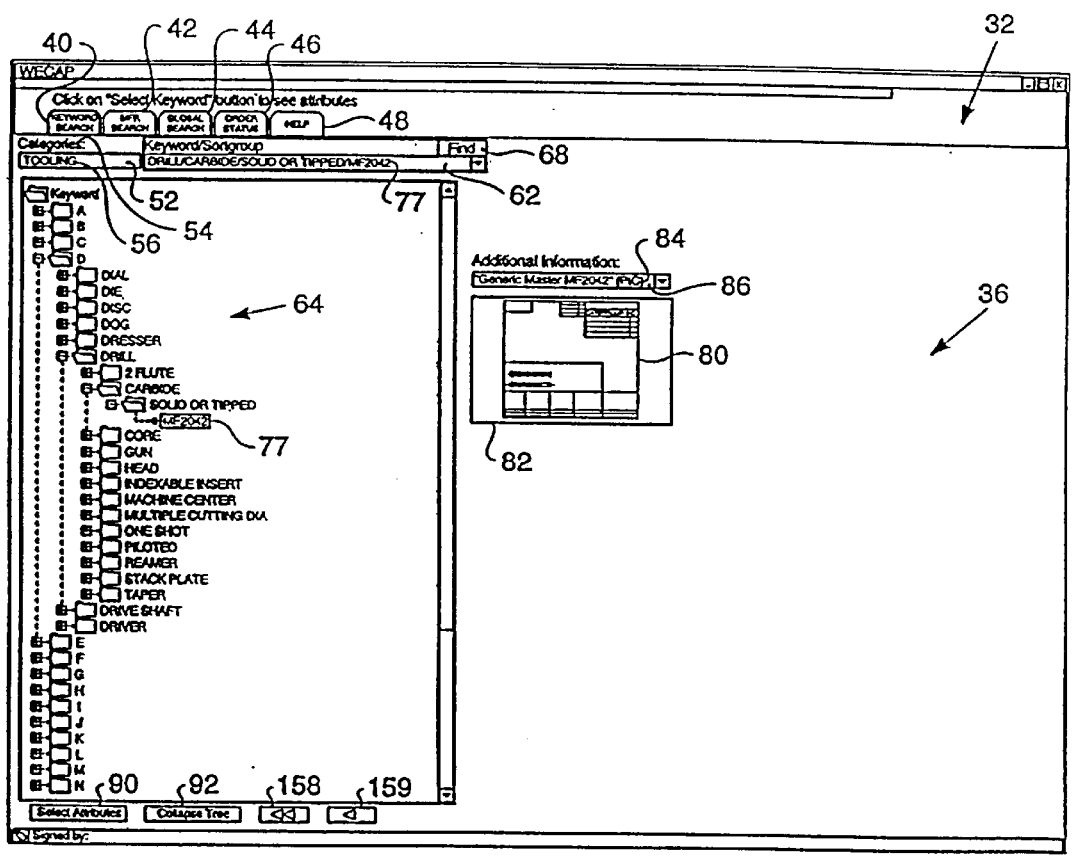
Figure 6A:
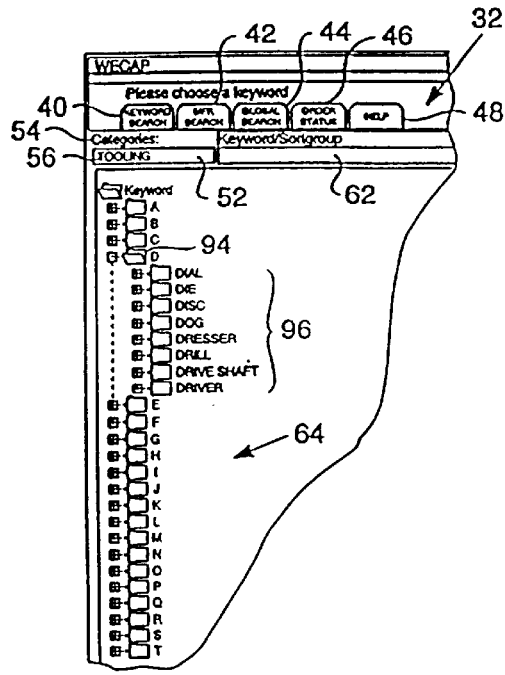
FIGS. 6A–6D illustrate example displays depicting a keyword selection tree.
Figure 6B:
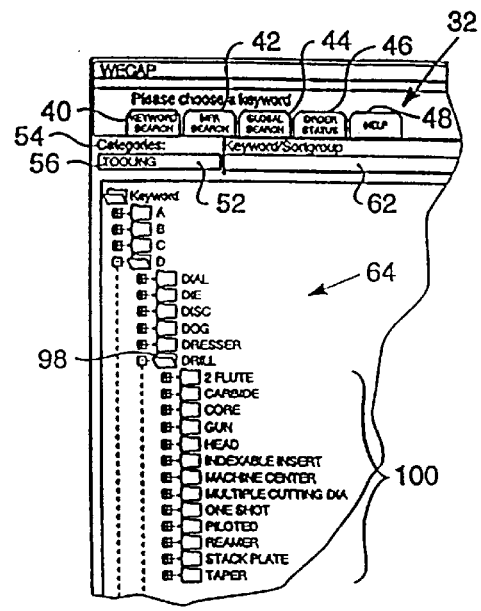
Figure 6C:
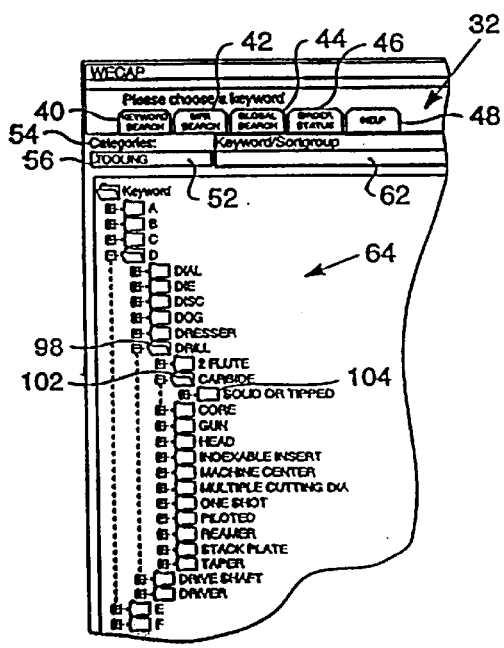
Figure 6D:
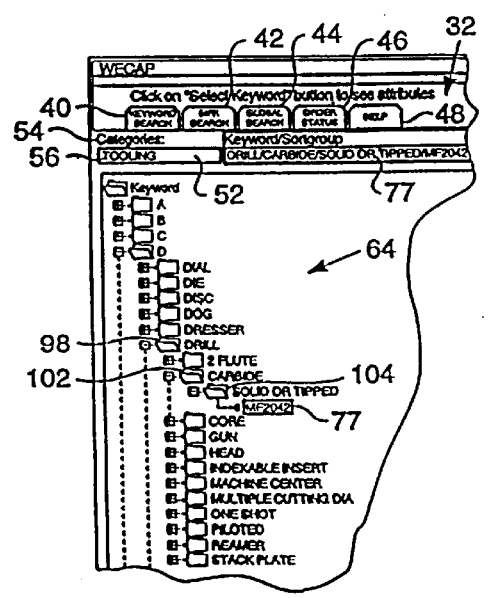

Selection of a particular keyword preferably causes several things to happen simultaneously. First, as shown in FIG. 5D, drop-down keyword menu 70 closes and the selected keyword 77 is displayed in keyword input field 62. Second, the keyword selection tree 64 automatically opens to the selected keyword 77. This may be achieved using the keyword_path, parent keyword_id, keyword_id, and keyword fields. Each keyword in selected keyword 77 then becomes a branch (or folder) of tree 64. Thus, in the illustrated example, DRILL, CARBIDE, SOLID OR TIPPED, and MF2042 are branches of tree 64. The parent_keyword_id is used to determine which branch to place a particular keyword in tree 64. Since DRILL keyword 66 has a parent_keyword_id of zero, it will be the first branch of tree 64. The CARBIDE keyword has a parent_keyword_id that is the keyword_id of DRILL keyword 66, and will thus be the next branch of tree 64. The SOLID OR TIPPED keyword has a parent_keyword_id that is the keyword_id of the CARBIDE keyword and will be the next branch of tree 64. MF2042 has a parent_keyword_id of the keyword_id of the SOLID OR TIPPED keyword, and also has a last_in_chain value of "Y". This means that the MF2042 is the last branch of tree 64 and thus will not be represented as a folder like the previous three keywords, as shown in FIG. 6D. In this manner, WECAP system 10 is able to properly structure keyword selection tree 64.

Third, as illustrated in FIG. 5D, an image 80 that illustrates descriptive information associated with the selected keyword 77 may appears in image window 82, for example, with a title or other information 84 in an "Additional Information" field 86. Image 80 may be located for selected keyword 77 using the multimedia_id in keyword_multimedia table 22h and multimedia_file_name field in multimedia table 22g. The information 84 in field 86 is stored in the multimedia_desc field of multimedia table 22g. Image 80 may be a blueprint, a photo (such as from a catalog), an illustration, a video, or any other visual information concerning the class of items corresponding to selected the keyword 77 that allows the user to verify the type of item to be searched for by keyword 77.

Figure 8A:
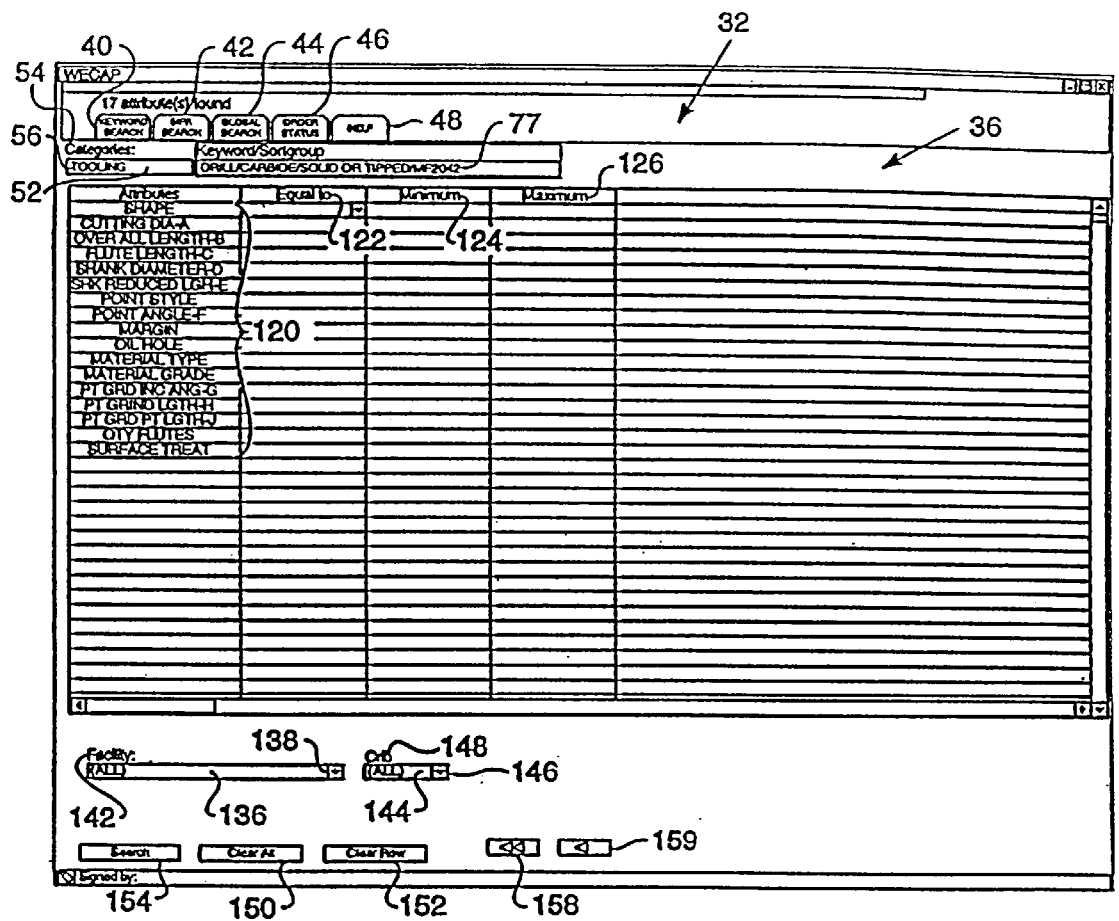
FIGS. 8A–8E illustrate example displays associated with specification of attribute values.

A "Select Attribute" button 90 may be enabled to allow the user to display all attributes relating to selected keyword 77 (as shown in FIG. 8A). Similarly, a "Collapse Tree" button 92 may be enabled for returning tree 64 to its original format for a new search. Back buttons 158 and 159, shown to the right of the "Collapse Tree" button 92 in this particular example, may allow the user to return to the first display associated with the current module and the immediately preceding display, respectively.

The result shown in FIG. 5D might alternatively be obtained by initially navigating keyword selection tree 64 rather than using keyword input field 62. The tables involved and the manner of using them may be the same as described above. As shown in FIGS. 6A–6D, the user may "drill-down" (i.e. recursively select a folder within another folder) until the user arrives at the desired keyword, which in this particular example is DRILL/CARBIDE/SOLID OR TIPPED/MF 2042 keyword 77. More specifically, as shown in FIG. 6A, on selection of the "D" folder 94, tree 64 may expand to display a list 96 of folders, all of which begin with the letter "D". As shown in FIG. 6B, the user may select DRILL folder 98 which further expands tree 64 to display a list 100 of folders for types of drills. Next, as shown in FIG. 6C, after selection of the CARBIDE folder 102, the SOLID OR TIPPED folder 104 may appear and, when selected, may expand to display its contents, which include keyword 77. When keyword 77 is selected, as shown in FIG. 6D, it will preferably also appear in keyword input field 62, as shown in FIG. 6D, resulting in a display identical to the display obtained using keyword input field 62 described above and shown in FIG. 5D.

Figure 7:
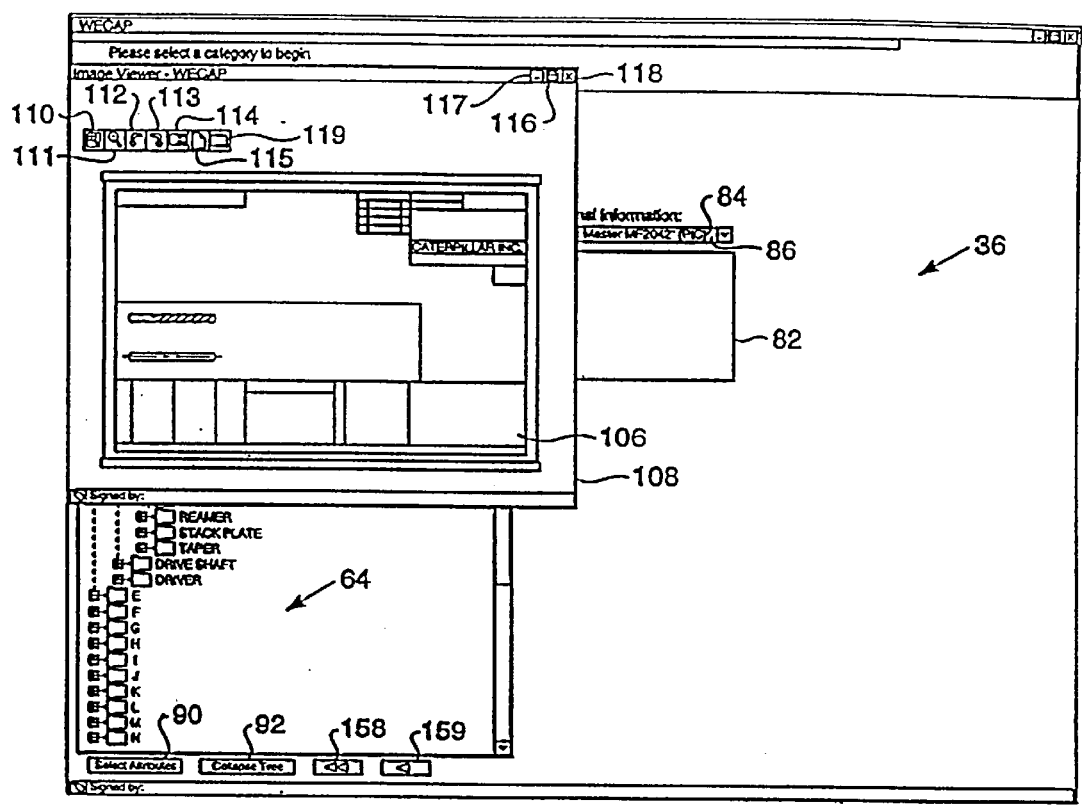
FIG. 7 illustrates an example display containing an image of an item.

Referring back to FIG. 5D, in one embodiment image window 82 may be made larger by selecting image 80. When selected, image 80 and window 82 may be scaled to the enlarged image 106 and window 108 illustrated in FIG. 7. Window 108 preferably allows for manipulation of image 80 using buttons 110–116, where in this example buttons 110 and 111 allow for zooming in and out, respectively, buttons 112 and 113 allow for rotating left and right, respectively, button 114 allows for inverting, button 115 allows for fitting the image 106 to the display, and button 116 allows for specific rectangular zooming in. More or fewer manipulable aspects may be provided according to particular needs. Window 108 may be enlarged for full display viewing or may be hidden using the maximize and minimize buttons 116 and 117, respectively. Selection of exit button 118 may cause image 106 to return to original image window 82, as shown in FIG. 5D.

Again referring to FIG. 7, image 106 may contain an image associated with selected keyword 77 and relating to the catalog the user is currently searching. In a particular embodiment, each searchable attribute associated with the selected keyword 77 is indicated in some manner within image 106. Further, image 106 will preferably show exactly what each attribute means in relation to keyword 77. Not only should this help eliminate confusion about the meaning of each attribute, but it may also allow different images to be created using attributes and/or attribute values for one or more particular entities. This may help to allow a user who is not familiar with a particular entity's attribute or attribute value terminology to search effectively despite this fact, because the proper terminology is clear from image 106.

Having verified, using image 106 or otherwise, that the correct item is in fact being sought, the user may choose "Select Attribute" button 90 to view a new display (as shown in FIG. 8A) to identify the particular attributes 120 corresponding to selected keyword 77. In one embodiment, this allows the user to enter one or more attribute values (i.e. a specific value for each attribute 120). In one embodiment, as described above, each name or other identifier in selected keyword 77 is associated with a set of one or more attributes 120, which are common to all the items to which the selected keyword 77 corresponds. Thus, as a user refines a search by adding names or other identifiers to construct a keyword path, additional attributes 120 may be added to the set for which the user may specify particular attribute values. For example, as shown in FIG. 8A, the attributes 120 associated with the DRILL keyword may be the first seven, from SHAPE through POINT STYLE. Attributes 120 associated with the CARBIDE keyword might be the next six, from POINT ANGLE-F through SURFACE TREAT. In one embodiment, the greater the number of names or other identifiers in a keyword, coupled with the attributes 120 associated with those names or other identifiers (to the extent that attribute values are entered therefor, as explained below), the more narrowly defined the search will be.

In one embodiment, upon presentation of the display shown in FIG. 8A, the selected keyword 77 will have been researched and all appropriate attributes 120 found and displayed for selected keyword 77. This may be done by searching the keyword_char table 22c using the keyword_id of keyword 77. The keyword_id may be used to return all char_ids associated with keyword 77 in keyword_char table 22c. Since each char_id corresponds to a particular attribute in characteristic table 22b, the WECAP system 10 is able to display a list of all attributes 120 for that particular keyword 77. This may provide another important technical advantage of the present invention. WECAP system 10 is preferably pre-programmed with every attribute associated with keyword 77 in its database 6 (keyword_char table 22c) and provides all such attributes to the user. The user may thus need to know nothing about what the attributes of a desired item are or what they are called. All the user may need to know (possibly after viewing the image 106) is what the values of the one or more desired attributes need to be to meet the user's needs. The user preferably has the freedom to specify as many or as few attribute values as needed. The more attribute values selected, the fewer items that will match the search query. Alternatively, the fewer attribute values selected, the more items that will match.

Figure 8B:
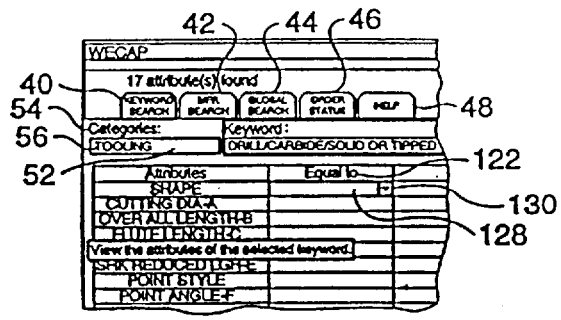
Figure 8C:
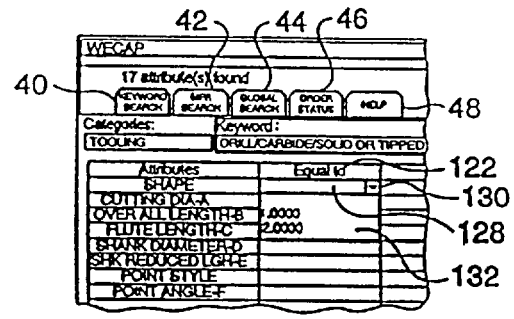
Figure 8D:
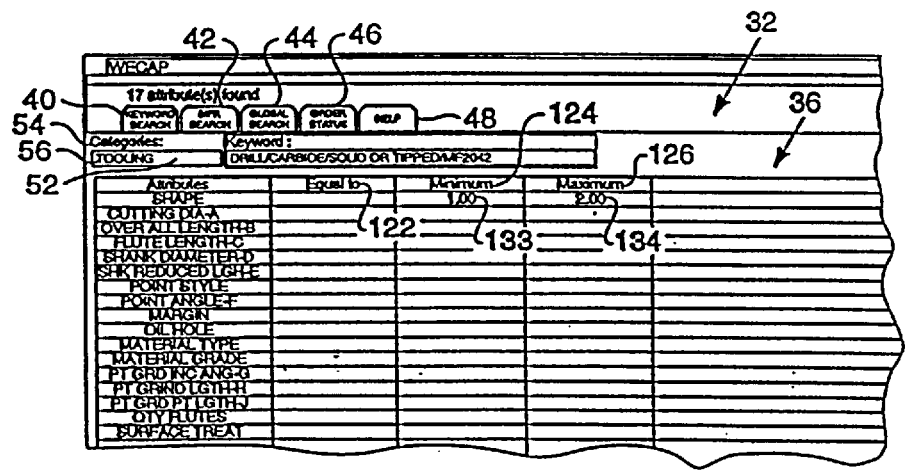

In one embodiment, as shown in FIG. 8A, for each attribute, an "Equal to" column 122, a "Minimum" column 124, and a "Maximum" column 126 are provided. More or fewer columns may be included as appropriate, such as "Greater than" and "Less than" columns for example. As shown in FIG. 8B, upon selection of an example cell 128 or arrow 130 in the "Equal to" 122 column, a pull-down selection menu 132 with all acceptable attribute values may appear, as illustrated in FIG. 8C. Pull-down selection menu 132 may be enabled using the char_valid_values field in keyword_char table 22c. Each char_valid_value cell contains a list of all valid attribute values (e.g., 1.000, 2.000, etc.) for the corresponding attribute (e.g., shape). In certain instances, it may be helpful for a user to specify, with pull-down selection menu 132, attribute values that are above a certain value, below a certain value, or between two certain values. To accommodate this need, the "Minimum" 124 and "Maximum" 126 may be provided to allow selection and entry of attribute values 133 and 134, respectively, as shown in FIG. 8D. Thus, using pull-down selection menu 132, the user can quickly determine whether an attribute value exists within database 6 for an attribute. If pull-down selection menu 132 does not reveal that attribute value, the user need not look further for an item having that attribute value—the user knows an item with that attribute value does not exist in the database 6. Not only may this save valuable time for the user, this may also reduce the number of searches that the WECAP system 10 is required to perform, thereby improving its performance. This may be yet another important technical advantage of the present invention.

Selection of one attribute value using a pull-down selection menu 132 for an attribute may dynamically eliminate other attribute values that would be presented within pull-down selection menus 132 for one or more other attributes. This may eliminate as options any items that do not have a required attribute value as selected using the first pull-down menu 132. Thus, the system is able to eliminate possible selections of items that do not exist in database 6 before an actual search is made. This may again save the user time and improve the performance of WECAP system 10, provide another important technical advantage.

Figure 8E:
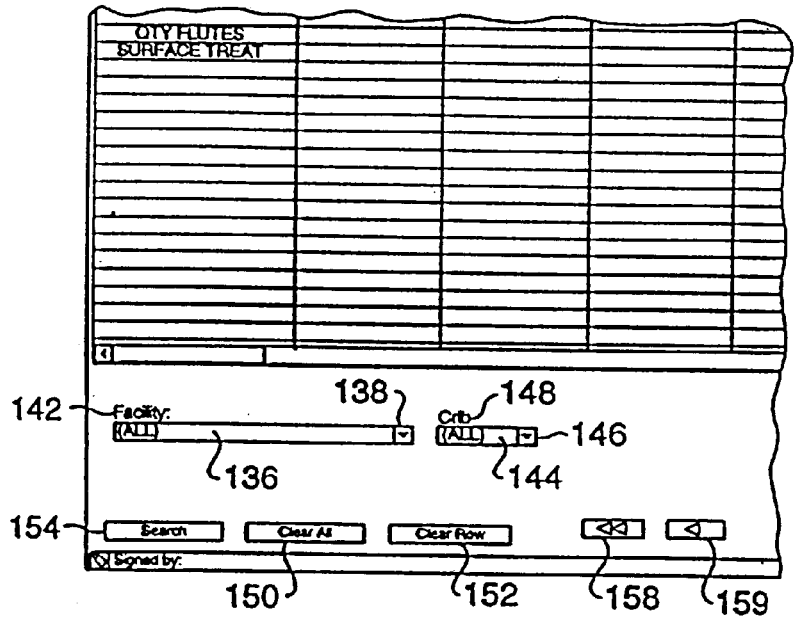
Figure 8F:
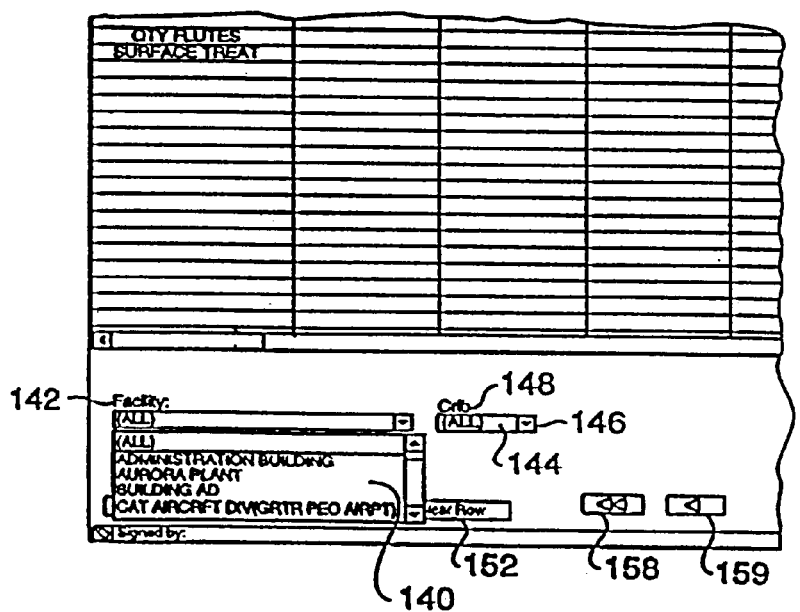
FIG. 8F illustrates an example display associated with specification of a location.

As shown in FIG. 8E, an input selection box 136 and arrow 138 may be provided under the "Facility" heading 142, in association with a pull-down selection menu 140 as shown in FIG. 8F. This may allow the user to optionally specify a particular facility or facilities from which the desired item should be obtained. The identify of the facility would be stored in the location field of parts table 22d. When WECAP system 10 searches for matching items, it will not return items that do not match the selected facility. This may be especially helpful in finding an item at a specific location, for example, if the user may select from among multiple facilities. If a specific facility is selected, the user may further confine the search to a particular inventory location within the selected facility using the input selection box 144 and arrow 146 under the "Crib" heading 148.

If clearing of any cell is desired for any reason, "Clear All" button 150 or "Clear Row" button 152 may be selected. As explained above, the previous page buttons 158 and 159 may allow the user to return to the initial display for the current module or immediately preceding display, respectively. Once a user has specified all the attribute values desired, a "Search" button 154 (shown in FIGS. 8A and 8E for example) may be selected to begin the search of one or more catalogs to find all items that match the specified attribute values. Upon completion of the search, a display such as that shown in FIG. 9A may be displayed.

Figure 9A:
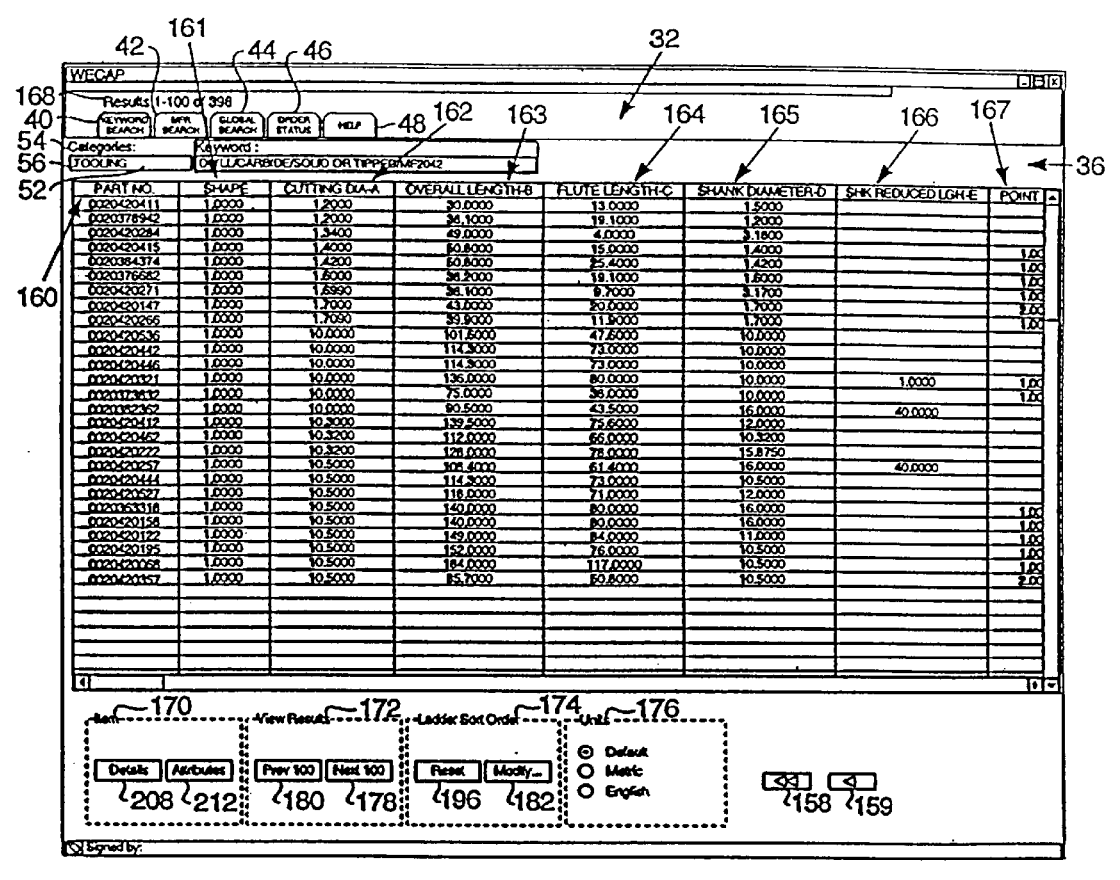

In FIG. 9A, the first column may be a part number column 160. All of this data may be gathered from the part_id field of parts table 22d. Each item that satisfies the search criteria specified in the search (in this particular example all the items having attribute values for a "shape" attribute between "1.00" and "2.00") may have its item number displayed within a part number column 160. In the illustrated embodiment, example columns 161–167 each pertain to an attribute and contain the complete and up-to-date attribute values for the corresponding attribute for returned items. The attributes for columns 161–167 will have been determined previously, as described above with reference to FIG. 8A and attributes 120. The entry in each cell is the char_value from part_char table 22e corresponding to the particular item and attribute intersecting to define the cell. This may be accomplished using the char_id and part_id fields of part_char table 22e. Thus the entry "1.2000" in the first row, third column, is the char_value for item number "0020420411" and attribute "cutting diameter." Every item returned in the search will have a keyword_id field that matches the keyword_id associated with the keyword the user initially selected. Thus, in this example, all items returned have a keyword_id that is the same as the keyword_id of the selected keyword 77. The heading for each column 161–167 may be determined using the characteristic field of part_char table 22e.

Also, in this case at the top of the display above the tabs for modules 40–48, there may be a summary of search results 168 providing the number of results in the current display ("100" in this example) and the number of total results ("398" in this example). There may also be several new boxes, in this example near the bottom of frame 36, which include item box 170, view results box 172, ladder sort order box 174, and units box 176. The back buttons 158 and 159 may again allow a user to return to the first display of the current module and to the immediately preceding display, respectively. Back button 159 may be useful if a search on the specified attribute values is unsuccessful and the user wants to search more or different attribute values. The user can simply select back button 159, populate or re-populate one or more of the cells in the previous display, and search again.

The view results box 172 controls which display of items a user can view if more than a predetermined number of items are returned; in this instance 100 items. For example, if a user is viewing a first display of 100 items, the "Next 100" button 178 is enabled but the "Previous 100" button 180 is not. If the user is viewing a second or higher display of items, however, both the "Next 100" button 178 and the "Previous 100" button 180 may be enabled. Finally, if a user is viewing the next to last display of items, "Previous 100" button 180 is still enabled while "Next 100" button 178 may be automatically modified to read "Last XX", where "XX" is the number of items to be displayed within the last such display.

Figure 9B:
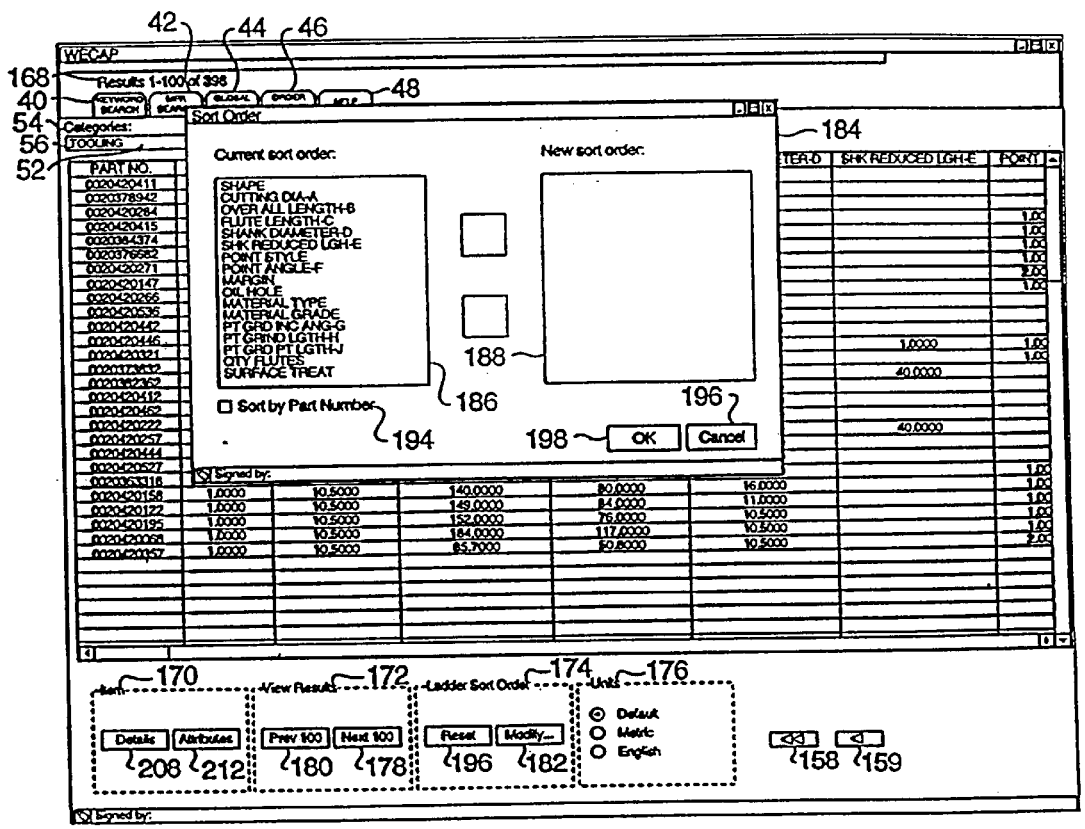
Figure 9C:
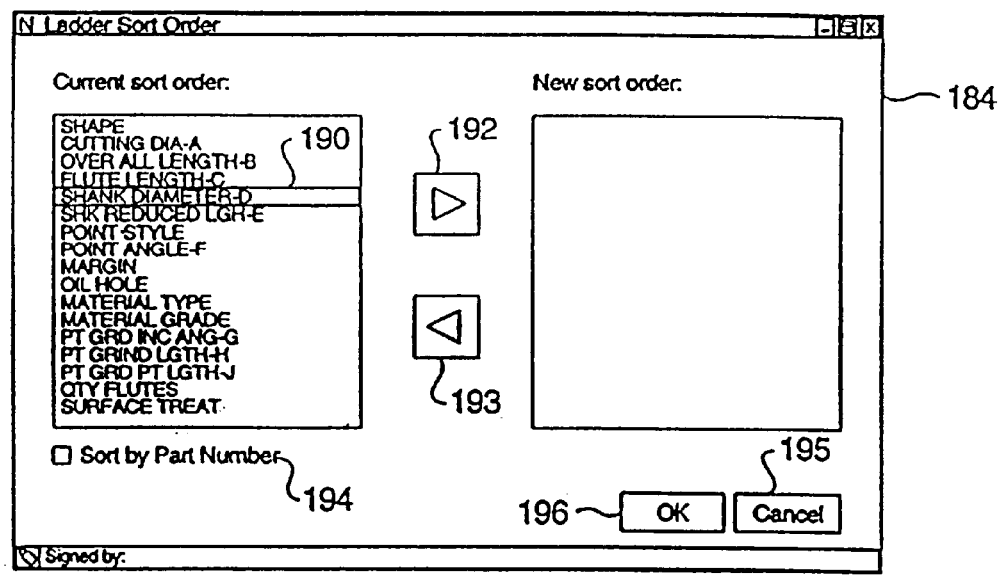
Figure 9D:
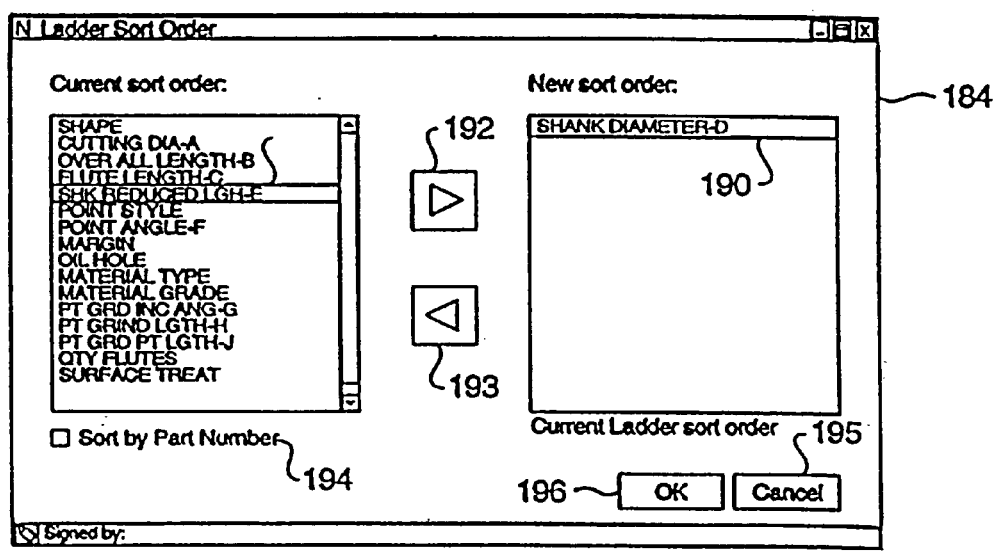

The ladder sort order box 174 provides the user with flexibility to sort the attribute values for returned items in a manner that is more useful to the user. For example, to change the order of the items displayed, the user may select the "Modify" button 182. Upon selection, as is shown in FIG. 9B, a window 184 may be automatically displayed overlaying a portion of the display. Within window 184 are two boxes. The "Current sort order" box 186 reflects the current sort order, which may be determined using the char_ordinal field of part_char table 22e. An empty "New sort order" box 188 is on the opposite side for placement of attributes in a desired sort order. As shown in FIG. 9C, on selection of the attribute 190 for primary sorting, arrows 192 and 193 may appear between "Current sort order" box 186 and "New sort order" box 188. In one embodiment, the lower the char_ordinal number for a particular attribute, the higher up within the display the attribute will appear. Thus, in the illustrated example a "shank diameter" attribute might have a char_ordinal number of "4." By selecting arrow 192, attribute 190 can be moved to the "New sort order" box 188 and thus becomes a primary sort parameter. One or more additional attributes can likewise be moved to the "New sort order box" 188 for further specificity. Similarly, by selecting an attribute within the "New sort order" box 188 and selecting arrow 193, the attribute can be returned to the "Current sort order" box 186. Alternatively, if sorting by item number is desired, "Sort by Part Number" box 194 may be selected.

Figure 9E:
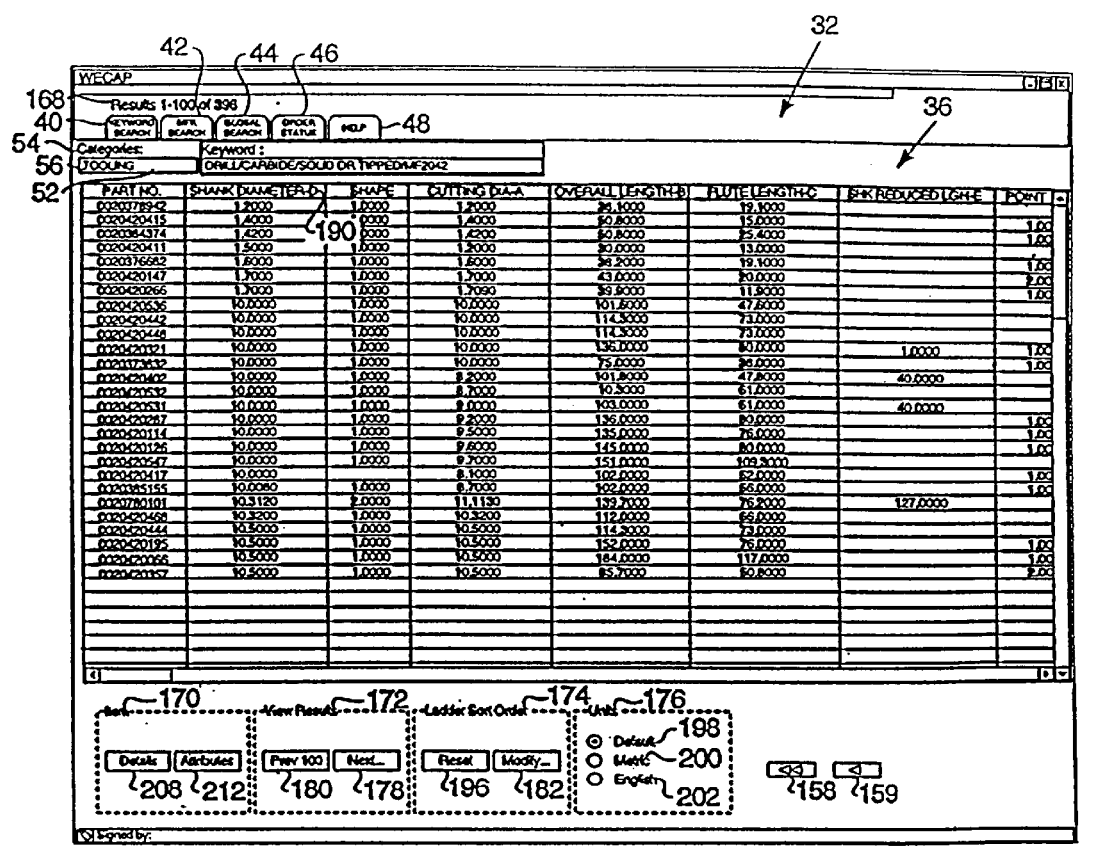

After making appropriate attribute sort order selections, the user may select the "Cancel" button 195 to cancel the sort order request or the "OK" button 196 to view the sort order specified. The primary sort parameter, such as attribute 190, may be displayed in the first (after "part number" column 160) column 161, as shown in FIG. 9E. Other sort parameters may be displayed in successive columns. If a new sort order is found unacceptable, the user can easily reset the original sort order parameters through selection of "Reset" button 197. In one embodiment, when an attribute is selected as a sort parameter, the char_ordinal values for the selected and all other attributes in part_char table 22e are temporarily changed accordingly. Thus, in this case the "shank diameter" attribute would have a new char_ordinal number of zero, and the other char_ordinal values of the attributes associated with the selected keyword 77 would be incremented by one. An additional desirable feature may be storing a new sort order in a user profile such that upon the next viewing of this keyword display, the attributes will be displayed in the modified new sort order. Thus the char_ordinal values in part_char table 22e may be changed "permanently" (until modified again) for a particular user.

Figure 9F:
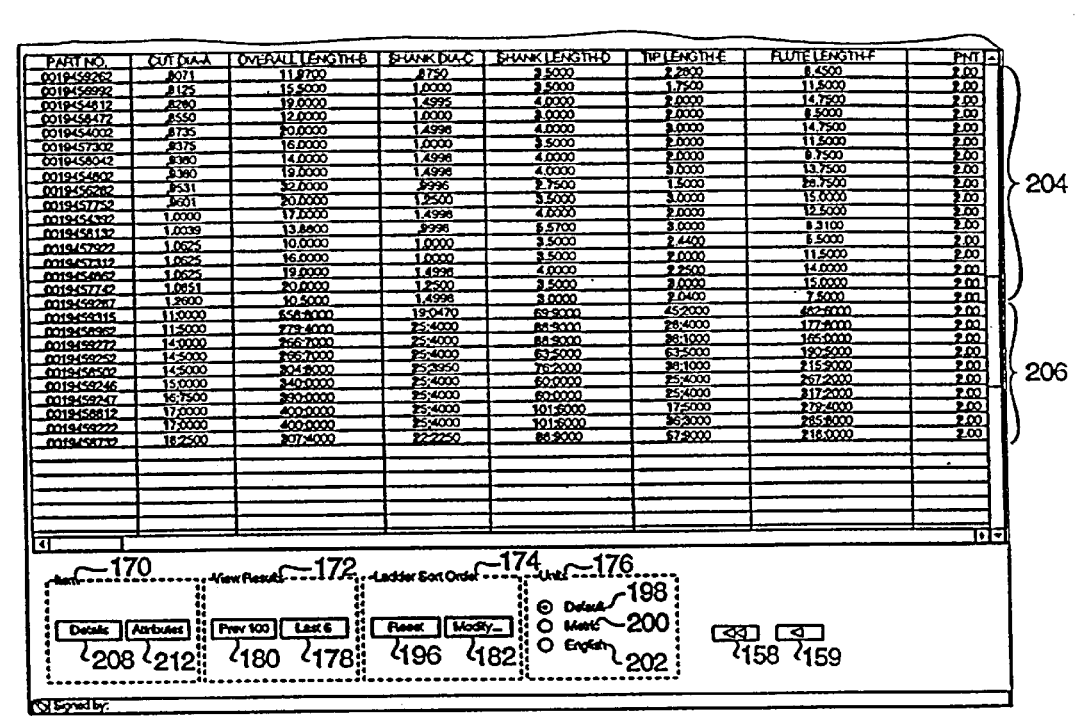
Figures 9G, 9H:
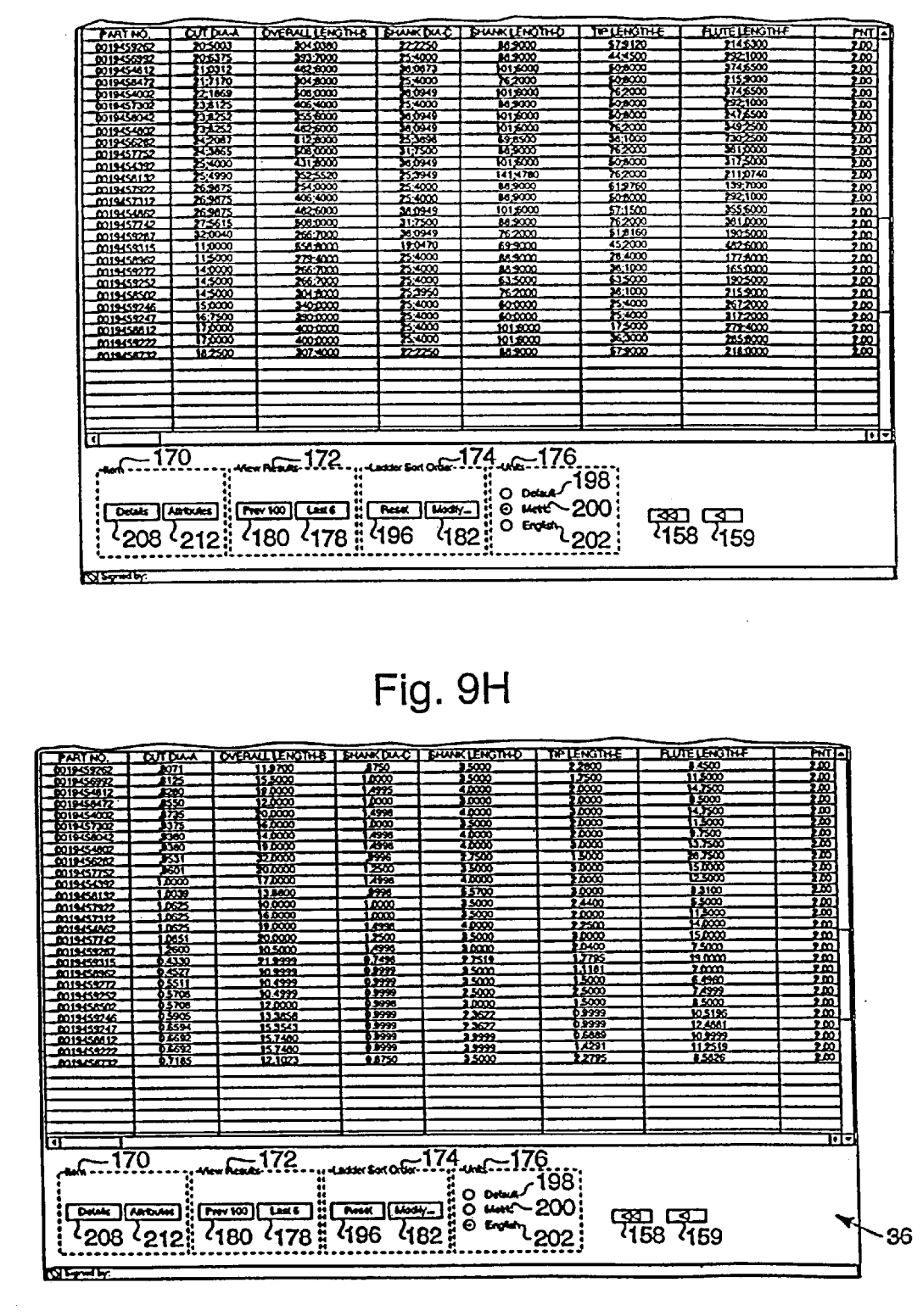

Units box 176 is used to specify the units of measurement used to display the attribute values and may include a "Default" button 198, a "Metric" button 200, and an "English" button 202, as shown in FIG. 9F. "Default" button 198, upon its selection, displays data in the format in which it was stored. For example, English decimal values may be displayed with a period separating the whole and fractional portion whereas metric values may be displayed using a semicolon as the separator. Preferably all English values will be displayed using a single unit of measure (e.g., inches) and all Metric values will be displayed using a single unit of measure (e.g., millimeters). An example of data shown with the "Default" button 198 selected is shown in FIG. 9F. The first seventeen items 204 have attribute values that are shown in English format and the remaining items 206 are shown in metric format. Selecting "Metric" button 200 will convert English format values to Metric, as shown in FIG. 9G. This is done by changing the conversion value in part_char table 22e from some English indicator like "in" for inches to a metric indication like "mm" for millimeters. Similarly, selecting the "English" button 202 will convert metric format values to English, as shown in FIG. 9H. This action would undo the previous change to the conversion field of part_char table 22e from "mm" to "in."

Item box 170 may be utilized after the user has scrolled through and/or has rearranged the attributes to find the item desired. Once highlighted, specific details of the item can be displayed by selecting the "Details" button 208. "Attributes" button 212 may become enabled upon utilization of global search module 44 and will be described in more detail below.

Figure 10:
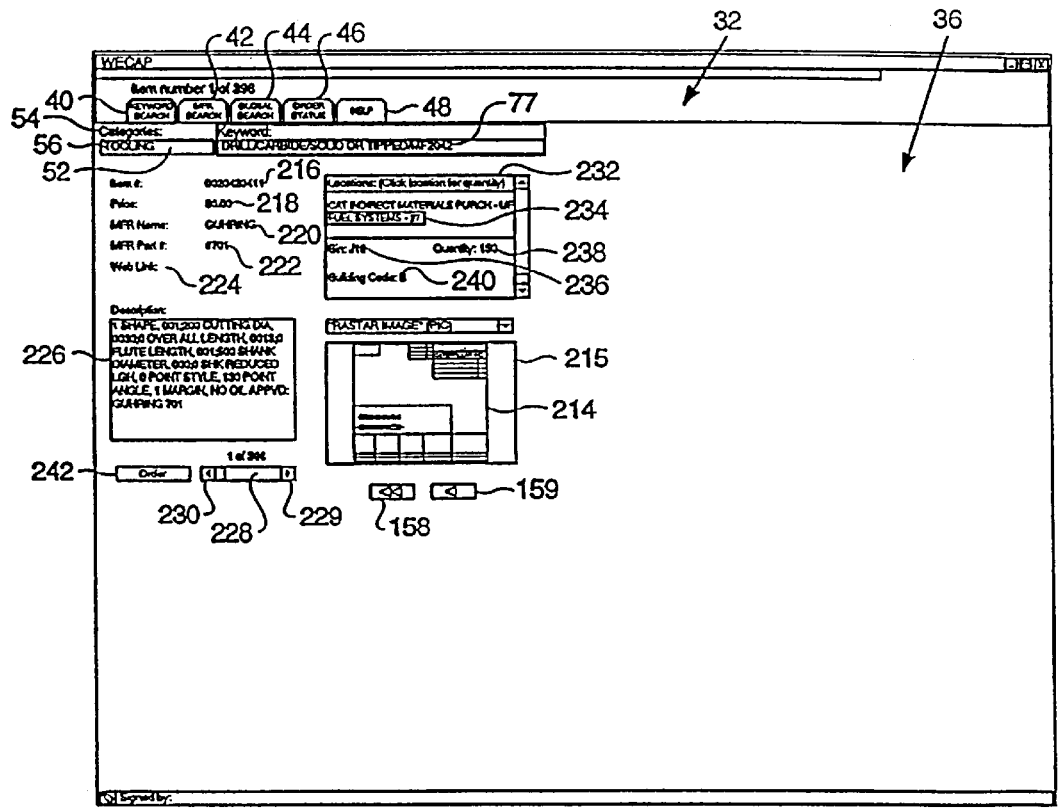
FIG. 10 illustrates an example display containing item details.

Upon selection of "Details" button 208, as is shown in FIG. 9H, a new display may appear, as shown in FIG. 10. This display provides one or more, preferably all, available specifications for the selected item, preferably including an image 214 of the item within image window 215. Image 214 may be manipulated as described above in connection with image 80 of FIG. 5D. Image 214 may be retrieved from the multimedia_file_name field of multimedia table 22g by using a multimedia_id obtained from part_multimedia table 22i, which contains the part_id of the item for which image 214 is generated. Self-explanatory item number field 216, price field 218, manufacturer name field 220, manufacturer item number field 222, and web link field 224 are static information fields for the selected item. The item number, price, and manufacturer item number may be contained in parts table 22d in the part_number, price, and mfg_part number fields, respectively. The manufacturer name and web link may be contained in manufacturer table 22f in the manufacturer and web_link fields, respectively. Description box 226 may include a text-based description of the item, possibly including one or more of its attribute values along other descriptive data. This description may come from the part_desc field of parts table 22d. In addition, scroll bar 228 may access the same detailed information for the next, previous, or any other item matching the search criteria through use of the right arrow 229 or left arrow 230. Back buttons 158 and 159 may be provided and are described above.

When the item selected is made, stored, or otherwise available from a facility of the entity associated with the user (e.g., is available through an internal catalog), locations box 232 may display one or more particular locations within the facility from which the item may be obtained. The list of locations is stored in the location field of parts table 22d. Selecting a specific location 234 from locations box 232 initiates a search of database 6 to determine the quantity of the item on-hand at the selected location 234. A "Bin" field 236, "Quantity" field 238, and "Building Code" field 240 may be provided for more specific location information.

Ordering

Figure 11:
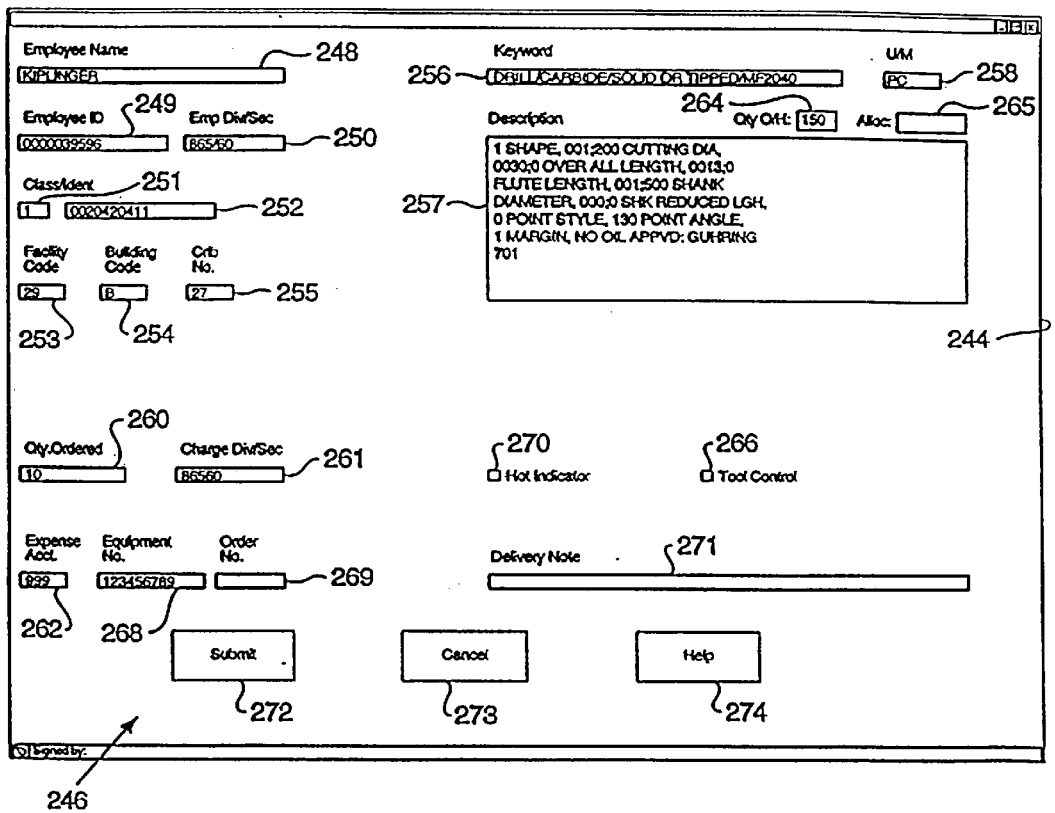
FIG. 11 illustrates an example display for generating an order request.

Upon satisfaction of all fields, the "Order" button 242 preferably becomes enabled and the user may generate an order request for an item. Because in this case the catalog selected is an internal catalog containing items inventoried within one or more facilities of the entity associated with the user, request window 244 is presented as shown in FIG. 11. Alternatively, had the user instead selected an item within an external catalog that must be ordered from one or more other entities, requisition window 282 shown in FIG. 13A might instead be displayed, as described more fully below.

In a particular embodiment, as shown in FIG. 11, WECAP system 10 automatically pre-fills request form 246 with previously stored data, saving the user from the repetitive, time-consuming, and often error-prone task of manually entering this data. The data may be retrieved from database 6 and/or database 19 and may include data within fields such as Employee Name 248, Employee ID 249, Employee Division/Section 250, Class 251, Identification 252, Facility Code 253, Building Code 254, Crib Number 255, Keyword 256, Description 257, Units of Measure 258 (i.e. piece, box, roll, ream, carton, etc.), or any other suitable field. Preferably, the pre-filled data appears within the display in gray text and is not changeable by the user within the request form 246. In one embodiment, user-completed fields required to submit a request may include Quantity Ordered 260, Charge Division/Section 261, and Expense Account 262.

In Quantity Ordered field 260, the quantity desired should be entered and should be equal to or less than the Quantity On-Hand field 264 minus the Quantity Allocated field 265 (if applicable). A request or later order that exceeds this amount should result in an error unless Tool Control 266 is selected. Tool Control 266 may be used to route a request to a particular person or group when the user needs more items than are currently available at the particular facility or facilities. The Charge Division/Section field 261 may require the user to enter a division and section to which the item will be charged. The Expense Account field 262 may require the user to enter a valid expense account for billing purposes. Other optional fields that may be filled when applicable to the item desired may include Equipment Number field 268 and Order Number field 269 that further specify the request. Additionally, if the request is high priority and is urgently needed, the user may select Hot Indicator 270 to communicate this information with the request. The user may also specify one or more delivery instructions or other information using Delivery Note field 271. After all pertinent information has been entered, the "Submit" button 272 may be used to generate the request. If the user decides not to request or order the item for some reason, selection of "Cancel" button 273 will abandon the request. The user may select the "Help" button 274 at any time while working on the request form 246 to obtain on-line help relating to request form 246.

Figure 12A:
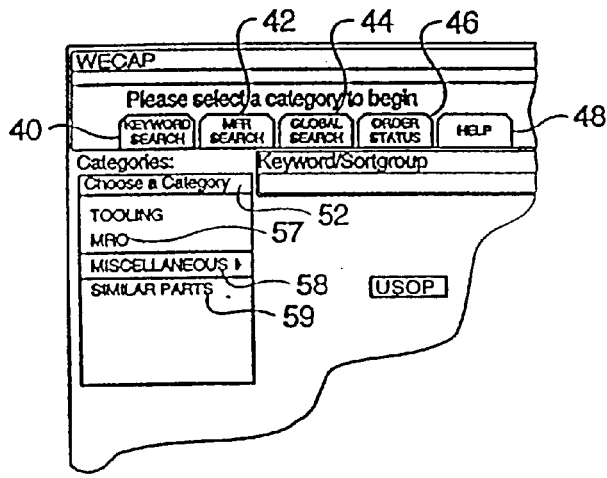
FIGS. 12A–12C illustrates example displays associated with generation of a requisition form.
Figure 12B:
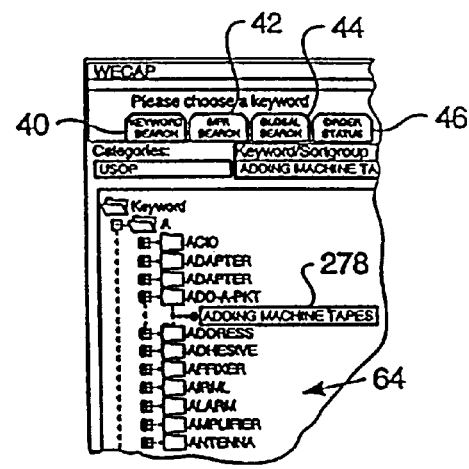
Figure 12C:
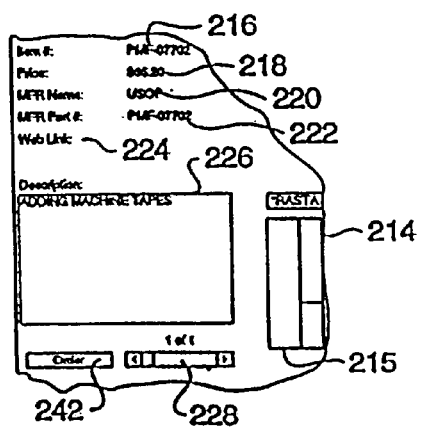
Figure 13A:
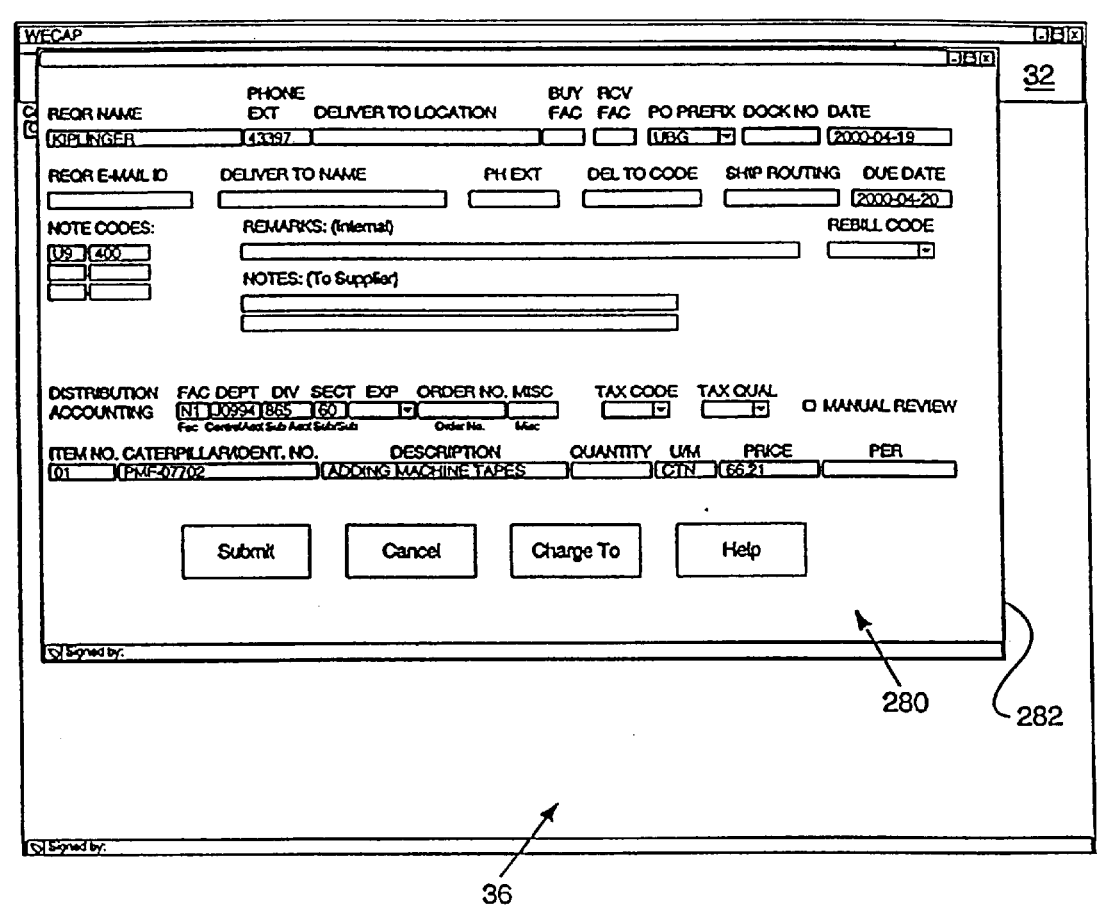

The external ordering forms and displays appear when a search is done in a category, or using a catalog, associated with an external entity. As an example, as shown in FIG. 12A, if the user selects USOP 276 within the MISCELLANEOUS category 58, selects an item 278 using the keyword selection tree 64 as shown in FIG. 12B, and ultimately decides to order item 216 as shown in FIG. 12C, WECAP system 10 may initiate several searches to collect all the data that it has available about the user and the item being ordered. That data may then be pre-filled in requisition form 280 within requisition window 282, which in this example may overlay the previous screen as shown in FIG. 13A.

Figure 13B:
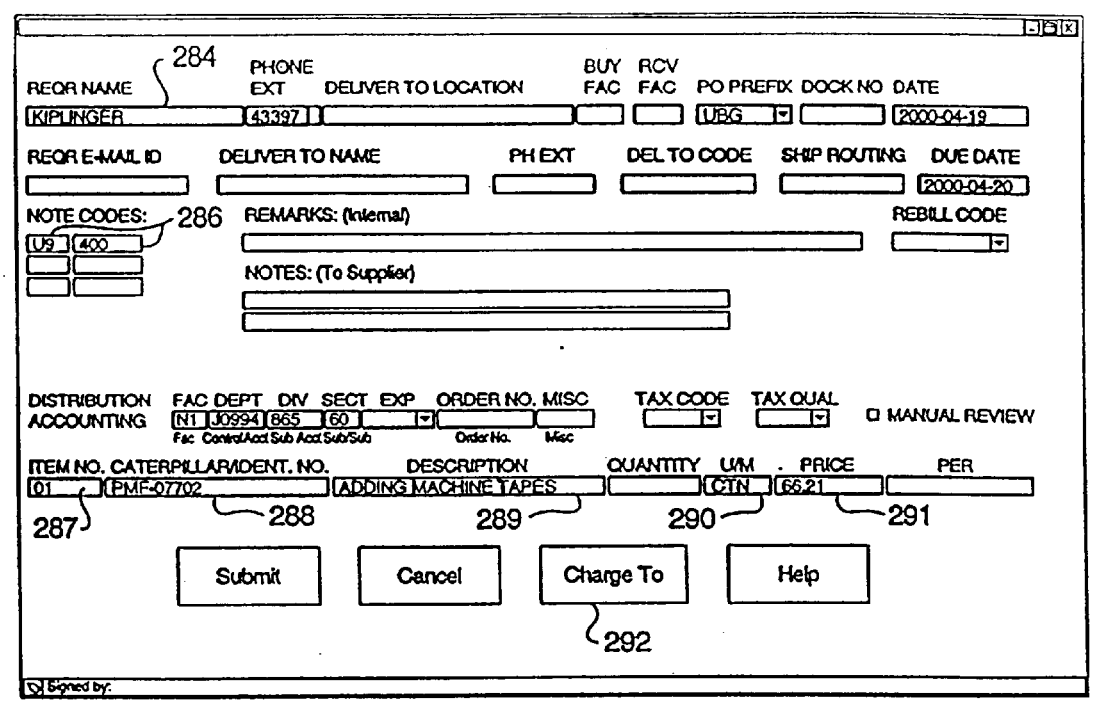

As shown in FIG. 13B, requisition form 280 may include pre-filled, non-editable fields such as Required Name 284, Date 285, Note Codes 286, Item Number 287, Identification Number 288, Description 289, Units of Measure 290, and Price 291. As described above, providing pre-filled fields based on previously entered and/or generated data may save the user from the repetitive, time-consuming, and often error-prone task of entering this information. The field Required Name 284, Date 285, Item Number 287, Identification Number 288, Description 289, Units of Measure 290, and Price 291 are self explanatory as shown in FIG. 13B or are described above. The Note Codes fields 289 may be used when there is a desire to append specific, pre-programmed instructions to the order for communication to an external manufacturer, supplier, or other entity. Use of Note Codes fields 289 may eliminate the need for the user to re-type such instructions on each order, and will usually vary according to the facility and entity involved.

Figure 13C:
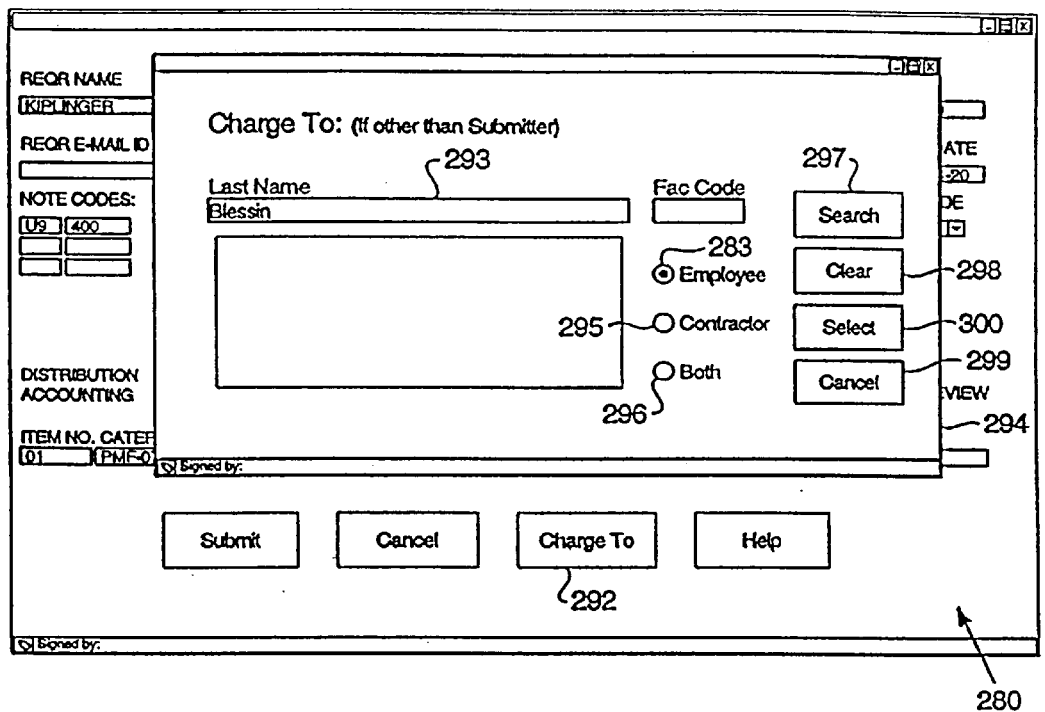
Figure 13D:
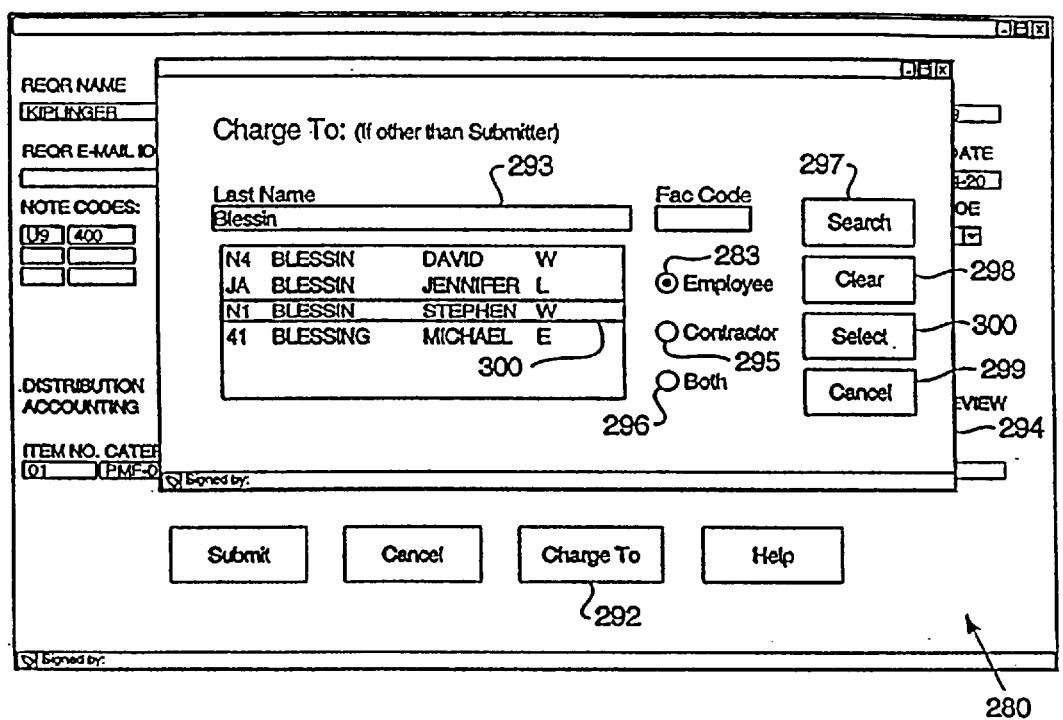
Figure 13E:
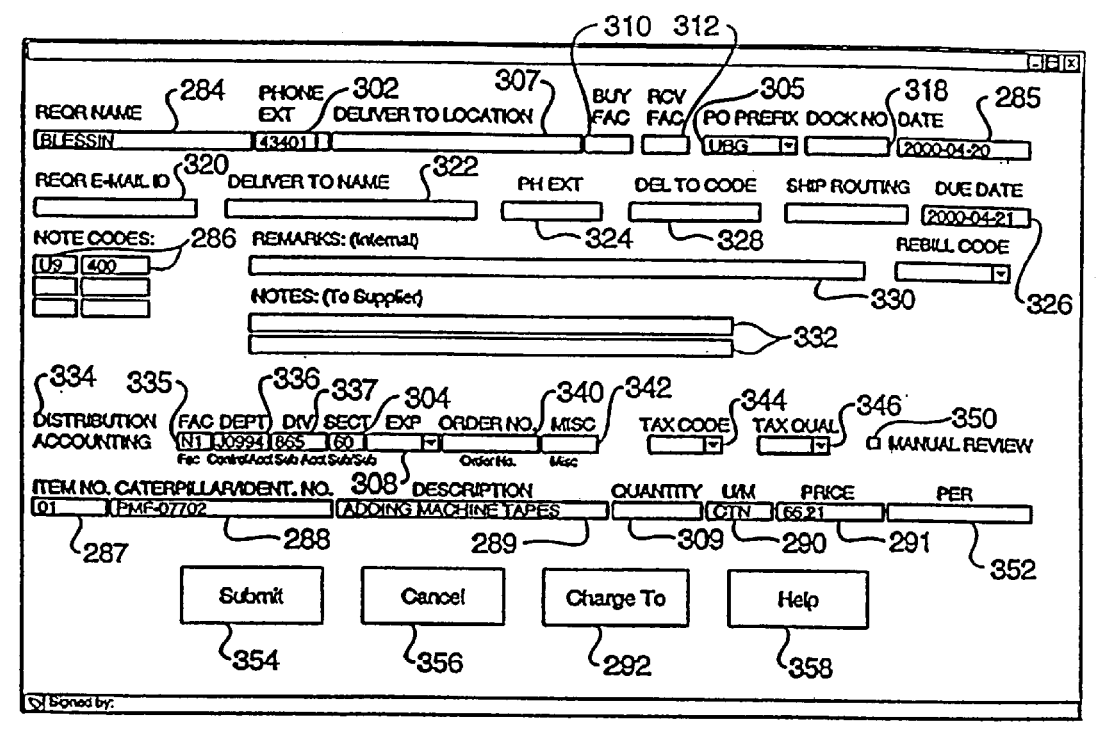

The Required Name field 284 may be changed by selecting the "Charge To" button 292. Upon its selection, a charge to window 294 may appear overlaying the requisition form 280, as illustrated in FIG. 13C. The user may then enter in Last Name field 293 the last name of the person to whom the order is being charged and may also select the proper relationship button (Employee 283, Contractor 295, or Both 296) for the person named. When "Search" button 297 is selected, a list of names that closely match the name typed will preferably appear, as shown in FIG. 13D. The user may select "Clear" button 298 to clear all fields within the charge to window 280 or select "Cancel" button 299 to exit the charge to window 280. On deciding to move forward, the user may highlight the person 300 sought and, upon enablement, choose "Select" button 301. This will close charge to window 294 and insert person 300 in requisition form 280, as shown in FIG. 13E. In this case, Required Name field 284, Phone Extension field 302, and Section Number field 304 (for accounting purposes) are changed accordingly. In other situations, one or more other fields, such as the Note Codes field 286 and/or PO Prefix field 305, might be modified when the person to whom the order is being charged changes.

As with request form 246, requisition form 280 also may also have one or more user-completed fields that must be filled before an order can be generated and submitted. Such self-explanatory fields might include Phone Extension 302 (if not pre-filled), Deliver To Location 307, Expense Number 308 (for accounting purposes), and Quantity 309. Other self-explanatory fields are shown in FIG. 13E and may include Buying Facility 310 and Receiving Facility 312, which may both be back-filled automatically by WECAP system 10 when the order is generated.

Figure 13F:
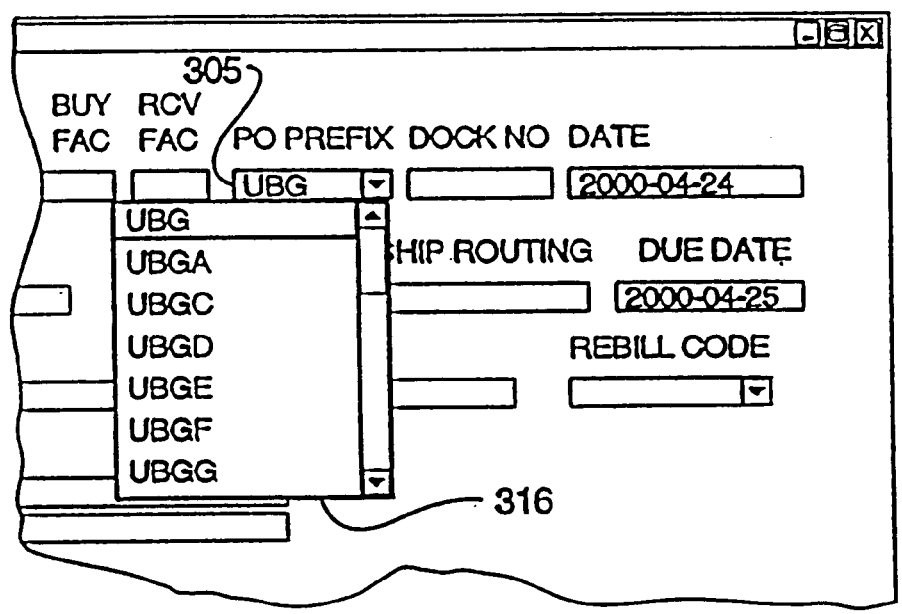

Another user-completed field that may be filled when pertinent to an order may include the PO Prefix field 305. PO Prefix field 305 includes a pull-down menu 316, as shown in FIG. 13F, and may include abbreviations for a buying facility (related to Buying Facility field 310), expense type, receiving facility (related to Receiving Facility field 312), and dock number (related to Dock Number field 318), if applicable. Referring again to FIG. 13E, Dock Number field 318 relates to the particular dock where the item(s) are to be delivered. Other user-completed fields which are self-explanatory may include E-mail ID 320, Deliver to Name 322, Phone Extension 324, and Due Date 326. The Deliver to Code field 328 may be used to indicate that a shipment is being made to a supplier or another location for some external service, such as for assembly. For comments, the Remarks field 330 may allow internal comments that are only seen by the user assigned to the item. The Notes fields 332, on the other hand, may be provided for entry of comments intended for the manufacturer, supplier, or other external entity.

Figure 13G:
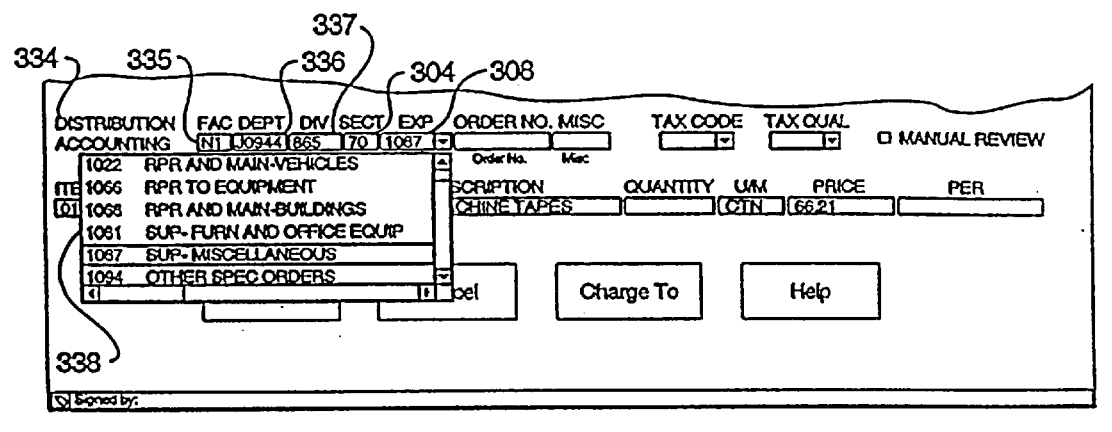

Distribution Accounting data 334 may include entries in one or more fields. In the illustrated embodiment, the first four fields may be pre-filled with previously gathered data from prior displays and include a Facility field 335, Department field 336, Division field 337, and Section Number field 304. The fifth field is the Expense Number field 308 and can be selected, for the user's convenience, from a drop-down menu 338 as shown in FIG. 13G. As described above, Expense Number field 308 may be a required field compared to the financial tables of the associated entity to ensure that it is valid. If a portion is invalid, an error message may be generated to indicate this fact.

Figure 13H:
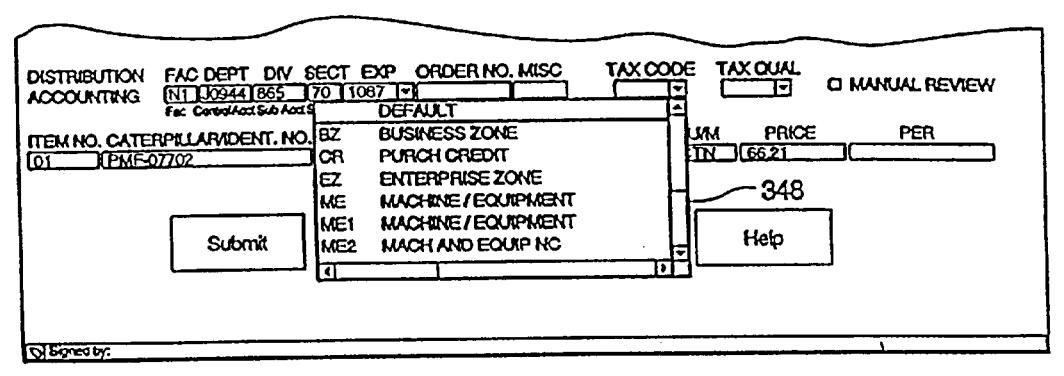

Referring back to FIG. 13E, in some instances the Order Number field 340 and Miscellaneous field 342 may be required for expense accounting. The Tax Code field 344 and Tax Qualification field 346 are similar in use and description. Both fields 344 and 346 may have drop-down menus that contain valid entries with brief descriptions of those entries. For example, a drop down menu 348 for the Tax Code field 344 is shown in FIG. 13H. Referring to FIG. 13E, selection of Manual Review field 350 may cause the order to stop at one or more persons in a purchasing group for review prior to review by any approvers, as described below. Manual Review field 350 may also be back-filled after the order is generated and submitted if appropriate data has been entered into the Remarks fields 330. A non-editable Per field 352 may indicate the quantity of an item to which the price of the item refers (e.g., $5.69 per item or $49.99 per box).

Figure 13I:
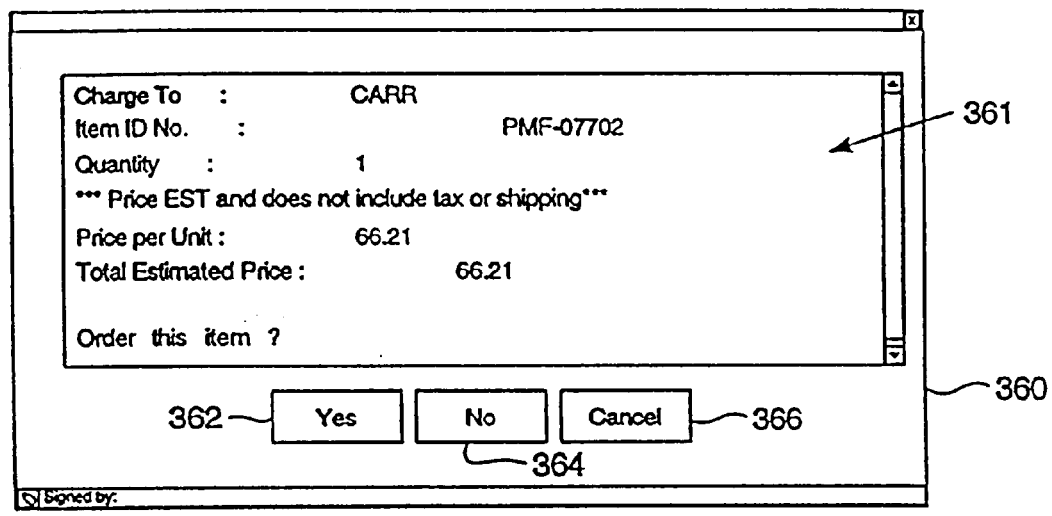

In one embodiment, until any required fields, such as fields 306–309 as just examples, have been populated, "Submit" button 354 is not enabled. Accordingly, only after sufficient data is entered does "Submit" button 354 become enabled for generating and submitting an order. Also, as described above for other displays, the user may cancel the order by selecting "Cancel" button 356 or inquire about help by selecting "Help" button 358. After selection of "Submit" button 354, if all data is valid, order submission verification window 360 may appear as shown in FIG. 13I. Order submission verification window 360 may be the last one presented to the user for generating and submitting an order for an item(s). As is shown in FIG. 13I, order submission verification window 360 may display basic order information 361 and provide the user with the opportunity to accept the order, by selecting the "Yes" button 362, or reject the order and return to requisition form 280, by selecting either "No" button 364 or "Cancel" button 366.

Manufacturer Search Module

Figure 14A:
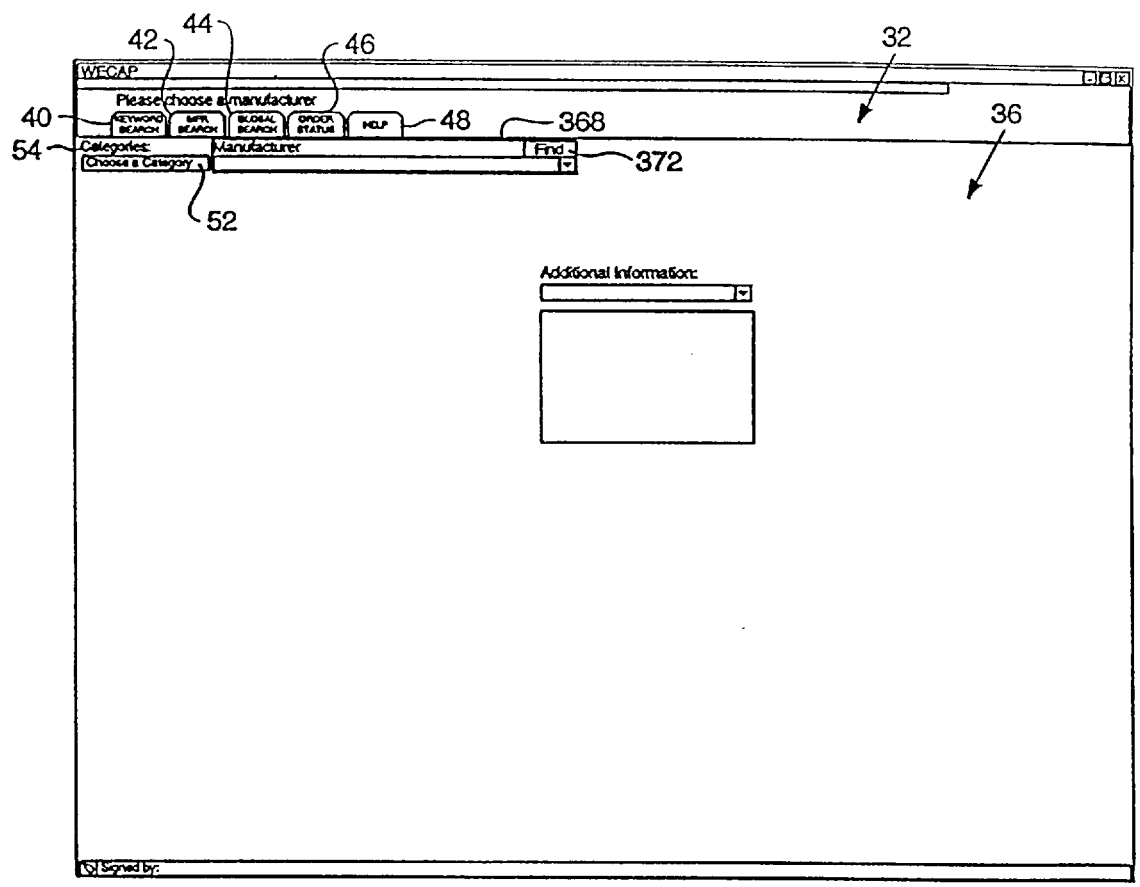
FIGS. 14A–14G illustrate example displays which are associated with a manufacturer search module.

Manufacturer search module 42 is similar to the keyword search module 40 described above and may be used as an alternative. In one embodiment, the initial display for manufacturer search module 42, as shown in FIG. 14A, is identical to that of the keyword search module 40 (as shown in FIG. 4A) except that the manufacturer search module 42 has been selected and is now the current top module. To begin, as described above, a category of items (involving one or more catalogs) may be selected using the category selection box 52. Category selection box 52 for manufacturer search module 42 may contain the same selectable catalogs 56–59 that were shown in FIG. 4B. For ease of comparison, explanation of manufacturer search module 42 will assume selection of TOOLING category 56 as was described above in the example for keyword selection module 40. After TOOLING 56 is selected, a manufacturer input field 368, rather than a keyword input field 62 may become enabled for entry of a manufacturer that produces the item desired.

Figure 14B:
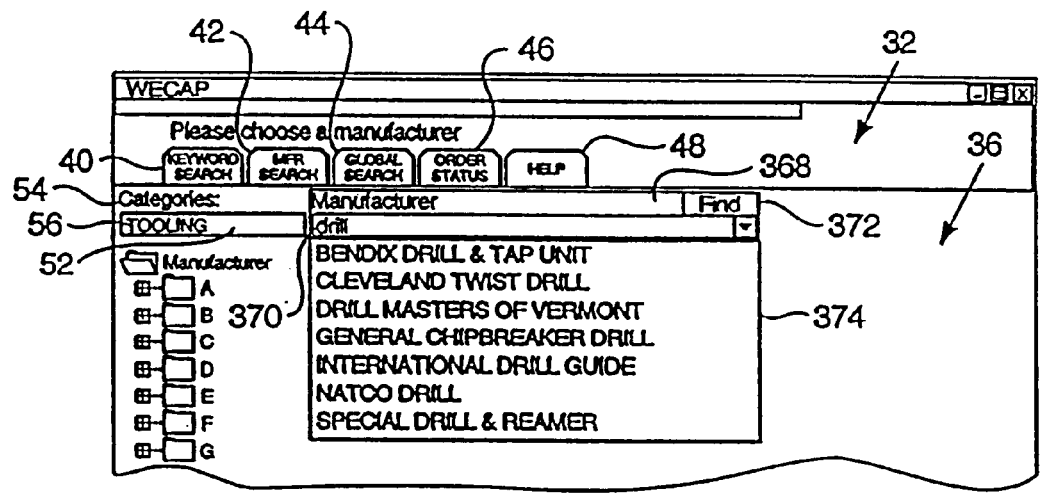
Figure 14C:
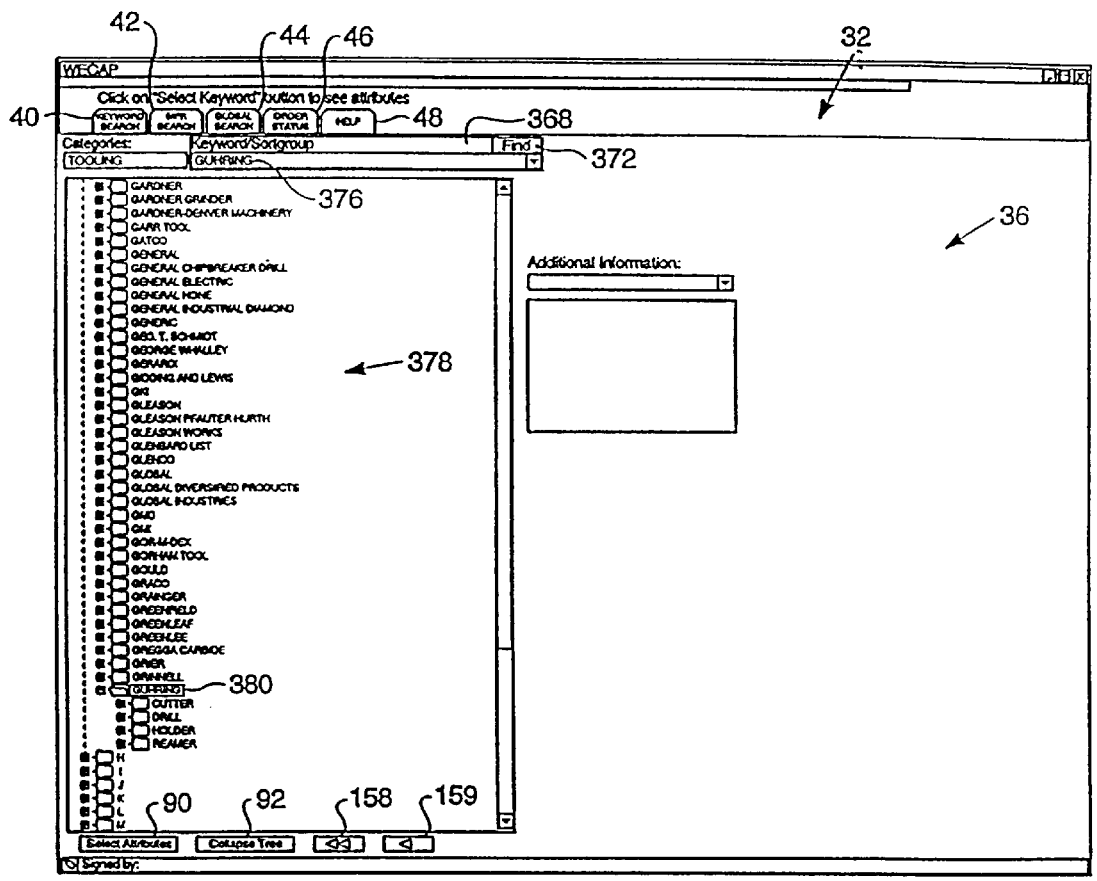

Manufacturer input field 368 may permit entry of any element 370 associated with one or more manufacturers, for efficiency and user-friendliness. As an example, as shown in FIG. 14B, entering "drill" 370 and selecting "Find" button 372 may generate a selectable pull-down menu 374 listing all manufacturers associated with "drill." In one embodiment, the manufacturer fields of manufacturer table 22f are searched and compared with the input "drill" 370 to yield a list of manufacturers which contain the text string "drill" in their name 374. This search may incorporate textual searching techniques. Alternatively, as shown in FIG. 14C, entering the actual manufacturer 376 and selecting "Find" button 372 may immediately expand manufacturer selection tree 378 to folder 380 for the particular manufacturer as well as the one or more keyword folders in its portfolio.

Manufacturer selection tree 378 may be created in a similar manner as the keyword selection tree 64. One difference is that the keywords used to create the manufacturer selection tree 378 are now sorted alphabetically by manufacturer, not just alphabetically as with the keyword selection tree 64. This is accomplished by first matching all the keyword_ids with mfg_ids using mfg_keyword table 22k. Then each keyword_id whose parent_keyword_id is zero becomes the first branch of a keyword sub-tree for a particular manufacturer. The remaining keywords may then attach themselves as described above in connection with keyword selection tree 64. Thus, in this example, because DRILL/CARBIDE/SOLID OR TIPPED/MF 2042 is made by GUHRING as shown in FIG. 14F, the keywords arrange themselves in the usual manner with GUHRING acting as a first branch.

Figure 14D:
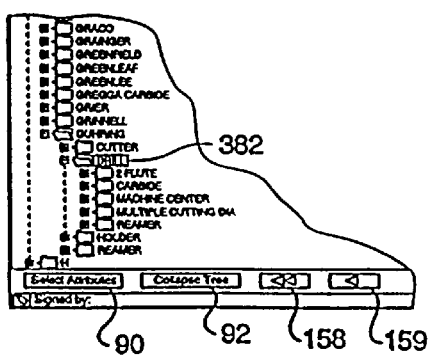
Figure 14E:
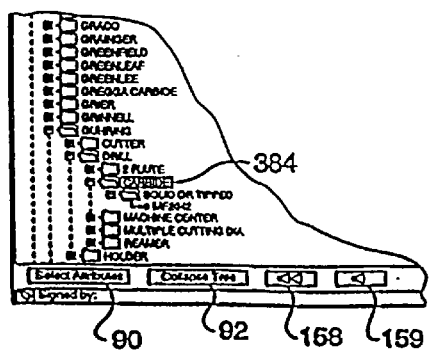
Figure 14F:
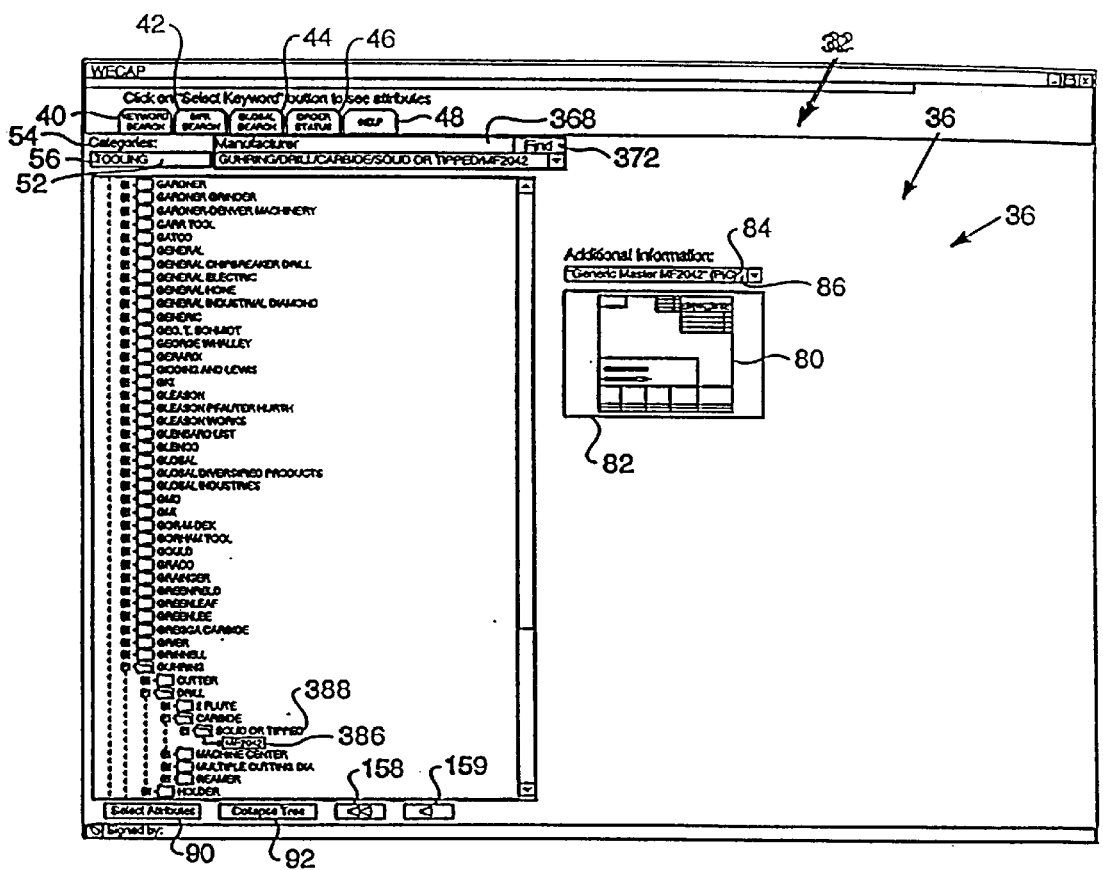

Continuing to expand manufacturer selection tree 378 by selecting DRILL 382, as is shown in FIG. 14D, then CARBIDE 384, as shown in FIG. 14E, then MF2042 386 within SOLID OR TIPPED 388, as shown in FIG. 14F, the user will ultimately find the class of items (possibly a single item) desired. Once a class of items has been selected, as described above, image 80 representative of the items in that class may appear in image window 82, preferably along with title 84 in "Additional Information" selection field 86. Image 80 is preferably manipulable as described above with reference to FIG. 7.

Figure 14G:
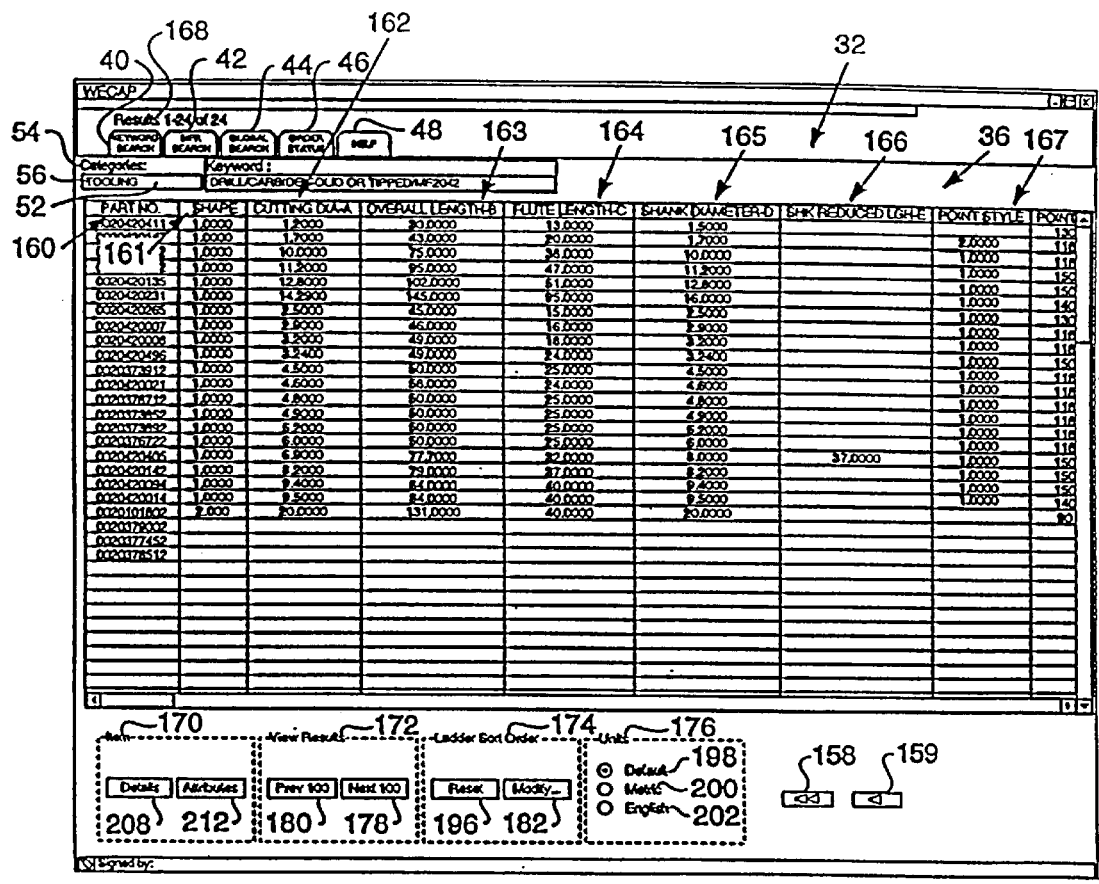

From this point forward using manufacturer search module 42, the results obtained by selecting "Select Attribute" button 90, "Search" button 154, and "Details" button 208 will yield results analogous to those described above for keyword search module 40. For example, the display shown in FIG. 8A, after selecting "Select Attribute" button 90, may be identical to the display that would appear as a result of selecting "Select Attribute" button 90 shown in FIG. 14F. However, as shown in FIG. 14G, the display obtained by selecting "Search" button 154 may typically differ significantly as to the number of items found. For example, the summary of search results 168 in FIG. 9A indicated 398 specific items, whereas using the manufacturer search module 42 conveniently provided only 24 (as shown in FIG. 14G). One advantage, therefore, of using manufacturer search module 42 is being able to directly specify a particular manufacturer and search only for items available from that manufacturer.

Global Search Module

Figure 15A:
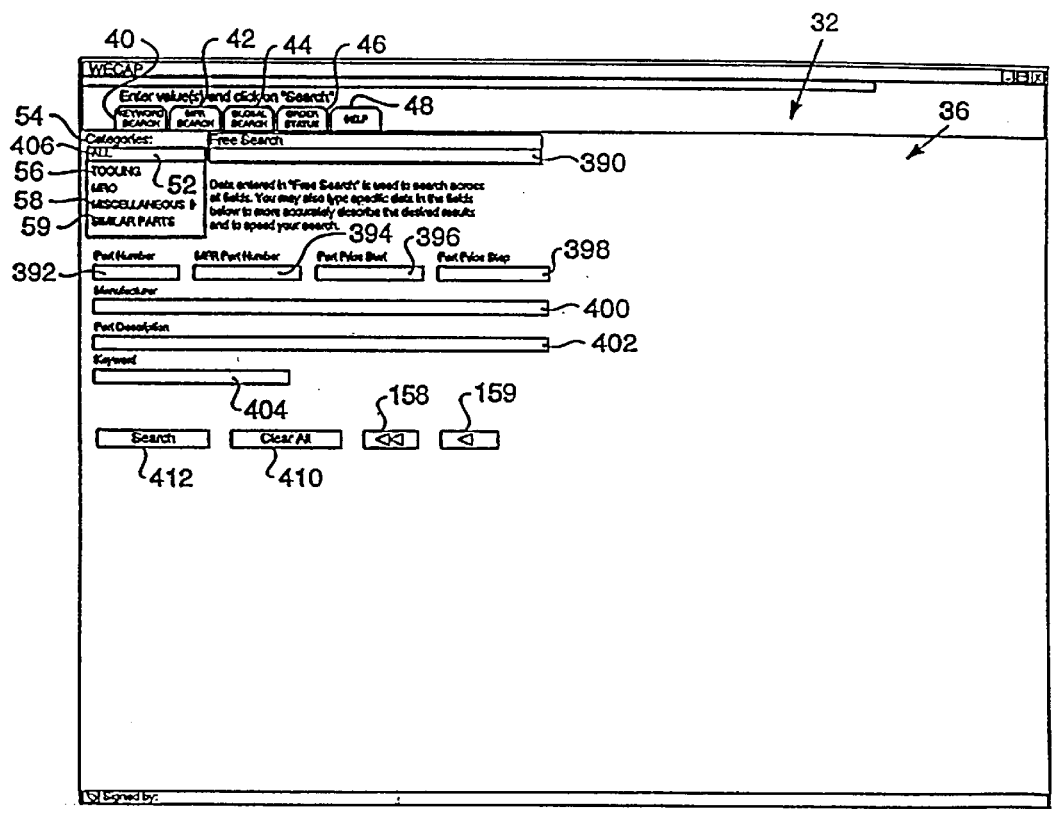
FIGS. 15A–15G illustrate example displays which are associated with a global search module.

As shown in FIG. 15A, the global search module 44 may be used as an alternative to the keyword search module 40 and manufacturer search module 42 described above. Global search module 44 is intended for those occasions where a user knows some specific data with which to search for an item or wishes to search more than one catalog at a time. In the description below, global search module 44 has been selected and is now the current top module.

In one embodiment, the initial display for global search module 44 differs from those of keyword search module 40 and manufacturer search module 42. As described above, a user may initially select one or more desired categories of items (involving one or more catalogs) using category selection box 52. With the global search module 44, unlike with modules 40 and 42, the user may be able to search all available catalogs in database 6 by selecting ALL 406 in the category selection box 52. This option may provide an important technical advantage. Unlike previous systems, WECAP system 10 may save a user the time and complexity of searching with several different systems to achieve a complete search for an item. ALL 406 option may allow the user to search all external catalogs in addition to all internal catalogs. Thus, the user can be more confident that the search query will return all possible matches from all the different catalogs, without needing to know whether a desired item is available internally or externally, which external entity may produce, supply, or otherwise sell the item, or in what catalog the item may be found.

Figure 15B:
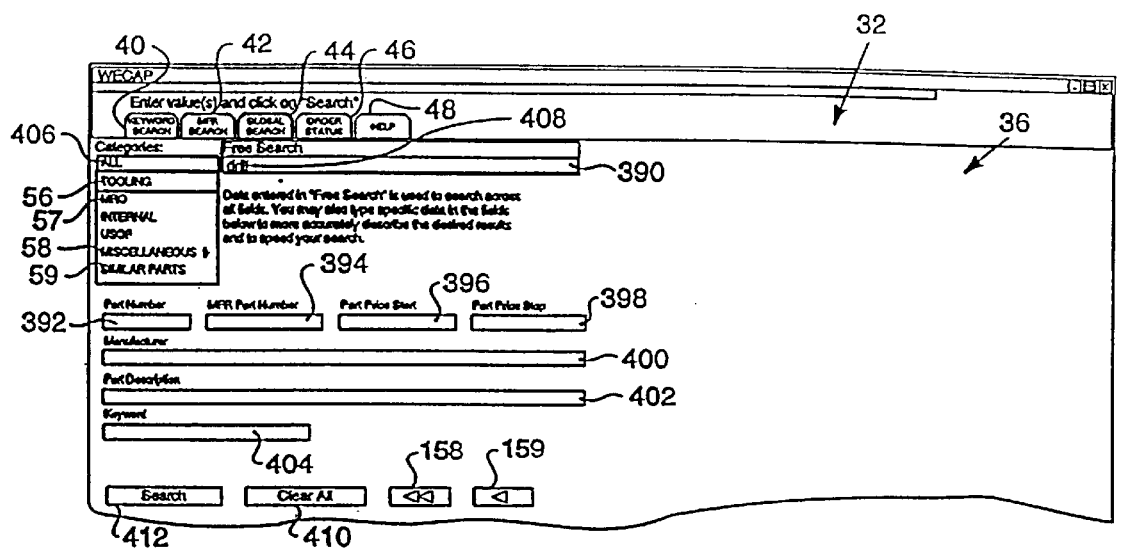
Figure 15C:
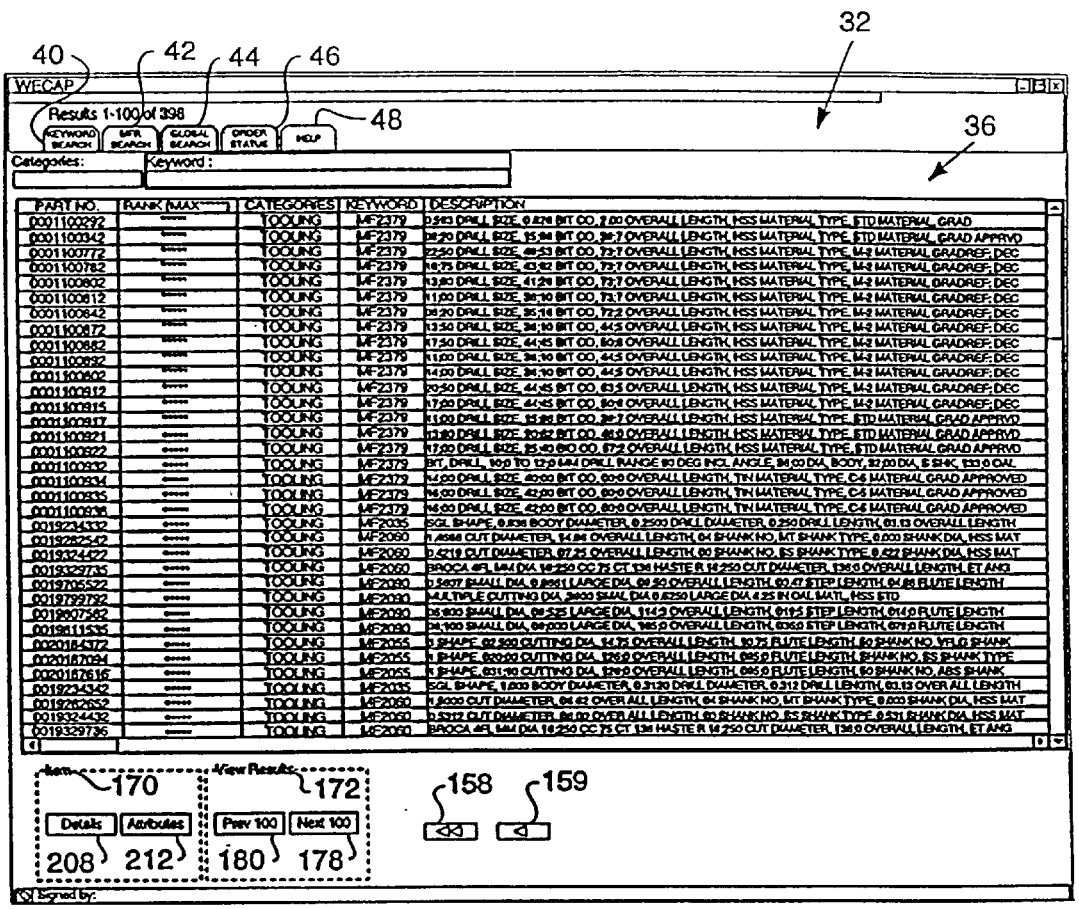

In free search field 390 shown in FIG. 15A, a user may enter a keyword, attribute, attribute value, or other information, such as a description or a price. In a first example, upon selection of TOOLING 56 using category selection box 52, the user might attempt to duplicate the search completed above using keyword search module 40 by entering "drill" keyword 408 in the free search field 390, as shown in FIG. 15B. If the user selects "Search" button 412, the next display to appear is shown in FIG. 15C. In this embodiment, each item returned will match "drill" 408 as to part number (from the part_number field in parts table 22d), as to keyword (from the keyword field of keyword table 22a), or at least in part as to description (from the part_desc field of parts table 22d). It may be important to note that under both keyword search module 40 and manufacturer search module 42, the next display to appear would in one embodiment be the display obtained after selecting "Select Attribute" button 90 (as shown in FIG. 8A for example). Global search module 44 preferably renders the functionality of "Select Attribute" button 90 unnecessary because global search module 44 searches against descriptions instead of attributes. Global search module 44 may also provide a way to narrow the number of items returned. In one embodiment, global search module 44 searches within a category (involving one or more catalogs) or across several categories (involving one or more catalogs) based on additional specified information, such as that contained in fields 392–404 of FIG. 15B. In general, the more fields 392–404 that are filled, the more efficient the search and the fewer returned items the user must evaluate before selecting a particular item.

Figure 15D:
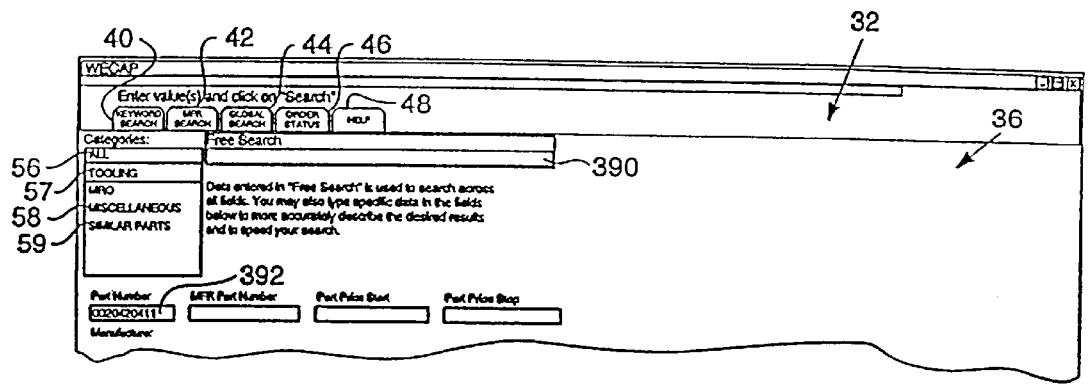
Figure 15E:
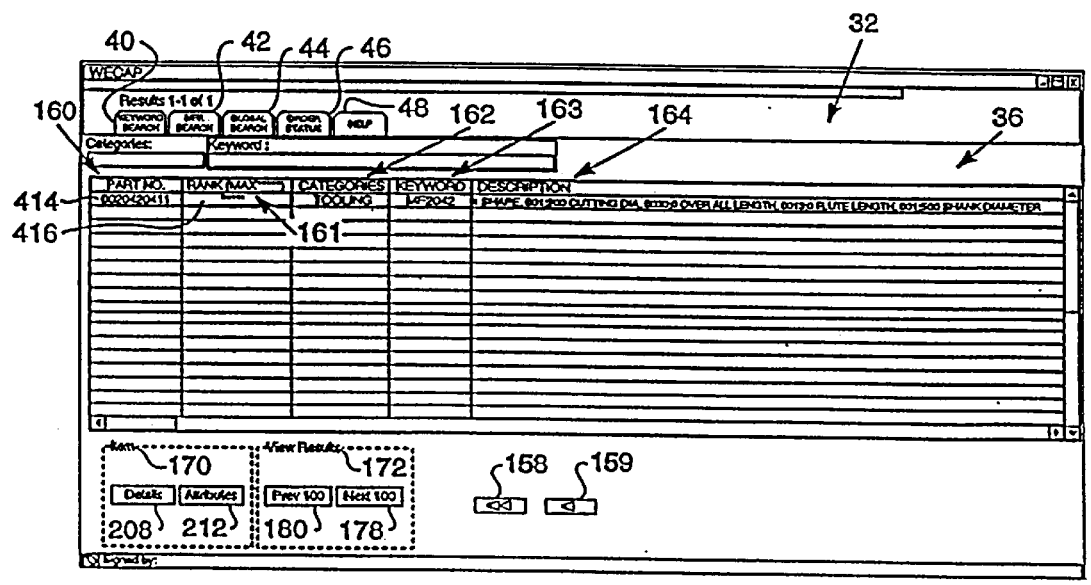

For example, an entry in Part Number field 392 may search the part_number field in parts table 22d. An entry in MFR Part Number field 394 may search the mfg_part_number field in parts table 22d. An entry in Part Price Start field 396 may search the price field in parts table 22d for all parts that are greater than the entered price. An entry in Part Price Stop field 398 may search the price field in parts table 22d for all parts that are less than the entered price. An entry in Manufacturer field 400 may search the manufacturer field in manufacturer table 22f. An entry in Part Description field 402 may search the part_desc field in parts table 22d. An entry in Keyword field 404 may search the keyword field in keyword table 22a. As a second example, if the user again selects TOOLING 56 but also enters data in Part Number field 392, as shown in FIG. 15D, the search will be narrowed and may provide only the desired item in first row 414, as shown in FIG. 15E. Thus, the entry of 0020420411 in Part Number field 392 searched all the part_number fields to find a matching item.

Additional differences may be associated with global search module 44 as shown in FIG. 15E. One significant difference from search modules 40 and 42, which at least in one embodiment list attribute values in columns for corresponding attributes, is that column 161 may rank the results of the search according to how many of the search criteria have been matched. Although any number of variations might be used to reflect the level of matching, such as a direct percentage, in this example asterisks 416 may be used. In a particular embodiment, five asterisks 416 may indicate that all criteria of the item shown match the search criteria. Fewer asterisks 416 may indicate fewer matched criteria. Column 162 may indicate which one or more categories (or catalogs) contain the item. Column 163 may contain the keyword that would have been selected as a result of using keyword search module 40, as shown in FIG. 4D for example. Column 164 may contain a description including the attributes and attribute values stored for the particular item.

Since in this case there are no additional columns containing attribute values of the item selected (as there were using both the keyword search module 40 and the manufacturer search module 42), if a user wishes to see attribute values for items, then the user may select "Attributes" button 212 within Item box 170, as shown in FIG. 15E. It may be desirable not to present such additional columns, because to provide such additional columns might not only overwhelm the user with data in a single display, thereby making the screen aesthetically unpleasing, but might further require searching of an overabundance of data, thereby prolonging system response time and decreasing system performance generally.

Figure 15F:
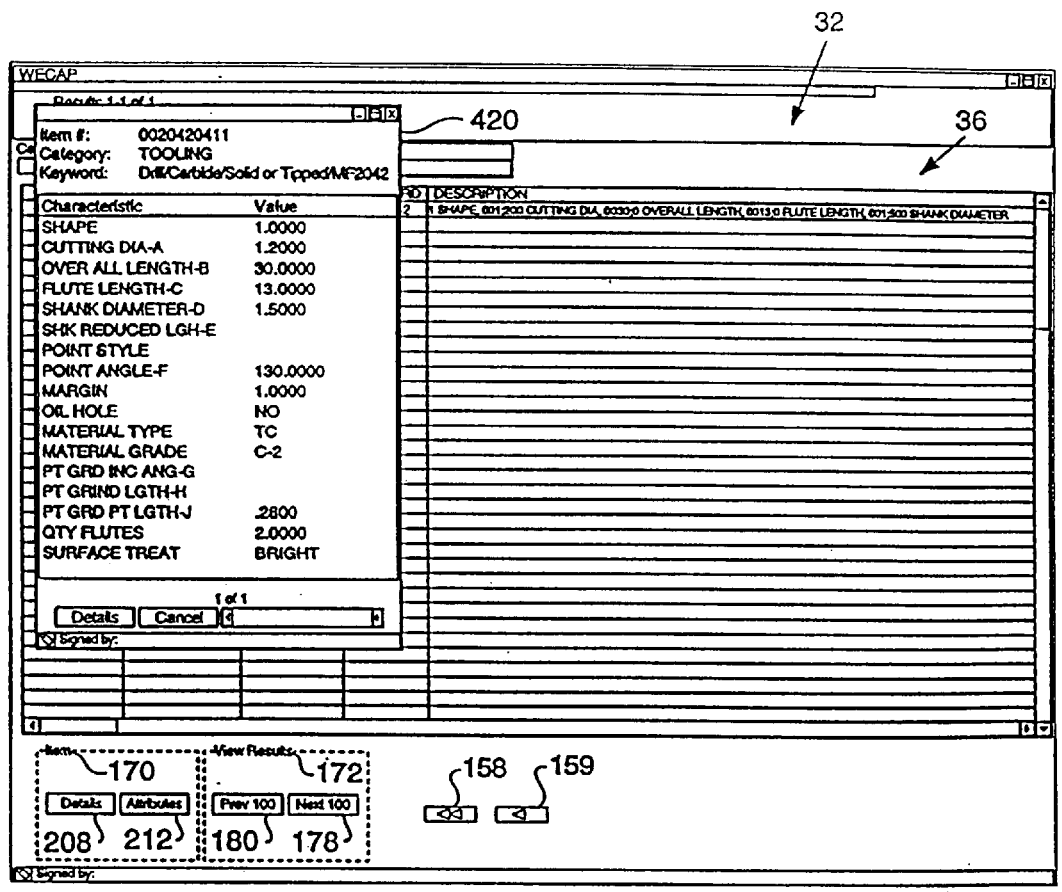
Figure 15G:
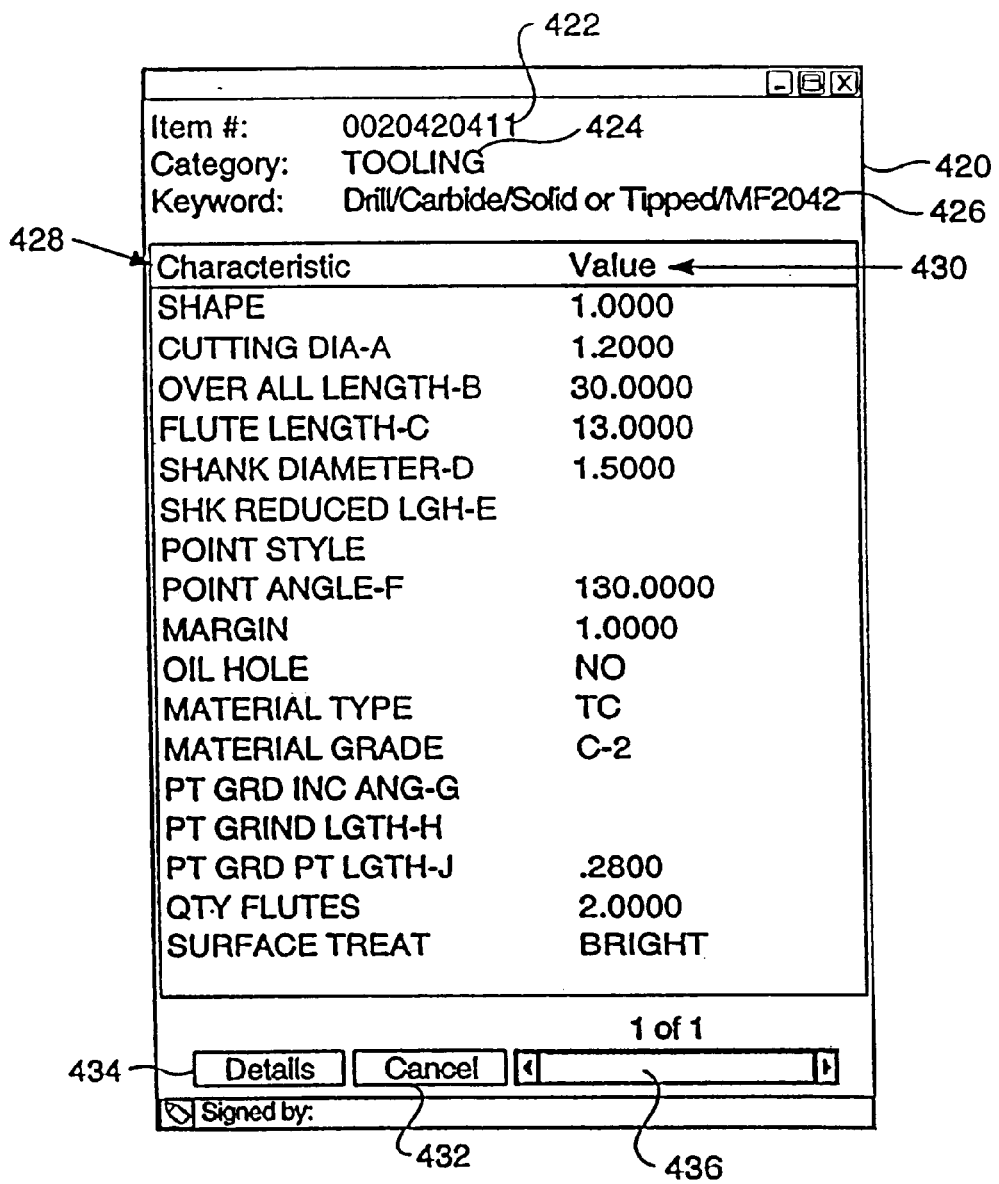

Upon selection of the "Attributes" button 212, as shown in FIG. 15F, a window 420 may be generated that includes the attribute values for the item selected in FIG. 15E. Window 420, as more clearly shown in FIG. 15G, may begin with Item Number field 422, Category field 424, and Keyword field 426. The Item Number 422 comes from the part_number field in parts table 22d. The Category field 424 comes from the keyword associated with the keyword_id field of the item in parts table 22d. The Keyword field 426 comes from the keyword_path associated with the keyword_id of the item in parts table 22d. Window 420 may additionally display the attributes for the item in a first column 428 and the attribute values for the item in a second column 430. In one embodiment, this information is the same as information displayed in table form in FIGS. 9A and 15G, for example. "Cancel" button 432 closes window 420 and returns the user to the preceding display. "Details" button 434, which has substantially the same effect as "Details" button 208 in FIGS. 9E, 15G, and 15E, may generate a display similar to that described above with reference to FIG. 10. As described above, after finding the desired item and selecting the "Details" button 434, the next displays presented in connection with global search module 44 may be identical to those described above in connection with keyword search module 40.

Order Status Module

Figure 16A:
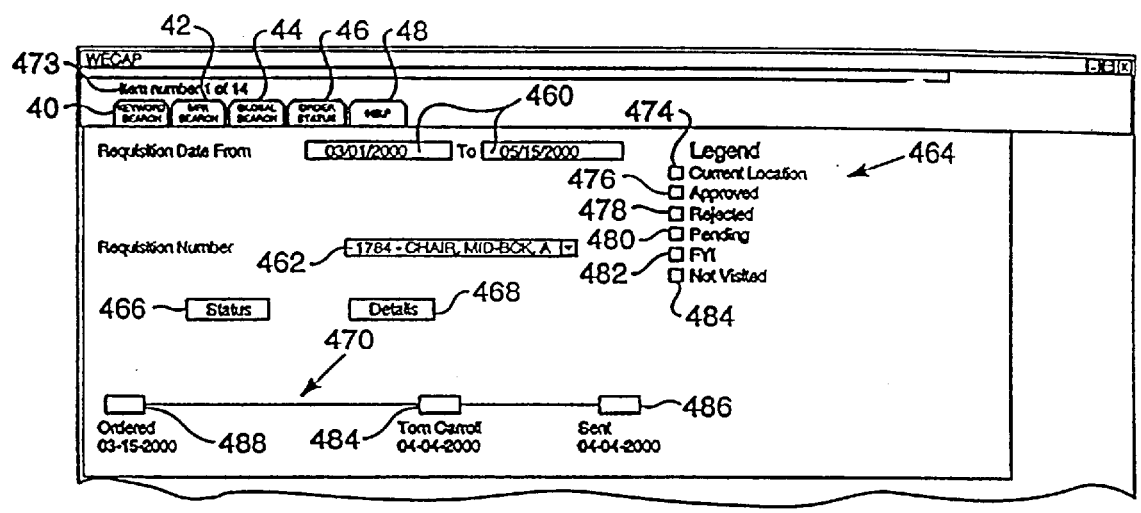
FIGS. 16A–16B illustrate example displays which are associated with an order status module.

In general, order status module 46 generates the approval and routing status for an ordered item(s). Upon selection of the order status module 46, as is shown in FIG. 16A, it now becomes the current top module. The order status module 46 offers electronic and/or graphical routing capabilities suitable for generating detailed information on the current approval and routing status of a previous submitted order or request for an item. In one embodiment, a user can determine exactly where an order request is within the ordering approval process.

An example initial display, as shown in FIG. 16A, includes requisition date fields 460, requisition number field 462, a legend 464, a "Status" button 466, "Details" button 468, and time-line status image 470. Requisition date fields 460 allow for automatic or manual entry of dates between which an order or request was made. Requisition number field 462 provides the number and name of an item that was ordered or requested. If more than one item has been ordered in the time period specified in the requisition date fields 460, an arrow 472 may appear in requisition number field 462 for drop-down menu selection of the desired item. A summary of items 473 may also appear indicating the total number of items ordered within the period specified in requisition date fields 460. "Status" button 466 may allow for renewal of time-line status image 470 to reflect current order approval status for a new item selected in requisition number field 462. "Details" button 468 returns the user to a display providing detailed information for the item, such as that shown in FIG. 10 for example, and thus provides similar functionality as other "Details" buttons described above. Legend 464, together with the time-line status image 470, provides the user with a quick visual indication of the current approval and routing status for an order.

Figure 16B:
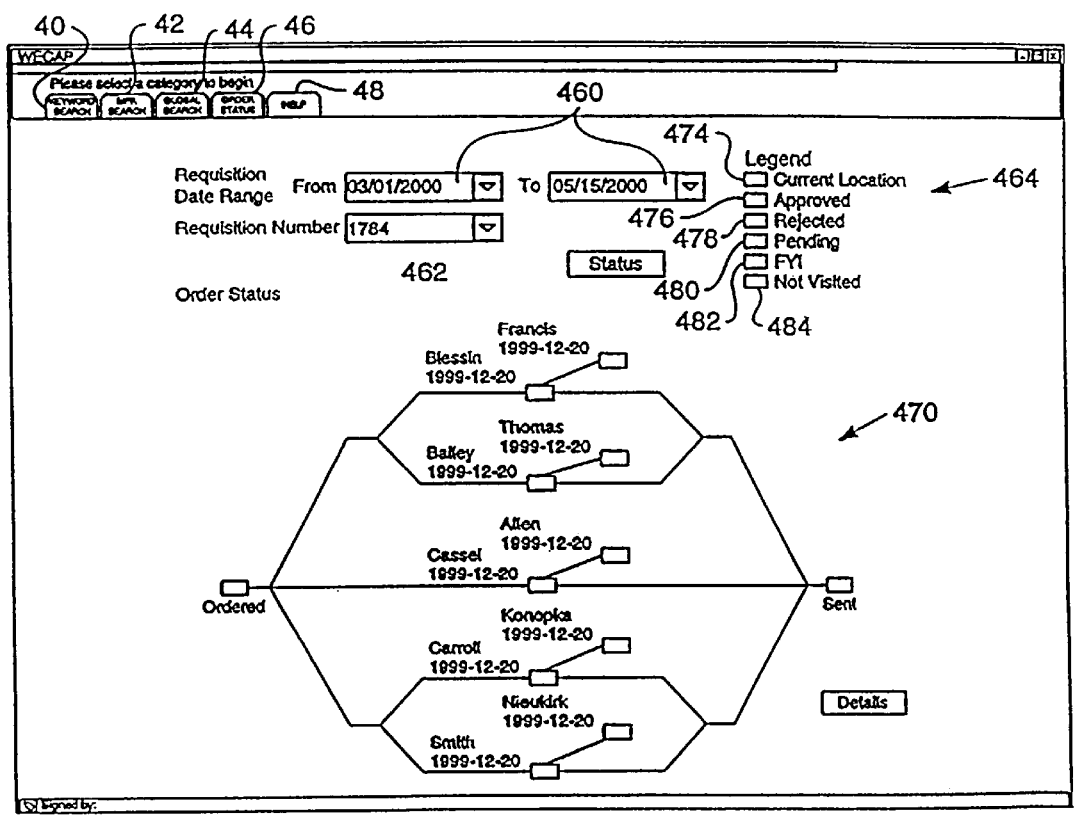

In most businesses, since an order must be approved by one or more persons within a supervisory chain before it can be sent for fulfillment, it may be desirable to know where an order is within the approval and routing process. Generally speaking, one or more approvers may be required for lower to mid-level employees in external ordering situations. Approval routing is therefore dependent, in some cases, on the particular employee doing the ordering as well as the cost of the item ordered. Thus, the number of approvers on time-line status image 470 may vary for the particular user and expense of the item. In this example, as shown in FIG. 16A, only one approver is necessary. However, in another example, as shown in FIG. 16B, multiple approvers may be necessary.

Referring to FIG. 16A, visual indicators may be included in legend 464 and on time-line status image 470 for depicting the approval and routing status of an order. Indicators may include text, shapes, colors, or any other suitable indicators, in any combination. Example indicators shown in legend 464 may include the current location of an order request 474 (i.e. who is currently reviewing the order); whether an order request has been approved 476, rejected 478, or is pending 480 at one or more particular approvers; to whom the order request has been or will be routed for informational purposes 482; and to whom the order request has not yet been routed. Upon approval by all approvers listed, such as "Tom Carroll" generally indicated at 484 for example, appropriate indicators are preferably changed and dated, and the order is electronically sent to an internal and/or external system for fulfillment. The first and last steps 488 and 486, respectively, relating to order fulfillment may also be depicted using indicator elements on the time-line status image 470, as shown in FIG. 16A for example.

Time-line status image 470 may thus provide the user with a quick visual indication of exactly where in the order approval and routing process the order currently resides, thereby reducing or eliminating confusion often associated with procurement of an item in a business setting.

Help Module

Figure 17A:
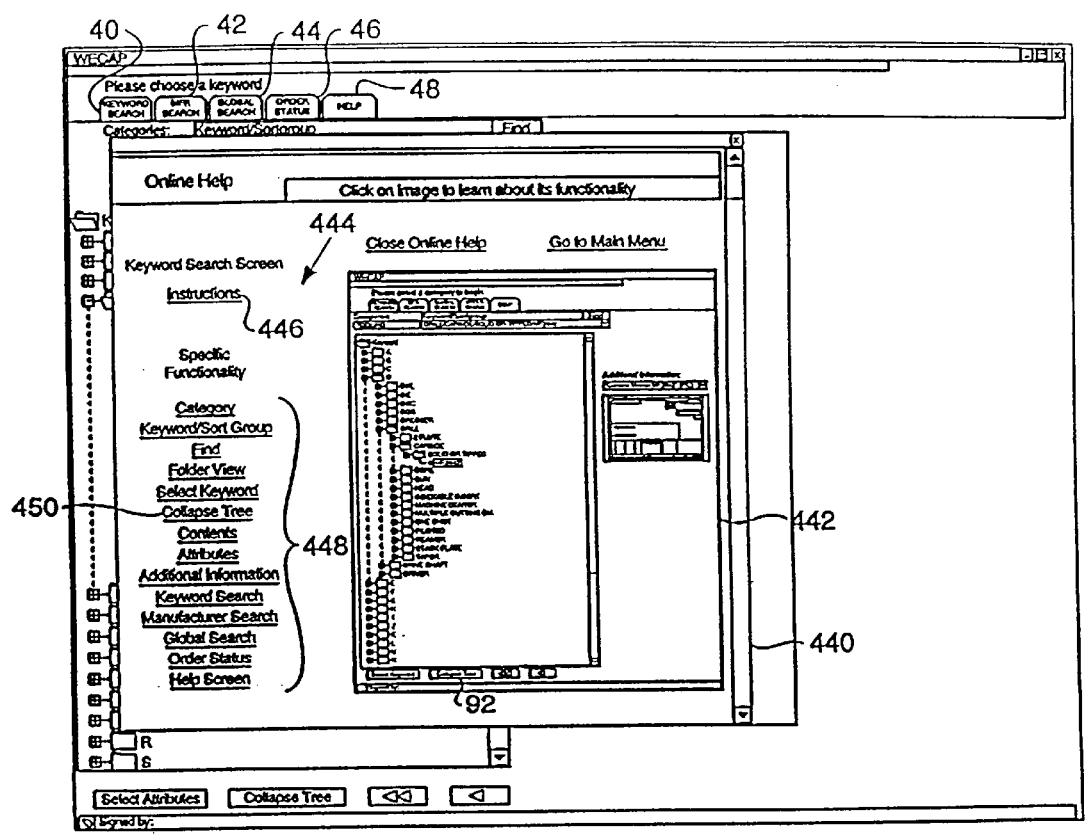
FIGS. 17A–17B illustrate example displays which are associated with an help status module.

Help module 48 allows for generation of detailed help information for a user on selection of an area of a mock display to which a question arises. Help module 48 may preferably be used at any time by the user, regardless of the specific display location. For instance, as shown in FIG. 17A, on selection of help module 48, help window 440 may appear overlaying the previous display the user was viewing; in this case, a display associated with the keyword search module 40. As shown in FIG. 17A, help window 440 may display an image 442 emulating the display about which the user has a question. This allows the user an opportunity to simply select the area within image 442 to which the question relates. As an alternative method of accessing help information using the help window 440, one or more links 444 may be provided. An "Instructions" link 446 may provide general information about how to use a display, while one or more specific functionality links 448 may provide detailed information on particular functions of a display.

Figure 17B:
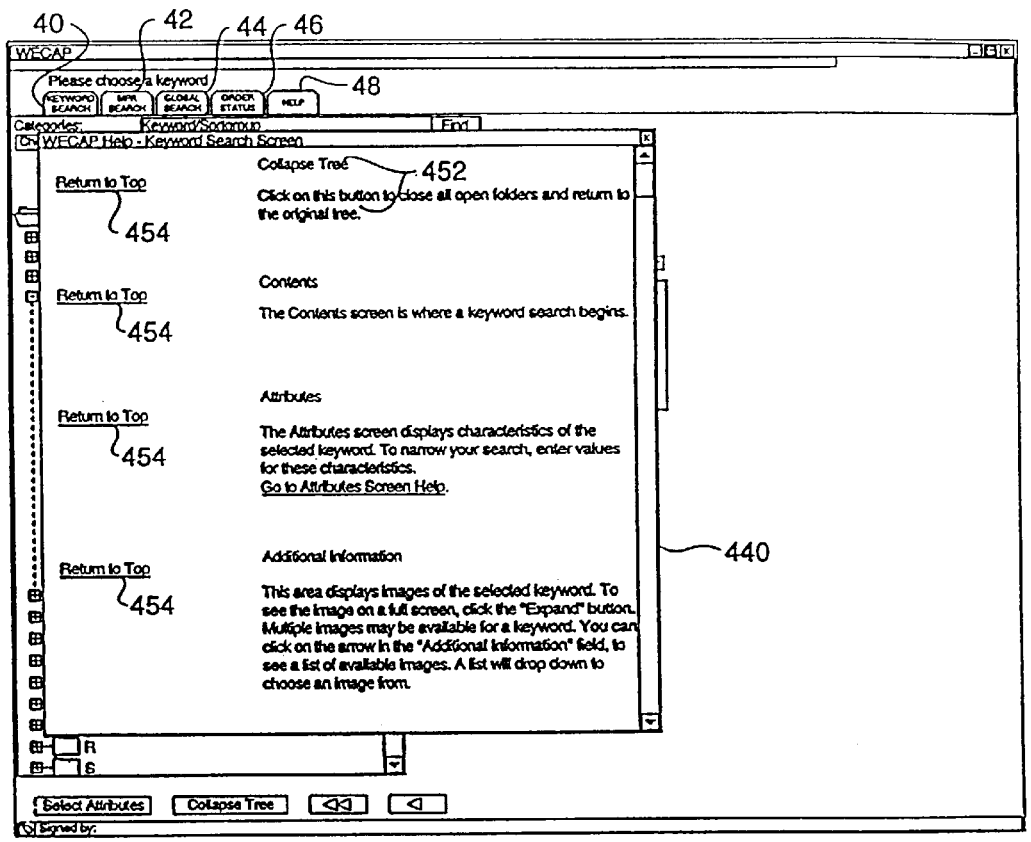

For example, when the user selects the "Collapse Tree" button 92 in image 442 or the "Collapse Tree" link 450, as shown in FIG. 17A, window 440 may next display an explanation 452 of the function of "Collapse Tree" button 92, as shown in FIG. 17B. After reading help information, the user may return to links 444 and image 442 for additional questions by selecting "Return to Top" link 454, which will return the user to the window display shown in FIG. 17A. In the example of FIG. 17B, after receiving appropriate help, the user may return to the display or module 40–46 from which the user came by selecting that module 40–46, selecting the "Close Online Help" link 456, or by simply exiting window 440. The user may also access the main help index covering all topics by selecting the "Go to Main Menu" link 458.

Figure 18A:
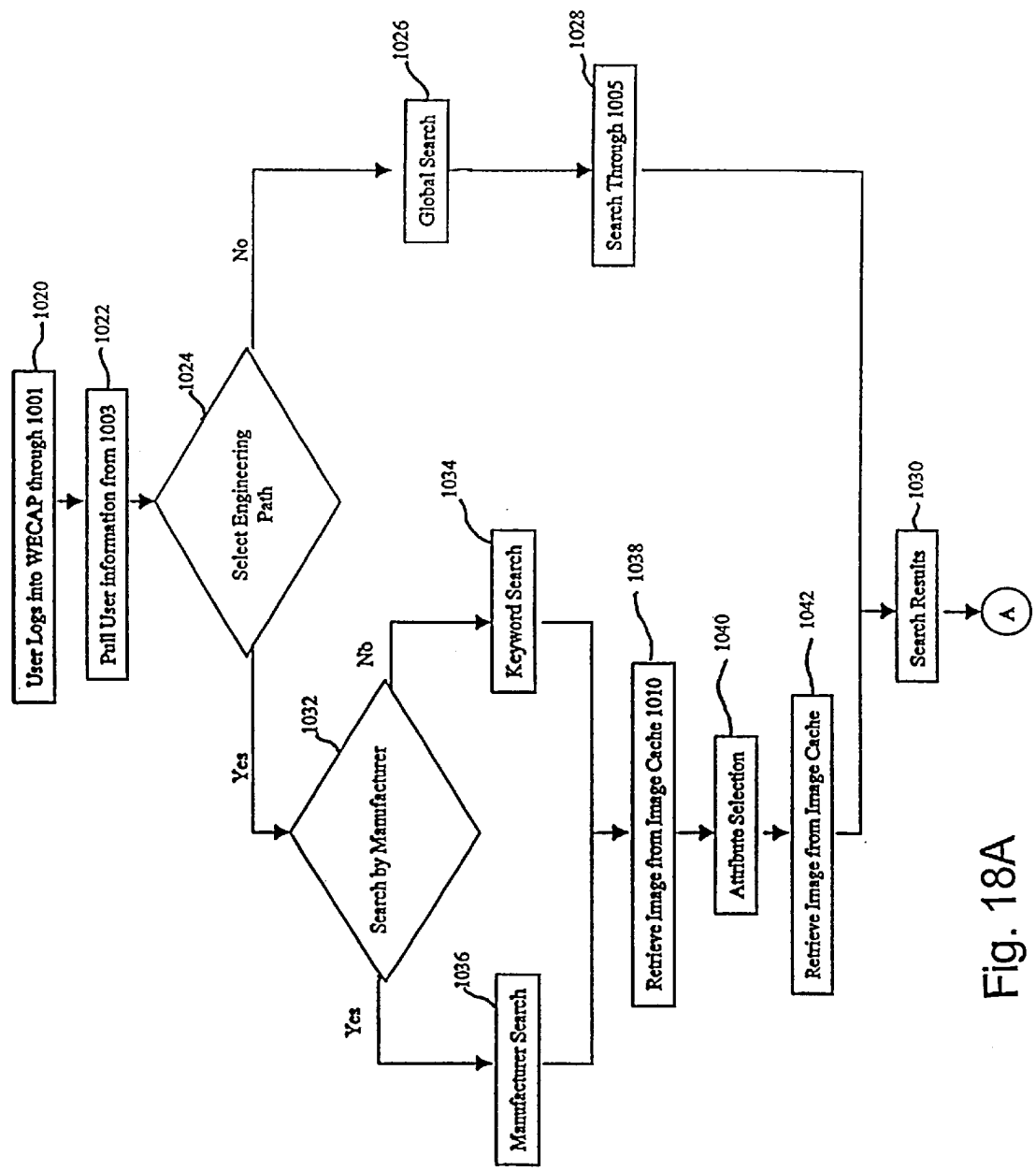
FIGS. 18A–18B illustrate an example process for procurement of items using parametric searching.
Figure 18B:
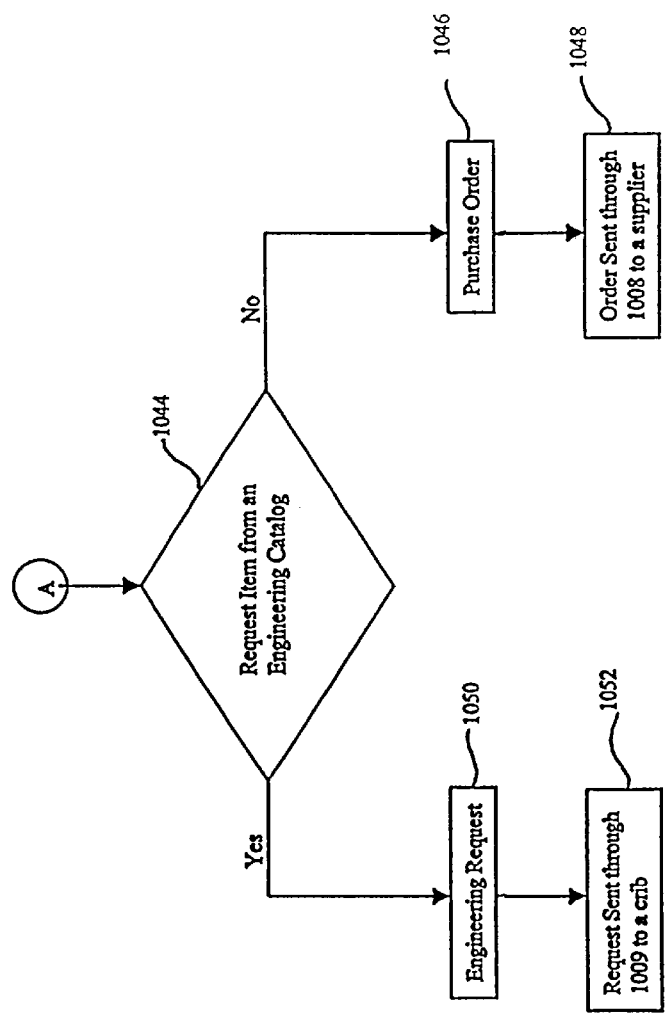

FIGS. 18A–18B illustrate an example process for parametric searching of one or more item catalogs using WECAP system 10. Referring to FIG. 18A, a user first logs into WECAP system 10 through electronic security system 12 at step 1020. WECAP system 10 pulls user information from electronic directory system 13 at step 1022. The user decides whether to search using an "engineering path" (e.g., using keyword search module 40 or manufacturer search module 42) at step 1024. If the user decides not to search using an "engineering path," the global search module 44 and associated displays may be used at step 1026, WECAP system 10 using an intelligent text search engine 17 at step 1028, and WECAP system 10 displays the search results to the user at step 1030.

Alternatively, if the user decides to search using an "engineering path" at step 1024, then the user decides whether to search by manufacturer at step 1032. If the user decides not to search by manufacturer, then the keyword search module 40 and corresponding displays may be used at step 1034. However, if the user decides to search by manufacturer, the manufacturer search module 42 and associated displays may be used at step 1036. In one embodiment, subsequent steps of the process are substantially similar for both keyword search module 40 and manufacturer search module 42. Specifically, subsequent steps (in response to user entry, selection, or both where appropriate) may include retrieving one or more images from the image cache 18 at step 1038; providing attributes to the user along with an image for the class of items corresponding to the attributes; and providing the search results to the user along with an image of the selected item at step 1042.

Referring to FIG. 18B, WECAP system 10 may then determine whether the user has requested an item from an "engineering" (i.e. internal) catalog at step 1044. If the user has not requested an item from an internal catalog, a purchase order may be generated at step 1046 using purchasing system 128 and transmitted to the appropriate external entity at step 1048. Alternatively, if the user has requested an item from an internal catalog, then an internal request may be generated at step 1050 using inventory system 129 and transmitted to the appropriate location within the business associated with the user at step 1052.

Parametrically searching one or more item catalogs according to the present invention, particularly as may be performed using WECAP system 10, may provide a very effective technique for searching the large amounts of data often associated with internal catalogs of large associated businesses and/or with external catalogs of large external manufacturers, suppliers, and other entities. The present invention may allow users to more readily comprehend how to search for a desired item and to more efficiently find the item. For example, on the shop floor of large manufacturer, it is not always practical to train every person who may need to search for items and, given the time constraints in a manufacturing environment, it will often be important that each such person be able to quickly search for, find, and order a needed item, with the confidence that it is the correct item and is in stock at a particular location. Failure to obtain the correct item in a timely manner can delay an assembly line or other factory operation, causing significant economic loss. Furthermore, parametric searching according to the present invention may be particularly effective for large enterprises because of the number of people and amount of collective time often involved in the procurement process. With the preferred embodiment of WECAP system 10, significant training time may be saved since WECAP system 10 may be easier to learn and use than previous systems. Also, because it may provide faster, more efficient, and more reliable searches and more efficient ordering, the WECAP system 10 has the potential to result in significant economic savings.

These and other characteristics described above may also make the present invention attractive in an e-commerce environment, such as might be associated with a business-to-business (B2B) marketplace or exchange that connects manufacturers, suppliers, and/or other sellers with potential purchasers. In such an environment, an entity associated with the marketplace or exchange might place the catalogs of such sellers online at the marketplace or exchange and charge a fee for access to these catalogs. For example, fees might be based on the amount of searching time, the number of searches performed, the number of search results obtained, the number of users accessing the catalogs, and/or any other suitable subscription, transaction, or other activities. The present invention may provide excellent value for those using such services, thereby attracting even more users and further justifying the fees the operating entity charges.

Although the present invention has been described with several embodiments, certain changes, substitutions, variations, and modifications may be suggested to those skilled in the art, and it is intended that the invention encompass all such changes, substitutions, variations, and modifications as fall within the spirit and scope of the appended claims.

What is claimed is:

1. A computer-implemented database system, comprising:
a first database table comprising rows each corresponding to a keyword and each comprising a keyword identifier uniquely identifying the keyword and an indication of whether a piece of media relating to the keyword is available, each keyword corresponding to one or more items for which a parametric search for items matching a parametric query may be performed;
a second database table comprising rows each corresponding to an item and each comprising an item identifier uniquely identifying the item and the keyword identifier for the keyword corresponding to the item;
a third database table comprising rows each corresponding to a piece of media and each comprising a media identifier uniquely identifying the piece of media and information reflecting how the piece of media is to be accessed;
a fourth database table comprising rows each corresponding to a combination of a keyword and a piece of media and each comprising the keyword identifier for the keyword and the media identifier for the piece of media; and
a fifth database table comprising rows each corresponding to a combination of an item and a piece of media and each comprising the item identifier for the item and the media identifier for the piece of media.

2. The database system of claim 1, wherein:
the keyword identifiers and media identifiers relate the first table to the third table in a many-to-many relationship and the keyword identifiers relate the first table to the fourth table in a one-to-many relationship;
the item identifiers and media identifiers relate the second table to the third table in a many-to-many relationship and the item identifiers relate the second table to the fifth table in a one-to-many relationship; and
the media identifiers relate the third table to the fourth table in a one-to-many relationship and relate the third table to the fifth table in a one-to-many relationship.

3. The database system of claim 1, wherein a piece of media comprises one or more images of an item.

4. The database system of claim 1, wherein the information in each row of the third table reflecting how the corresponding piece of media is to be accessed comprises one or more of the following:
a file name for a file in which the piece of media is stored;
an indication of a file type for the piece of media; and
data comprising the piece of media.

5. The database system of claim 1, wherein each row of the third table further comprises descriptive information for the piece of media to be provided with the piece of media.

6. A computer-implemented database system, comprising:
a database comprising a first table facilitating construction of a hierarchical data structure for user selection of a keyword in connection with a parametric search of the database, each keyword corresponding to a folder of the data structure and to one or more items for which the parametric search may be performed, a keyword corresponding to a folder that has one or more sub-folders being considered a parent keyword for the keywords corresponding to those sub-folders;
the first table comprising a plurality of rows each corresponding to a keyword and each comprising:
an identifier uniquely identifying the corresponding keyword;

a name for the corresponding keyword;

an indication of whether the corresponding keyword has a parent keyword, if the corresponding keyword has a parent keyword then the indication comprising the identifier for the parent keyword;

a name path for the corresponding keyword comprising the names for all keywords that exist in a corresponding path through the data structure from a top level folder of the data structure to the folder for the corresponding keyword, the name path comprising at least the name for the corresponding keyword; and an indication of whether the corresponding keyword is a last keyword in the name path.

7. The database system of claim 6, wherein the data structure is a tree data structure and each folder is a branch of the tree data structure.

8. The database system of claim 6, further comprising a user interface operable to display, in response to selection of a keyword and within a hierarchical representation of at least a portion of the data structure, the names of all keywords for which the selected keyword is the parent keyword, as reflected by the parent keyword identifiers for these keywords, to enable navigation of the representation in initiating a parametric search.

9. The database system of claim 8, wherein the user interface is further operable to:

facilitate initiation of a first parametric search in response to navigation to the name of a first keyword corresponding to a first set of items; and facilitate initiation of a second parametric search in response to navigation to the name of a second keyword that is within the folder for the first keyword and that corresponds to a second set of items, the second set of items being a subset of the first set of items such that the second parametric search is more specific than the first parametric search.

10. The database system of claim 6, wherein:

the name paths in the first table are searchable for the name for a user-specified keyword; and the system further comprises a user interface operable to display each name path in which the name for the user-specified keyword is found, for user selection of a displayed name path in initiating a parametric search.

11. The database system of claim 10, wherein the user interface is further operable to display a representation of a portion of the data structure in response to selection of a name path, the representation comprising a hierarchical arrangement of the names of the keywords that are in the corresponding path through the data structure.

12. The database system of claim 11, wherein for each keyword that is named in the selected name path:

if the row for the keyword comprises an indication that the keyword does not have a parent keyword, the representation comprises a folder icon for the keyword displayed in association with the displayed name for the keyword;

if the row for the keyword comprises a parent keyword identifier and an indication that the keyword is not the last keyword in its name path, the representation comprises a folder icon for the keyword displayed in association with the displayed name for the keyword, is a sub-folder icon of a folder icon for the parent keyword identified by the parent keyword identifier, and is hierarchically lower than the folder icon for the parent keyword; and if the row for the keyword comprises a parent keyword identifier and an indication that the keyword is the last keyword in its name path, the representation comprises the displayed name for the keyword that is disassociated from any folder icon for the keyword and is hierarchically lower than the folder icon for the parent keyword.

13. The database system of claim 11, further comprising a second table comprising rows each corresponding to a keyword-manufacturer combination and each comprising the identifier for the keyword of this combination and the identifier for the manufacturer of this combination, the second table being searchable for the keyword identifier for each keyword named in the selected name path to determine the one or more manufacturer identifiers corresponding to the keyword, where for each keyword named in the selected name path:

if the row for the keyword in the first table comprises an indication that the keyword does not have a parent keyword, the representation comprises a folder icon for the keyword displayed in association with the displayed name for the keyword, is a sub-folder icon of a folder icon for a manufacturer corresponding to the keyword, and is hierarchically lower than the folder icon for the manufacturer;

if the row for the keyword in the first table comprises a parent keyword identifier and an indication that the keyword is not the last keyword in its name path, the representation comprises a folder icon for the keyword displayed in association with the displayed name for the keyword, is a sub-folder icon of a folder icon for the parent keyword identified by the parent keyword identifier, and is hierarchically lower than the folder icon for the parent keyword; and if the row for the keyword in the first table comprises a parent keyword identifier and an indication that the keyword is the last keyword in its name path, the representation comprises the displayed name for the keyword that is disassociated from any folder icon for the keyword and is hierarchically lower than the folder icon for the parent keyword.

14. A computer-implemented database system, comprising:

a first database table comprising one or more rows each corresponding to a keyword and each comprising an identifier uniquely identifying the keyword, each keyword corresponding to one or more items for which a parametric search may be performed;

a second database table comprising one or more rows each corresponding to an attribute of one or more items and each comprising an identifier uniquely identifying the attribute and a name of the attribute;

a third database table comprising one or more rows each corresponding to a keyword-attribute combination and each comprising the identifier for the keyword of this combination, the identifier for the attribute of this combination, and a set of all valid attribute values for this combination;

a fourth database table comprising one or more rows each corresponding to an item and each comprising an identifier uniquely identifying the item, a name for the item, and the identifier for the keyword corresponding to the item; and a fifth database table comprising one or more rows each corresponding to an attribute value of an attribute of an item and each comprising the attribute value, the identifier for the attribute, the identifier for the item, and the identifier for the keyword corresponding to the item.

15. The database system of claim 14, wherein:
the keyword identifiers relate the first table to the fifth table in a one-to-many relationship;
the keyword identifiers relate the third table to the first table in a one-to-many relationship and the attribute identifiers relate the third table to the second table in a one-to-many relationship;
the keyword identifiers relate the fourth table to the first table in a one-to-many relationship and the item identifiers relate the fourth table to the fifth table in a one-to-many relationship; and
the attribute identifiers relate the fifth table to the second table in a one-to-many relationship.

16. The database system of claim 14, wherein each row of the first table further comprises a name for the corresponding keyword, to be displayed to facilitate user selection of the keyword in initiating a parametric search.

17. The database system of claim 14, wherein:
the first table facilitates construction of a hierarchical data structure for user selection of a keyword in connection with a parametric search, each of the keywords corresponding to a folder of the data structure, a keyword corresponding to a folder that has one or more sub-folders being a parent keyword for the keywords corresponding to those sub-folders; and
each row of the first table further comprises:
a name for the corresponding keyword;
an indication of whether the corresponding keyword has a parent keyword, if the corresponding keyword has a parent keyword then the indication comprising the identifier for the parent keyword;
a name path for the corresponding keyword comprising the names for all keywords that exist in a corresponding path through the data structure from a top level folder of the data structure to the folder for the corresponding keyword, the name path comprising at least the name for the corresponding keyword; and
an indication of whether the corresponding keyword is a last keyword in the name path for the corresponding keyword.

18. The database system of claim 14, wherein each row of the second table further comprises an indication of whether the corresponding attribute has numeric attribute values.

19. The database system of claim 14, wherein:
the third table is searchable for the keyword identifier corresponding to a user-specified keyword to determine all attribute identifiers corresponding to the user-specified keyword; and
the second table is searchable for the determined attribute identifiers corresponding to the user-specified keyword to determine all the attribute names corresponding to the user-specified keyword for display in response to the keyword being specified, the displayed attribute names facilitating initiation of a parametric search.

20. The database system of claim 19, wherein searchability of the second and third tables to determine all the attribute names corresponding to the user-specified keyword allows the parametric search to be initiated without requiring a user to input any attribute names.

21. The database system of claim 19, wherein the third table is searchable to determine all the valid attribute values corresponding to a displayed attribute name for display in association with the displayed attribute name to facilitate selection of a particular attribute value corresponding to the displayed attribute name for use in the parametric search.

22. The database system of claim 19, wherein the set of all valid attribute values for each keyword-attribute combination within the third table allows the third table to be searched to determine all the valid attribute values corresponding to a displayed attribute name rather than the fifth table being searched.

23. The database system of claim 14, wherein:
the fifth table is searchable for combinations of the keyword identifier for a user-specified keyword, attribute identifiers corresponding to user-specified attribute values, and stored attribute values consistent with the user-specified attribute values to determine item identifiers for a set of matching items; and
the fourth table is searchable for the determined item identifiers to determine the names for the matching items for display in association with stored attribute values for the matching items, displayed stored attribute values comprising at least the stored attribute values for which the fifth table was searched.

24. The database system of claim 23, wherein the fifth table is searchable to determine the attribute names corresponding to at least the user-specified attribute values for display as column headings for the displayed stored attribute values.

25. The database system of claim 14, wherein each row of the fourth table further comprises one or more of the following:
a price of the corresponding item;
descriptive information for the corresponding item;
a unit of measure for the corresponding item;
a quantity in which the corresponding item is sold;
a stock keeping unit (SKU) for the corresponding item;
a location for the corresponding item; and
an identifier uniquely identifying the manufacturer of the corresponding item.

26. The database system of claim 14, wherein each row of the fifth table further comprises an ordinal number for the attribute for the corresponding attribute value, specifying the order in which attribute values for the attribute are to be displayed relative to attribute values for other attributes in providing results of the parametric search.

27. The database system of claim 14, further comprising:
a sixth database table comprising rows each corresponding to a particular manufacturer and each comprising an identifier uniquely identifying the manufacturer, a name for the manufacturer, and contact information for the manufacturer; and
a seventh database table comprising rows each corresponding to a particular keyword-manufacturer combination and each comprising the identifier for the keyword of this combination and the identifier for the manufacturer of this combination;
each row of the fourth table comprising the identifier for the manufacturer of the corresponding item;
each row of the fifth table comprising the identifier for the manufacturer of the corresponding item.

28. The database system of claim 27, wherein:
the keyword identifiers relate the first table to the seventh table in a one-to-many relationship;
the manufacturer identifiers relate the fourth table to the sixth table in a one-to-many relationship; and
the manufacturer identifiers relate the sixth table to the fifth table in a one-to-many relationship and relate the sixth table to the seventh table in a one-to-many relationship.

29. The database system of claim 14, wherein:
each row of the first table comprises a name for the corresponding keyword;
each row of the fourth table comprises a description for the corresponding item; and
the names for the keywords in the first table, the descriptions for the items in the fourth table, and the names for the items in the fourth table are searchable for an alphanumeric string matching a user-specified alphanumeric string to determine item identifiers for all items corresponding to the matching alphanumeric string.

30. A computer-implemented method of parametrically searching for one or more items, comprising:
establishing communication with a database comprising:
a first table comprising rows each corresponding to a keyword and each comprising a keyword identifier uniquely identifying the keyword and an indication of whether a piece of media relating to the keyword is available, each keyword corresponding to one or more items for which a parametric search of the database may be performed;
a second table comprising rows each corresponding to an item and each comprising an item identifier uniquely identifying the item and the keyword identifier for the keyword corresponding to the item;
a third table comprising rows each corresponding to a piece of media and each comprising a media identifier uniquely identifying the piece of media and information reflecting how the piece of media is to be accessed;
a fourth table comprising rows each corresponding to a combination of a keyword and a piece of media and each comprising the keyword identifier for the keyword and the media identifier for the piece of media; and
a fifth table comprising rows each corresponding to a combination of an item and a piece of media and each comprising the item identifier for the item and the media identifier for the piece of media;
searching the first table to determine the keyword identifier corresponding to a user-specified keyword and determine that a piece of media is available for the user-specified keyword;
searching the fourth table to determine the media identifier corresponding to the determined keyword identifier;
searching the third table to access the piece of media corresponding to the determined media identifier; and
providing the accessed piece of media to the user to facilitate a parametric search for one or more items using the database.

31. The method of claim 30, wherein:
the keyword identifiers and media identifiers relate the first table to the third table in a many-to-many relationship and the keyword identifiers relate the first table to the fourth table in a one-to-many relationship;
the item identifiers and media identifiers relate the second table to the third table in a many-to-many relationship and the item identifiers relate the second table to the fifth table in a one-to-many relationship; and
the media identifiers relate the third table to the fourth table in a one-to-many relationship and relate the third table to the fifth table in a one-to-many relationship.

32. The method of claim 30, wherein a piece of media comprises one or more images of an item.

33. method of claim 30, wherein the information in each row of the third table reflecting how the corresponding piece of media is to be accessed comprises one or more of the following:
a file name for a file in which the piece of media is stored;
an indication of a file type for the piece of media; and
data comprising the piece of media.

34. The method of claim 30, wherein each row of the third table further comprises descriptive information for the piece of media to be provided with the piece of media.

35. A computer-implemented method of parametrically searching for one or more items, comprising:
establishing communication with a database comprising a first table that facilitates construction of a hierarchical data structure allowing user selection of a keyword in connection with a parametric search of the database, each keyword corresponding to a folder of the data structure and to one or more items for which the parametric search may be performed, a keyword corresponding to a folder that has one or more sub-folders being considered a parent keyword for the keywords corresponding to those sub-folders, the first table comprising a plurality of rows each corresponding to a keyword and each comprising:
an identifier uniquely identifying the corresponding keyword;
a name for the corresponding keyword;
an indication of whether the corresponding keyword has a parent keyword, if the corresponding keyword has a parent keyword then the indication comprising the identifier for the parent keyword;
a name path for the corresponding keyword comprising the names for all keywords that exist in a corresponding path through the data structure from a top level folder of the data structure to the folder for the corresponding keyword, the name path comprising at least the name for the corresponding keyword; and
an indication of whether the corresponding keyword is a last keyword in the name path; and
performing a parametric search for one or more items using the database.

36. The method of claim 35, wherein the data structure is a tree data structure and each folder is a branch of the tree data structure.

37. The method of claim 35, further comprising displaying, in response to selection of a keyword and within a hierarchical representation of at least a portion of the data structure, the names of all keywords for which the selected keyword is the parent keyword, as reflected by the parent keyword identifiers for these keywords, to enable navigation of the representation in initiating a parametric search.

38. The method of claim 37, further comprising:
facilitating initiation of a first parametric search in response to navigation to the name of a first keyword corresponding to a first set of items; and
facilitating initiation of a second parametric search in response to navigation to the name of a second keyword that is within the folder for the first keyword and that corresponds to a second set of items, the second set of items being a subset of the first set of items such that the second parametric search is more specific than the first parametric search.

39. The method of claim 35, further comprising:
searching the name paths in the first table for the name for a user-specified keyword; and
displaying each name path in which the name for the user-specified keyword is found, for user selection of a displayed name path in initiating a parametric search.

40. The method of claim 39, further comprising:
receiving a selection of a name path; and
displaying a representation of a portion of the data structure in response to selection of the name path, the representation comprising a hierarchical arrangement of the names of the keywords that are in the corresponding path through the data structure.

41. The method of claim 40, wherein for each keyword that is named in the selected name path:
if the row for the keyword comprises an indication that the keyword does not have a parent keyword, the representation comprises a folder icon for the keyword displayed in association with the displayed name for the keyword;
if the row for the keyword comprises a parent keyword identifier and an indication that the keyword is not the last keyword in its name path, the representation comprises a folder icon for the keyword displayed in association with the displayed name for the keyword, is a sub-folder icon of a folder icon for the parent keyword identified by the parent keyword identifier, and is hierarchically lower than the folder icon for the parent keyword; and
if the row for the keyword comprises a parent keyword identifier and an indication that the keyword is the last keyword in its name path, the representation comprises the displayed name for the keyword that is disassociated from any folder icon for the keyword and is hierarchically lower than the folder icon for the parent keyword.

42. The method of claim 40, wherein:
the database further comprises a second table comprising a plurality of rows each corresponding to a keyword-manufacturer combination and each comprising the identifier for the keyword of this combination and the identifier for the manufacturer of this combination; and
the method further comprises searching the second table for the keyword identifier for each keyword named in the selected name path to determine the one or more manufacturer identifiers corresponding to the keyword, where for each keyword named in the selected name path:
if the row for the keyword in the first table comprises an indication that the keyword does not have a parent keyword, the representation comprises a folder icon for the keyword displayed in association with the displayed name for the keyword, is a sub-folder icon of a folder icon for a manufacturer corresponding to the keyword, and is hierarchically lower than the folder icon for the manufacturer;
if the row for the keyword in the first table comprises a parent keyword identifier and an indication that the keyword is not the last keyword in its name path, the representation comprises a folder icon for the keyword displayed in association with the displayed name for the keyword, is a sub-folder icon of a folder icon for the parent keyword identified by the parent keyword identifier, and is hierarchically lower than the folder icon for the parent keyword; and
if the row for the keyword in the first table comprises a parent keyword identifier and an indication that the keyword is the last keyword in its name path, the representation comprises the displayed name for the keyword that is disassociated from any folder icon for the keyword and is hierarchically lower than the folder icon for the parent keyword.

43. A computer-implemented method of parametrically searching for one or more items, comprising:
establishing communication with a database comprising:
a first table comprising one or more rows each corresponding to a keyword and each comprising an identifier uniquely identifying the keyword, each keyword corresponding to one or more items for which a parametric search of the database may be performed;
a second table comprising one or more rows each corresponding to an attribute of one or more items and each comprising an identifier uniquely identifying the attribute and a name of the attribute;
a third table comprising one or more rows each corresponding to a keyword-attribute combination and each comprising the identifier for the keyword of this combination, the identifier for the attribute of this combination, and a set of all valid attribute values for this combination;
a fourth table comprising one or more rows each corresponding to an item and each comprising an identifier uniquely identifying the item, a name for the item, and the identifier for the keyword corresponding to the item; and
a fifth table comprising one or more rows each corresponding to an attribute value of an attribute of an item and each comprising the attribute value, the identifier for the attribute, the identifier for the item, and the identifier for the keyword corresponding to the item; and
performing a parametric search for one or more items using the database.

44. The method of claim 43, wherein:
the keyword identifiers relate the first table to the fifth table in a one-to-many relationship;
the keyword identifiers relate the third table to the first table in a one-to-many relationship and the attribute identifiers relate the third table to the second table in a one-to-many relationship;
the keyword identifiers relate the fourth table to the first table in a one-to-many relationship and the item identifiers relate the fourth table to the fifth table in a one-to-many relationship; and
the attribute identifiers relate the fifth table to the second table in a one-to-many relationship.

45. The method of claim 43, wherein each row of the first table further comprises a name for the corresponding keyword, the method further comprising displaying the name for the corresponding keyword to facilitate user selection of the keyword in initiating the parametric search.

46. The method of claim 43, wherein:
the first table facilitates construction of a hierarchical data structure for user selection of a keyword in connection with a parametric search of the database, each keyword corresponding to a folder of the data structure, a keyword corresponding to a folder that has one or more sub-folders being a parent keyword for the keywords corresponding to those sub-folders; and
each row of the first table further comprises:
a name for the corresponding keyword;
an indication of whether the corresponding keyword has a parent keyword, if the corresponding keyword has a parent keyword then the indication comprising the identifier for the parent keyword;
a name path for the corresponding keyword comprising the names for all keywords that exist in a corresponding path through the data structure from a top level folder of the data structure to the folder for the corresponding keyword, the name path comprising at least the name for the corresponding keyword; and an indication of whether the corresponding keyword is a last keyword in the name path for the corresponding keyword.

47. The method of claim 43, wherein each row of the second table further comprises an indication of whether the corresponding attribute has numeric attribute values.

48. The method of claim 43, further comprising:
searching the third table for the keyword identifier corresponding to a user-specified keyword to determine all attribute identifiers corresponding to the user-specified keyword; and
searching the second table for the determined attribute identifiers to determine all the attribute names corresponding to the user-specified keyword; and
displaying the determined attribute names to facilitate initiation of the parametric search.

49. The method of claim 48, wherein searching the second and third tables to determine all the attribute names corresponding to the user-specified keyword allows the parametric search to be initiated without requiring a user to input any of the attribute names.

50. The method of claim 48, further comprising:
searching the third table to determine all valid attribute values corresponding to a displayed attribute name; and
displaying the determined valid attribute values in association with the displayed attribute name to facilitate selection of a particular attribute value corresponding to the displayed attribute name for use in the parametric search.

51. The method of claim 48, wherein the set of all valid attribute values for each keyword-attribute combination within the third table allows the third table to be searched to determine all the valid attribute values corresponding to a displayed attribute name rather than the fifth table being searched.

52. The method of claim 43, further comprising:
searching the fifth table for all combinations of the keyword identifier for a user-specified keyword, attribute identifiers corresponding to user-specified attribute values, and stored attribute values consistent with the user-specified attribute values to determine item identifiers for a set of matching items;
searching the fourth table for the determined item identifiers to determine the names for the matching items; and
displaying the determined names in association with stored attribute values for the matching items, displayed stored attribute values comprising at least the stored attribute values for which the fifth table was searched.

53. The method of claim 52, further comprising:
searching the fifth table to determine the attribute names corresponding to at least the user-specified attribute values; and
displaying the determined attribute names as column headings for the displayed stored attribute values.

54. The method of claim 43, wherein each row of the fourth table further comprises one or more of the following:
a price of the corresponding item;
descriptive information for the corresponding item;
a unit of measure for the corresponding item;
a quantity in which the corresponding item is sold;
a stock keeping unit (SKU) for the corresponding item;
a location for the corresponding item; and
an identifier uniquely identifying the manufacturer of the corresponding item.

55. The method of claim 43, wherein each row of the fifth table further comprises an ordinal number for the attribute for the corresponding attribute value, the ordinal number specifying the order in which attribute values for the attribute are to be displayed relative to attribute values for other attributes in providing results of the parametric search.

56. The method of claim 43, wherein the database further comprises:
a sixth table comprising rows each corresponding to a particular manufacturer and each comprising an identifier uniquely identifying the manufacturer, a name for the manufacturer, and contact information for the manufacturer; and
a seventh table comprising rows each corresponding to a particular keyword-manufacturer combination and each comprising the identifier for the keyword of this combination and the identifier for the manufacturer of this combination;
each row of the fourth table comprising the identifier for the manufacturer of the corresponding item;
each row of the fifth table comprising the identifier for the manufacturer of the corresponding item.

57. The method of claim 56, wherein:
the keyword identifiers relate the first table to the seventh table in a one-to-many relationship;
the manufacturer identifiers relate the fourth table to the sixth table in a one-to-many relationship; and
the manufacturer identifiers relate the sixth table to the fifth table in a one-to-many relationship and relate the sixth table to the seventh table in a one-to-many relationship.

58. The method of claim 43, wherein:
each row of the first table comprises a name for the corresponding keyword;
each row of the fourth table comprises a description for the corresponding item; and
the method further comprises searching the names for the keywords in the first table, the descriptions for the items in the fourth table, and the names for the items in the fourth table for an alphanumeric string matching a user-specified alphanumeric string to determine the item identifiers for all items corresponding to the matching alphanumeric string.

* * * * *